United States Patent [19]

Honore et al.

[11] 4,028,703

[45] June 7, 1977

[54] APPARATUS FOR RADIO POSITION-FIXING OF THE HYPERBOLIC PHASE-MEASUREMENT TYPE

[75] Inventors: Etienne A. H. Honore, Chatenay-Malabry; Emile L. G. Torcheux, Paris, both of France

[73] Assignee: Societe d'Etude et d'Application des Techniques Nouvelles NEO-TEC, Paris, France

[22] Filed: Mar. 24, 1975

[21] Appl. No.: 561,198

Related U.S. Application Data

[62] Division of Ser. No. 316,428, Dec. 18, 1972, Pat. No. 3,983,559.

[30] Foreign Application Priority Data

Dec. 17, 1971 France .............................. 71.45492
July 27, 1972 France .............................. 72.27058
July 27, 1972 France .............................. 72.27059

[52] U.S. Cl. ........................................... 343/105 R
[51] Int. Cl.² ........................................... G01S 1/30

[58] Field of Search .................... 343/105 R, 103 R

[56] References Cited

UNITED STATES PATENTS 3,774,215  11/1973  Reed .............................. 343/105 R

*Primary Examiner*—Maynard R. Wilbur
*Assistant Examiner*—Richard E. Berger
*Attorney, Agent, or Firm*—Roger S. Borovoy; Alan H. MacPherson

[57] ABSTRACT

A radio position-fixing system using hyperbolic phase measurement, including two transmitting stations which radiate a specific, programmed, sequential and recurrent waveform and a movable receiver capable of synchronously receiving and detecting the transmitted waveforms and, by combining the signals in a predetermined manner, measuring certain phase differences in the signals which are representative of the hyperbolic position-line information for the receiver relative to the two transmitters.

13 Claims, 31 Drawing Figures

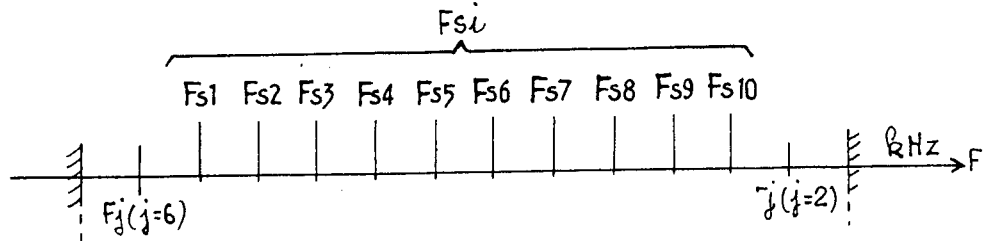
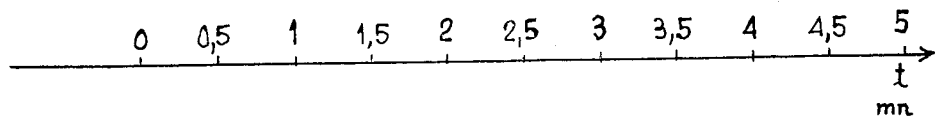

APPARATUS FOR RADIO POSITION-FIXING OF THE HYPERBOLIC PHASE-MEASUREMENT TYPE

This is a division, of application Ser. No. 316,428, filed Dec. 18, 1972, now U.S. Pat. No. 3,983,559.

The present invention concerns radio position-fixing by phase measurement.

It is known that the basic principle of radio position-fixing by phase measurement consists in utilising the propagation phase displacement, which occurs in a pure sinusoidal wave of known frequency, transmitted by a transmitting station, as a function of the propagation distance of the said wave, in order to obtain therefrom information relative to the said propagation distance. Several stations transmitting such waves are necessary for permitting determination of the position of a receiver at a point. Such a system of transmitting stations is commonly called a radio position-fixing chain.

The propagation phase displacement occuring in a wave of known frequency is a function of the propagation distance and also of the said known frequency and the rate of propagation of the electromagnetic waves. The proportionality factor connecting the propagation phase difference expressed in phase rotations and rotation fractions (measured on the known frequency) with the corresponding propagation distance will be called sensitivity factor or more briefly sensitivity. This sensitivity is equal to the quotient of the known frequency of the electromagnetic wave divided by the rate of propagation.

It is also known that the phase of an electrical signal of known frequency is defined except for a whole multiple of $2\pi$, that is to say, except for a number of phase rotations. This is the source of the phenomenon known as ambiguity. In general, the result is that a measured phase value does not correspond to a position-line for the receiver but to a plurality of position-lines. The ambiguity of a phase measurement increases when the sensitivity increases, which corresponds to an improvement in the absolute precision of position-fixing.

The technical implementation of the basic principle of radio position-fixing as just explained is effected in a more complex manner for a certain number of technical reasons.

In fact, the practice of radio position-fixing consists in establishing a phase reference for measuring the aforesaid propagation phase differences. It appears at once that this problem is related to the stability of the sources or oscillators used for generating the waves intended for position-fixing. In this respect, it is necessary to bear in mind that in the theoretical reasoning, the frequency and phase of the transmitted waves are known a priori. In practice, on reception, it is possible to assume that the frequency of the transmitted waves is known without it being necessary to provide connections for this purpose. On the contrary, the phase of the transmitted waves is generally not known absolutely.

Most of the existing solutions are based on the fact that the phase reference mentioned above is established relatively for the various signals transmitted. The radio position-fixing methods thus realised use a measurement of the differences in the propagation phase displacements between the point of reception and two transmitting stations. This supplies a group of hyperbolic lines whose common foci are the two transmitting stations.

French Pat. Specification No. 790,386 and its addition 45,780 (HONORE: 1934) describe the first realisable technical solution of the phase measurement problems; this solution may be summarised as follows: Two transmitting stations radiate waves on two respective frequencies differing from each other by a low frequency. This low frequency is picked up at a fixed receiving station and is retransmitted in the form of the amplitude modulation of a carrier wave. It is clear that the two transmitting stations may transmit waves having no pre-established relationship with respect to the same time scale.

Among others approaches made subsequently, there is proposed in British Pat. Specification No. 579,346 (MITCHELL and KILVINGTON; 1944) a method of radio position-fixing according to which several transmitting stations radiate waves having the same frequency. Only one of the transmitting stations transmit such a wave at any given instant. It is therefore necessary for a relationship to be established between the transmitting stations so that the frequencies and phases remain fixed at least relatively. This method of radio position-fixing will be denoted hereinafter by the term sequence method, because each measuring frequency is transmitted in sequence by the various transmitting stations.

The problems due to ambiguity form the subject of a general technical solution disclosed in French Pat. Specification No. 1,010,811 (HONORE TORCHEUX; 1948). In this specification, it is proposed to cause each transmitting station to radiate at least two waves at near frequencies. The difference in the propagation phase differences obtained on these two near frequencies has a sensitivity factor equal to the difference between the respective sensitivity factors of the two transmitted frequencies, therefore, less than these latter factors. This lesser sensitivity factor makes it possible to remove the ambiguity present in the phase measurements made at one or the other measuring frequencies. This method will be called hereinafter "ambiguity removal by differential sensitivity."

Installations of radio position-fixing using a sequential transmission method have the principal advantage that the frequencies transmitted are identical for all the transmitting stations, which reduces the necessary number of transmission frequencies and consequently makes it easier to obtain frequency allocations.

However, the implementation of this sequential system is subordinate to two contradictory technical conditions.

The first is due to the fact that since the transmissions are interrupted or momentary for each transmitting station, it is necessary to await the end of the transient conditions of the filters before using the received signals. The duration of each time period of transmission ought therefore to exceed greatly that of the transient conditions.

The second condition is due to the fact that the receivers are most often situated on moving objects. Since the phase information carried by the waves is valid only at the instant of reception, and a phase difference measurment, for each measuring frequency, must be made on waves which are not transmitted at the same instant, it follows that radio position-fixing by the sequence method supplies utilisable information only if the time interval separating two successive transmissions of the same measuring frequency by the same transmitter is sufficiently small.

Now the period of the sequence of transmissions, that is to say the time interval separating two transmissions of the same frequency by the same transmitter, is proportional to the duration of each momentary transmission according to a factor depending on the greater of the following numbers: Number of measuring frequencies used, number of transmitting stations forming a chain.

Since the total number of transmitting stations only influences the number of exploitation possibilities, the total number of frequencies used is in direct relation to the fact that ambiguity removal is more complete and more certain.

A first disadvantage of sequence radio position-fixing systems is therefore that to reduce the first condition it is necessary to make the transient conditions short by adopting high band widths on reception. This presupposes high transmission powers and results in a considerable congestion of the ether.

A second disadvantage of these systems is that for satisfying at one and the same time the two contradictory conditions, it is necessary in practice to limit the number of transmitting stations and the number of measuring frequencies. The result is in particular the practical impossibility of removing the ambiguity completely and surely at one and the same time, this being truer, the higher are the frequency values.

Another disadvantage of these systems is the necessity of using reception programmes finely synchronised with the transmission programme for limiting the loss of time which would result from lag between the programmes. Special synchronisation signals are therefore most often provided for this purpose. Although the principles of such synchronisation are simple, the use of these signals in practice raises problems of range or power.

The present invention concerns a novel method of radio position-fixing of the hyperbolic type using phase measurement intended to reduce practically completely the aforesaid disadvantages. It concerns also transmission and reception installations for carrying out this method of radio position-fixing.

A first object of the invention is to provide a method of radio position-fixing, in which the band widths necessary for reception are extremely narrow. In addition to better protection from neighbouring transmissions and noise in general, this permits a considerable reduction in transmission power and consequently in the congestion of the ether.

Furthermore, by reason of the small band widths mentioned, it is easy to provide, according to the invention, several chains of transmission installations whose frequencies in respective correspondence are extremely close, and to use such transmissions selectively on receptior by very simple switching means.

A second object of the invention is to provide a method of radio position-fixing whereby it is possible to provide a large number of transmitters per radio position-fixing chain. This permits very high flexibility in the geographical location of the transmitting stations, and in their utilisation in reception.

A third object of the invention is to provide a method of radio position-fixing in which the number of measuring frequencies may be large enough for ambiguity removal to be complete and certain. Precision may be increased still further by using a sensitivity provided by all the measuring frequencies, which sensitivity increases with the number of the said frequencies.

A fourth object of the invention is to provide a method of radio position-fixing in which the synchronisation of the transmission and reception programmes admits a tolerance of several seconds, easily available by means of the timing devices currently used, and, a fortiori, by means of time signals.

A fifth object is to provide a radio position-fixing receiver, in which a single device treats successively a number of sequential waves, the local signals being generated sequentially according to requirements.

A sixth object of the invention is to provide a radio position-fixing receiver, in which the ambiguity is removed separately relative to each transmitting station received.

A seventh object of the invention is to provide a radio position-fixing receiver, in which a single device removes the ambiguity sequentially relative to each transmitting station received.

The method of radio position-fixing according to the invention will now be characterised.

It is necessary beforehand to state precisely what is understood by local signal.

In the known acceptance of this word, a local signal is an electrical signal generated locally with negligible noise and representative of a pure sinusoidal signal, and possesses a definite frequency and phase and a definite frequency stability, which are those of the sinusoidal signal. The representative signal in particular may be a rectangular signal or a signal formed of pulses, the ascending (or descending) front of which corresponds to a characteristic instant of a sinusoidal signal, for example to the passage through zero in a definite direction.

In what follows in the present specification and claims, the words local signal or complex local signal are used with a much more general significance. A complex local signal or more briefly local signal comprises one or more representative, locally generated signals as defined above; associated with each of them is a coefficient or weight which may be a real number of any value but known. Each of these representative signals is a component signal or a component of the complex local signal.

The complex local signal is also representative of a pure sinusoidal signal and has a frequency and phase which are those of the said sinusoidal signal.

The frequency of a complex local signal has as value the algebraic sum of the frequencies of the pure sinusoids represented by each component signal, multiplied respectively by the associated coefficient or weight. Similarly, the phase of a complex local signal has as value the algebraic sum of the phases of the pure sinusoids represented by each component signal multiplied respectively by the same associated coefficient or weight as for the corresponding frequency. The frequency and phase of a complex signal will be called respectively complex frequency and complex phase in the cases which may give rise to uncertainty.

It should be understood in the present specification and claims that the complex local signals may or may not be truly complex signals, in other words, a complex signal may comprise only one component signal. A complex signal having always a number of component signals will be termed true complex signal.

A group of component signals or simple components of a complex local signal are called complex component. The expression true complex component is also used to denote a complex component always comprising several simple components.

Examples of complex signals are given in FIGS. 9 and 10 and the corresponding description, or again in FIGS. 11 and 12, the coefficients or weights being equal to ± 1.

In FIGS. 9 and 10, the outputs of the divider-counters 7231A to 7231C and 7741 supply the simple components of a complex signal. When the signal $R_5'$ is zero, and assuming that there is no phase displacement in the filters and that the signal $O_5$ is purely sinusoidal, the complex signal in question is representative of the pure sinusoidal signal $O_5$. Taking the components at the inputs of the divider-counters mentioned, they then have assigned to them respectively weights equal to the reciprocal of the division factors.

The method of radio position-fixing according to the invention comprises at transmission a plurality of transmitting stations $E_i$ in number N at least equal to 2 and advantageously fixed. It is known that in two-dimensional radio position-fixing of hyperbolic type, two transmitting stations are sufficient for determining a position-line on which a receiver is situated.

Each transmitting station should be capable of:

Generating continuously a first local signal $S_i$ having a frequency $Fs_i$, called specific frequency, different for each of the N transmitting stations, and a number $n$ at least equal to 1 of second local signals $S_{ij}$, each having a respective frequency $F_j$, called measuring frequency, the values of the $n$ measuring frequencies $F_j$ being common to all the transmitting stations;

radiating continously, from the first local signal $S_i$, a pure wave $O_i$ having the specific frequency $Fs_i$;

radiating in an interrupted and recurrent fashion, i.e., in a sequential fashion according to a known programme, from each second local signal $S_{ij}$, a pure wave $O_{ij}$ having the measuring frequency $F_j$, the programme being such that for each measuring frequency $F_j$ and at any instant there is at most one transmitting station of the said plurality radiating a wave having this measuring frequency $F_j$.

The permanent waves $O_i$ having the specific frequencies $Fs_i$, different for each of the N transmitting stations, make it possible on reception to obtain continuously a signal representative of the Doppler effect exerted on any wave between each transmitting station and the receiver. The number $n$ of momentary and recurrent waves $O_{ij}$, having the measuring frequencies $F_j$ transmitted by each transmitting station, gives a more or less precise, sure and complete character to the determination of position and to the removal of ambiguity. A single measuring frequency of common value for all the transmitting station is sufficient for making a position determination, but with considerable ambiguity.

The transmission programme of the interrupted waves $O_{ij}$ having the measuring frequencies should be such that at any moment there is at the most one transmitting station radiating a wave on a given measuring frequency. This being so, each transmitting station $E_i$ may radiate interrupted waves $O_{ij}$ in any manner complying with this condition and which is adapted to each particular case.

According to the invention, reception is possible for an unlimited number of receivers, installed most often on board a moving object, such as a ship.

Each receiver should receive in a selected manner, controlled for example by an operator, the waves from at least two transmitting stations for supplying at least one piece of information of hyperbolic position-line.

Each receiver should, on the one hand, be capable of:

Generating continuously for each one of a number N', at least equal to 2, of specific frequencies $Fs_k$ selected from the N specific frequencies $Fs_i$, a first complex local signal $S_k'$ of complex frequency $F's_k$ having the same nominal value as the specific frequency $Fs_k$, the real frequencies $F's_k$ of each of the first complex signals $S_k'$ being susceptible to independent respective variations in the vicinity of their nominal values.

Continuously receiving, for each specific frequency $Fs_k$, the wave $O_k$ continuously radiated on this specific frequency, this reception being effected according to synchronous reception technique, utilising each first complex local signal $S_k'$ and supplying the respective residues $R_k'$, called specific frequency residues, by utilising the specific frequency residue $R_k'$ corresponding to each specific continuously $Fs_k$, permanently compelling the frequency $F's_k$ of corresponding first complex local signal $S_k'$ to be equal to the frequency of the continuous wave $O_k$ as received.

Each local signal $S_k'$ may comprise one or more component signals. Very advantageously, it comprises more than one, the component signals of higher frequencies are the local signals of frequency changing, and the last component signal, which in general has the lowest frequency, serves for synchronous detection. A synchronous detection which may or may not be accompanied by frequency changes is called synchronous reception.

The specific frequency residue $R_k'$, obtained at the output of synchronous detection, is used for reacting on at least one of the component signals of the first local signal $S_k'$, such that the complex frequency $F's_k$ is obliged to be equal to the frequency of the corresponding continuous wave $O_k$ as received.

Since the frequencies $Fs_k$ of the continuous waves $O_k$ as received are capable of independent respective variations, particularly because of the Doppler effect consequent on the displacements of the receiver relative to the transmitting stations, it is important that the real values of the respective frequencies $F's_k$ of each of the first local signals $S_k'$ can also vary independently.

On the other hand, each receiver should be capable of:

Generating continuously, for each of the N' specific frequencies $Fs_k$, a number $n'$ between 1 and $n$ of second complex local signals $S_{sm}'$ of complex frequencies $F_{km}'$ having respectively the same nominal value as $n'$ measuring frequencies $F_m$ selected from the $n$ measuring frequencies $F_j$, each frequency $F_{km}'$ being conditioned to be proportional to the controlled frequency $F's_k$ of the first complex local signal $S_k'$ corresponding to the same specific frequency $Fs_k$, according to a proportionality ratio equal to the ratio of the nominal values of the corresponding measuring frequency $F_m$ and of the specific frequency $Fs_k$, the real phases of each of the complex second signals $S_{km}'$ being capable of independent respective variations.

receiving for each specific frequency $Fs_k$, during the periods in which they are respectively transmitted, the waves $O_{km}$ radiated sequentially and recurrently by the transmitting station corresponding to the said specific frequency $Fs_k$ and having respectively the $n'$ measuring frequencies $F_m$, this reception being effected according to synchronous reception technique, utilising for each of the $n'$ waves $O_{km}$ the corresponding second complex local signal $S_{km}'$, and supplying respective residues $R_{km}'$ called sequential phase residues;

causing by using each sequential phase residue $R_{km}'$, the complex phase of the corresponding second complex local signal $S_{km}'$ to be equal to the phase of the sequential wave $O_{km}$ when and as received, except for a constant having the same value for all the second complex local signals $S_{km}'$ corresponding to the same measuring frequency $F_m$.

Thus, each receiver may process measuring frequencies $F_m$ in selected number, according to the degree of the desired removal of ambiguity. The values of the measuring frequencies $F_m$ selected being known, there are no particular difficulties in generating on reception the second complex local signals $S_{km}'$ whose frequencies have the same nominal value as the selected measuring frequencies. It is important that, at any instant, each frequency $F_{km}'$ should be made to be proportional to the controlled frequency $F'_{s_k}$ of the first complex local signal $S_k'$ corresponding to the same specific frequency $F_{s_k}$, according to a proportionality ratio equal to the ratio of the nominal values of the corresponding measuring frequency and of the specific frequency $F_{s_k}$. As will be seen later, this implies that the complex local signals of reception having the same index $k$ are connected in frequency.

The frequencies $F_{km}'$ of these signals $S_{km}'$ are then correct for permitting synchronous reception of the momentary waves $O_{km}$ as and when received. This results in the fact that the pass-band of synchronous reception of the momentary waves $O_{km}$ may be extremely narrow. In fact, a difference between a frequency $F_{km}'$ and the frequency of the corresponding wave $O_{km}$ can appear only because of disturbance in the propagation; this difference is therefore extremely slight practice.

The output signal of each synchronous detector is therefore a residue of phase $R_{km}'$ used for causing the complex phase of each second complex local signal $S_{km}'$ to be equal to the phase of the interrupted wave $O_{km}$ as and when received. This phase control may comprise a phase constant which should then have the same value for all the second complex signals $S_{km}'$ corresponding to the same measuring frequency.

The second complex signals $S_{km}'$ are therefore compelled to be the exact image in frequency and phase of the received interrupted waves $O_{km}$ when they are received. Furthermore, outside the time intervals of reception of these interrupted waves $O_{km}$, the second complex local signals $S_{km}'$ supply information practically equivalent to that which each interrupted wave $O_{km}$ would give if it were continuously transmitted, that is to say information taking into account the Doppler effect due to displacement of the moving object, and that by means of frequency setting which intervenes from the continuous wave $O_k$ having the same value of the index $k$.

The phase displacements existing between the second complex local signals $S_{km}'$ of the same index $m$, are representative of ambiguous information of the hyperbolic line of position of the receiver relative to the transmitting station $E_k$ having the specific frequencies $F_{s_k}$.

Such ambiguous information representative of the hyperbolic line of position may be used for example in any known manner for obtaining the position non-ambigously either by an operator or by automatic treatment.

The transmission according to the invention of a continuous wave on a specific frequency by each transmitting station is at the origin of most of the advantages of the new method of radio position-fixing. In fact, at the level of each receiver there is continuously available on this specific frequency information of the variation of the said specific frequency by Doppler effect in relation to the speed of displacement imparted to the receiver. The fact that this information is continuously present renders its utilisation possible at any instant, which is not the case with momentary and sequential signals, because of the transitory conditions of the electronic circuits.

This information of frequency variation has the same relation with respect to the phase variations as the speeds of displacement with respect to the positions or lines of position.

An integration of the information of frequency variation from a known position makes it possible in principle to know the position (or more exactly the lines of position) of the receiver at any instant, since this information of frequency variation is available at any instant. It therefore appears clear that in the present invention, the essential part on the radio position-fixing plane is played by the continuous waves having specific frequencies by reason of their permanent character.

The function of each interrupted wave having a measuring frequency is to supply momentarily phase information at recurrent instants. This interrupted phase information is used for correcting more or less rapidly the continuous phase information resulting from the aforesaid integration.

Other features and advantages of the invention will appear from the following detailed description of the invention with reference to the accompanying drawings given solely by way of non-restrictive example. In these drawings :

FIG. 2 is a graph illustrating on a part of the frequency axis an example of the distribution of 10 specific frequencies according to the invention;

FIG. 3 is a corresponding table with a time axis illustrating a period of a transmission programme of interrupted waves, given as example and for 10 transmitting stations;

Figure 24:
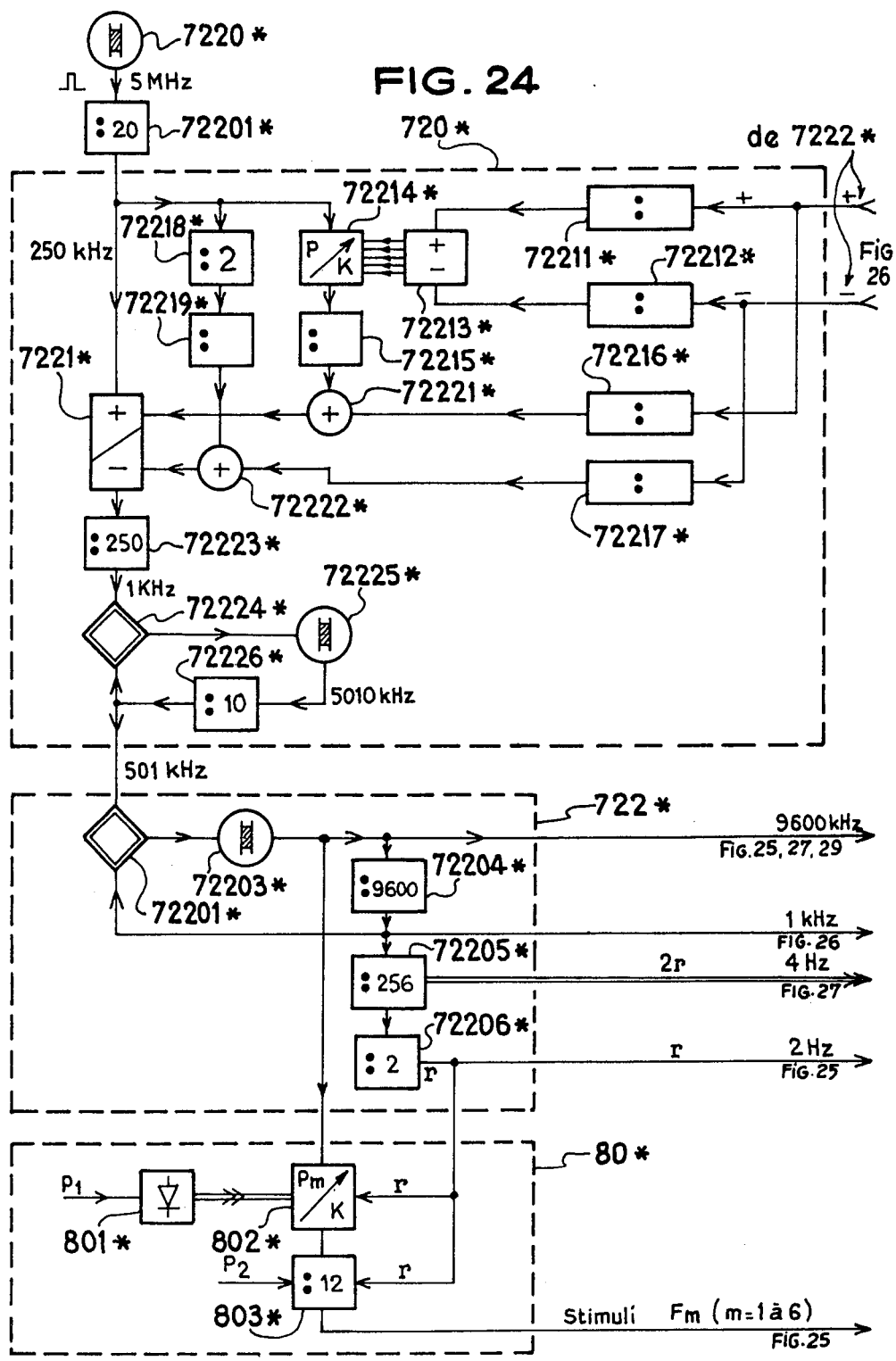
Figure 25:
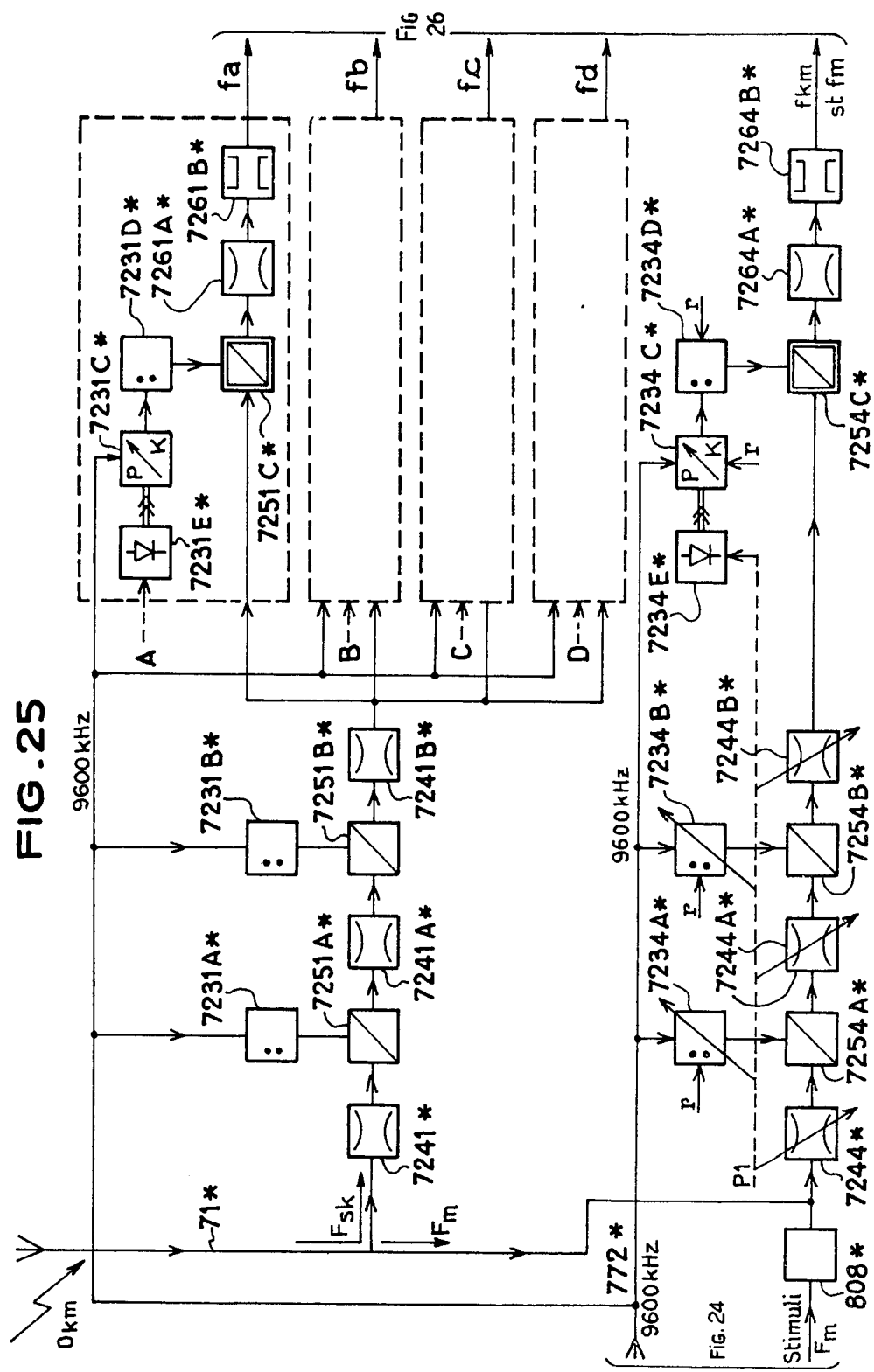
Figure 26:
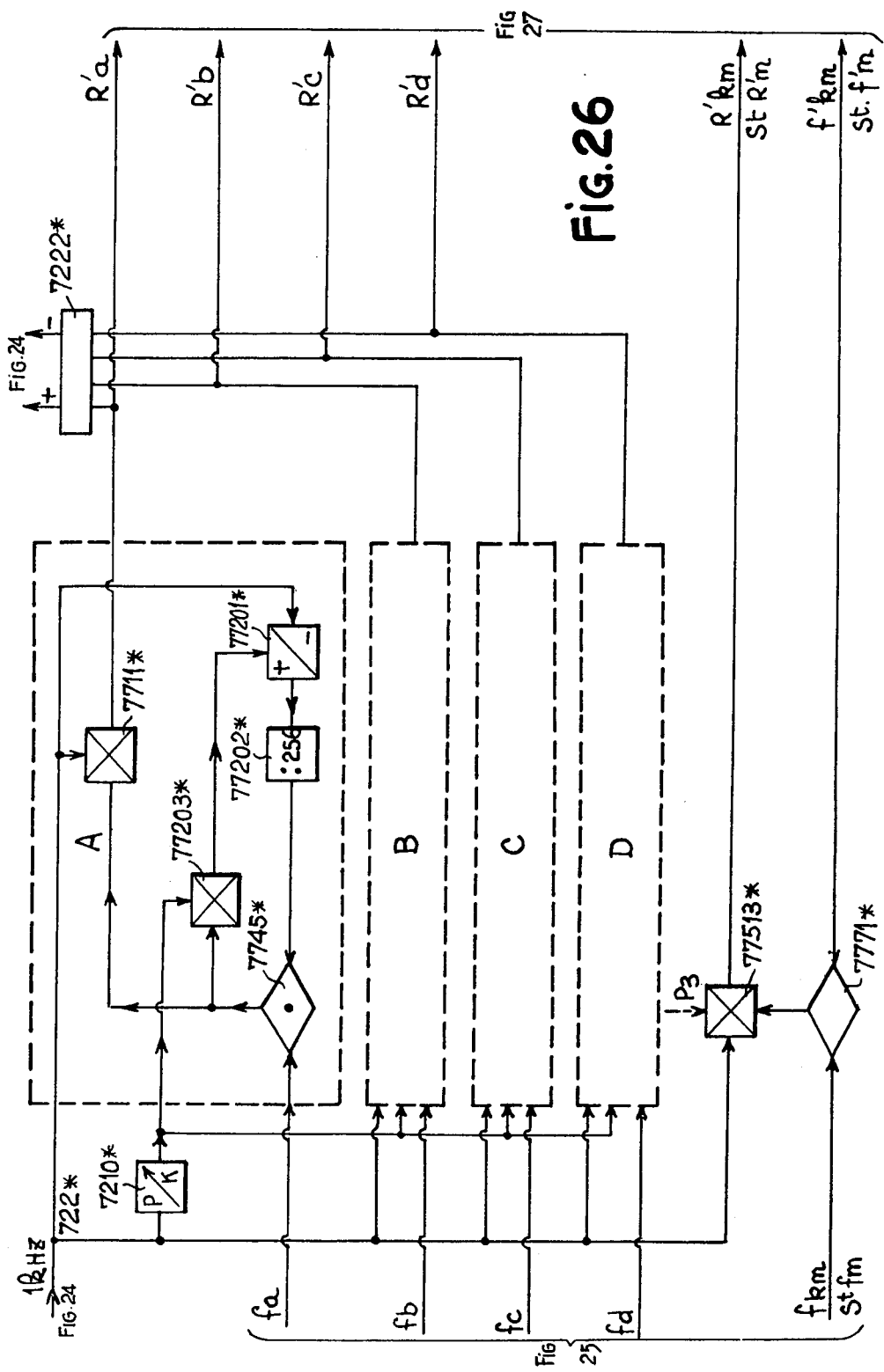
Figure 27:
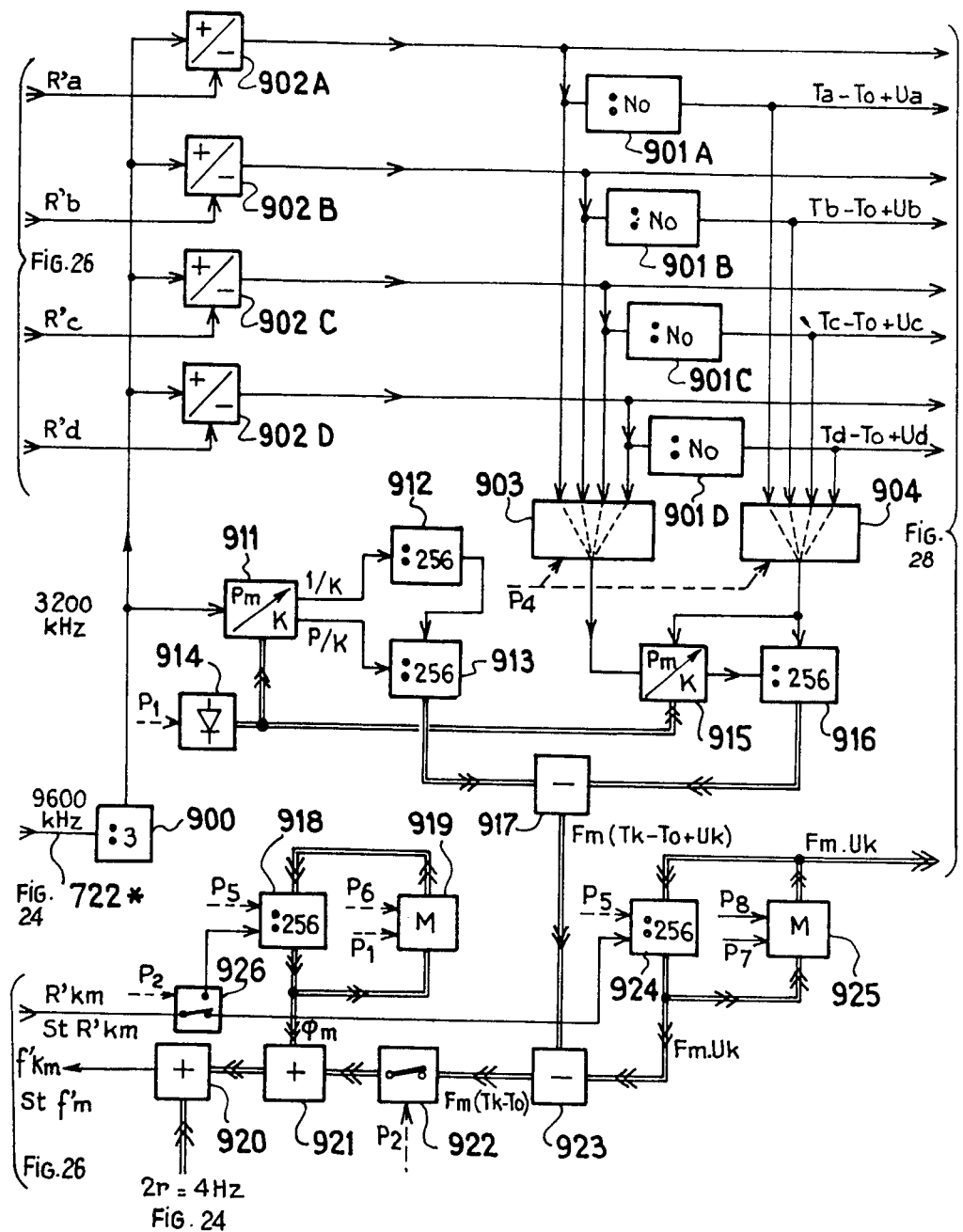
Figure 28:
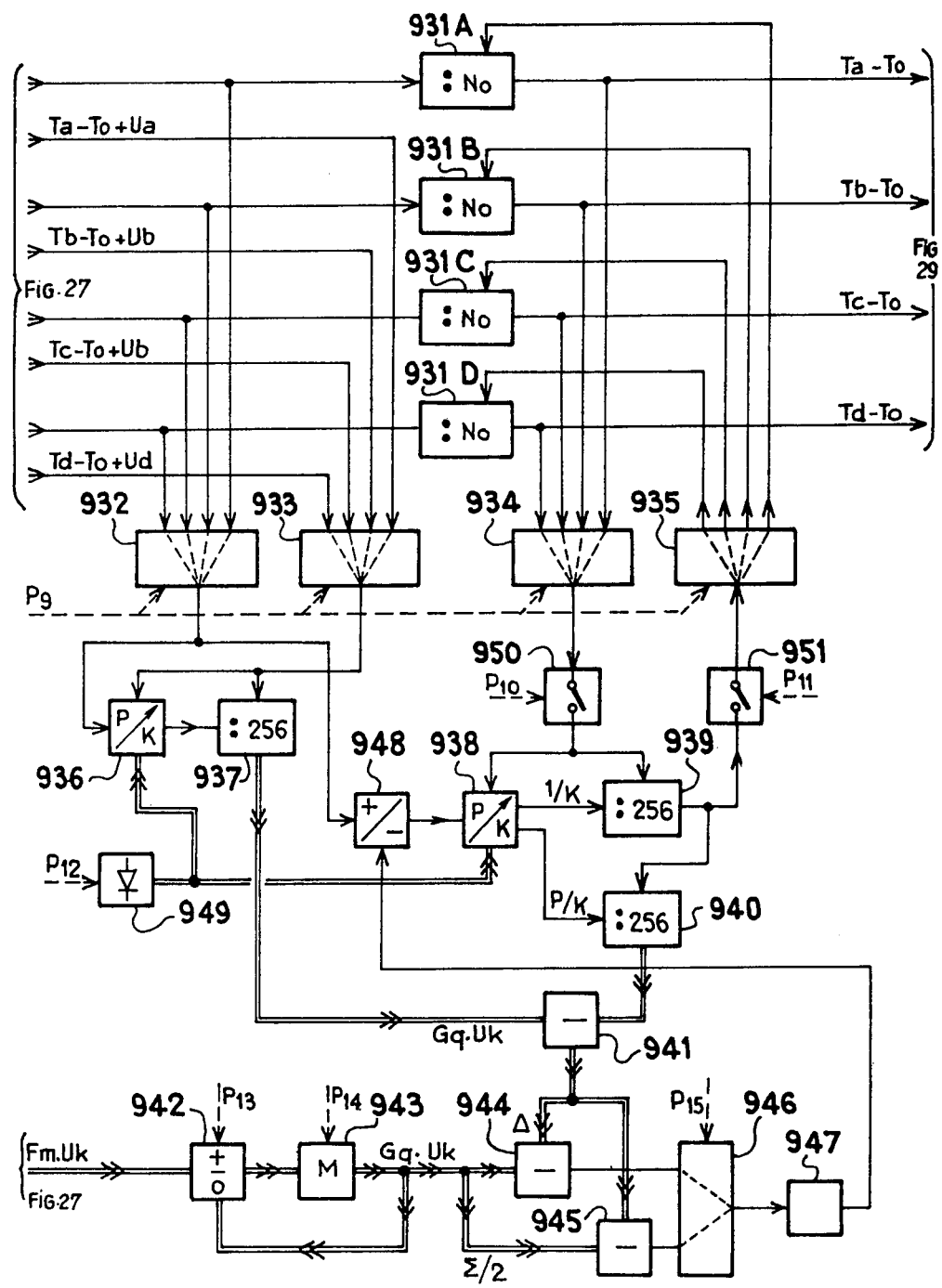
Figure 29:
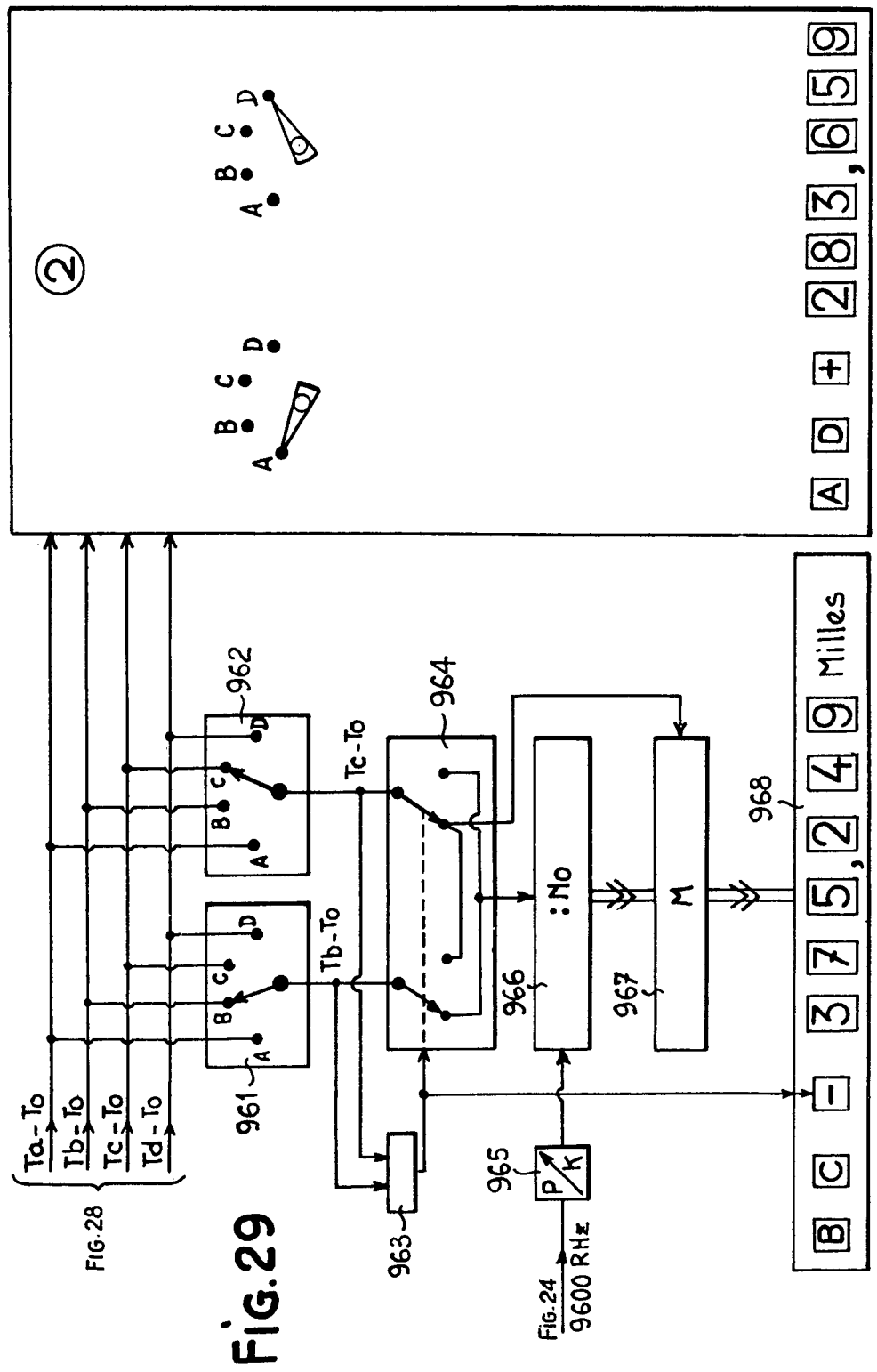
Figure 30:
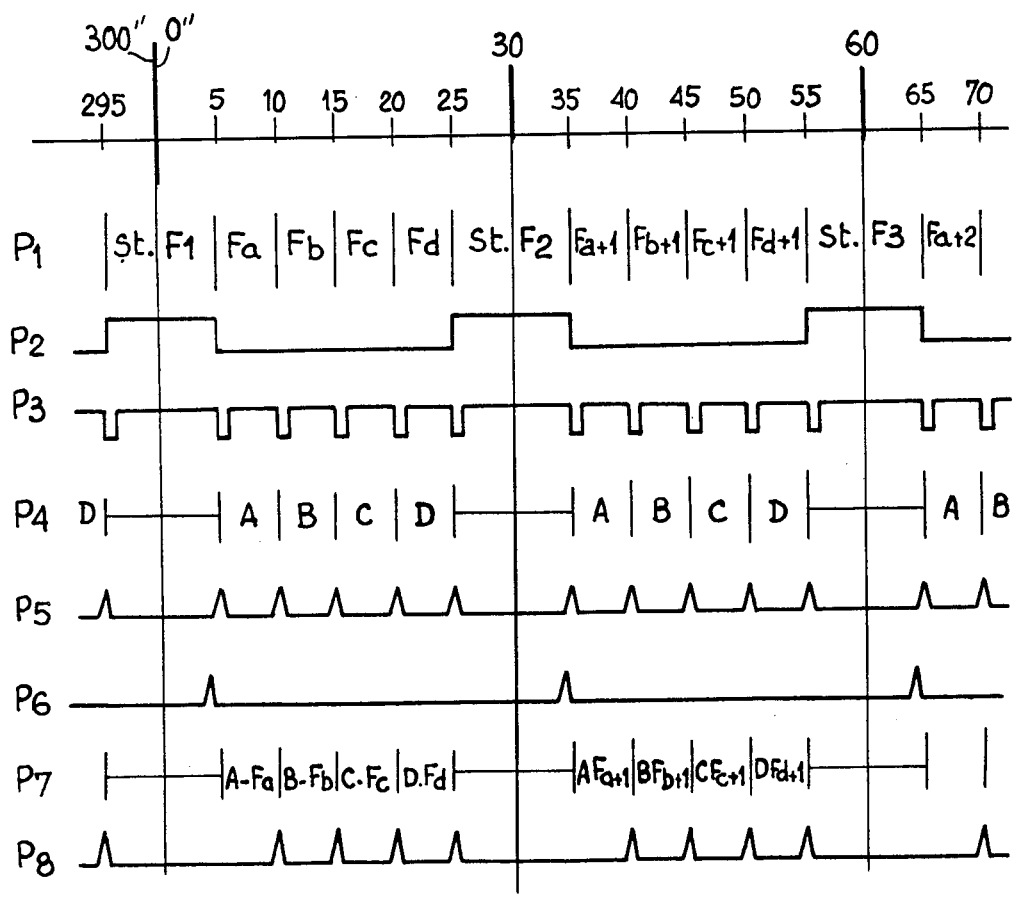
Figure 31:
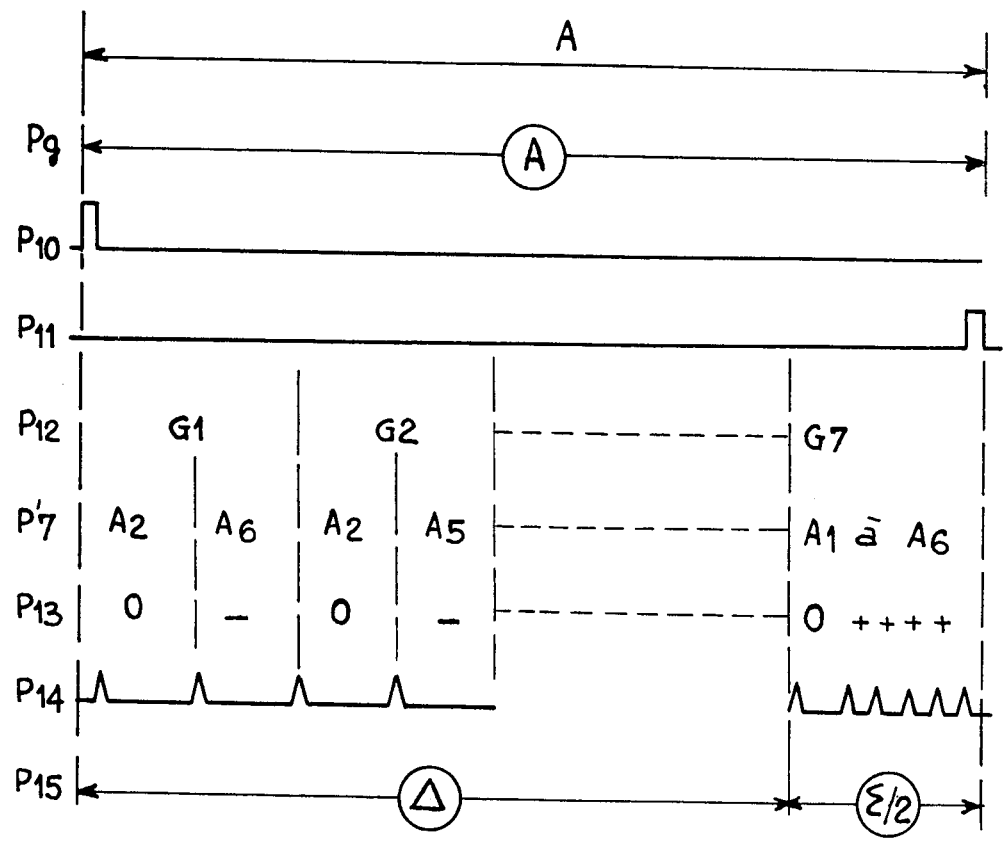

FIGS. 24 to 31 illustrate in detail a greatly preferred modification of the second embodiment of the receiver according to the invention, FIG. 24 concerning the detailed circuit diagram of the frequency generators, FIG. 25 that of the frequency changes, FIG. 26 that of the synchronous detections and frequency controls, FIG. 27 concerning the detailed diagram of the circuits processing the single components of the second local signals and carrying out the phase controls, FIG. 28 concerning the detailed diagram of the ambiguity removing circuits, FIG. 29 the diagram of the output circuits, and FIGS. 30 and 31 being graphs illustrating programme signals respectively for FIGS. 24 to 27 and for FIG. 28.

A particular method of radio position-fixing according to the present invention will now be described more specifically with reference to FIGS. 1 to 3.

Figure 1:
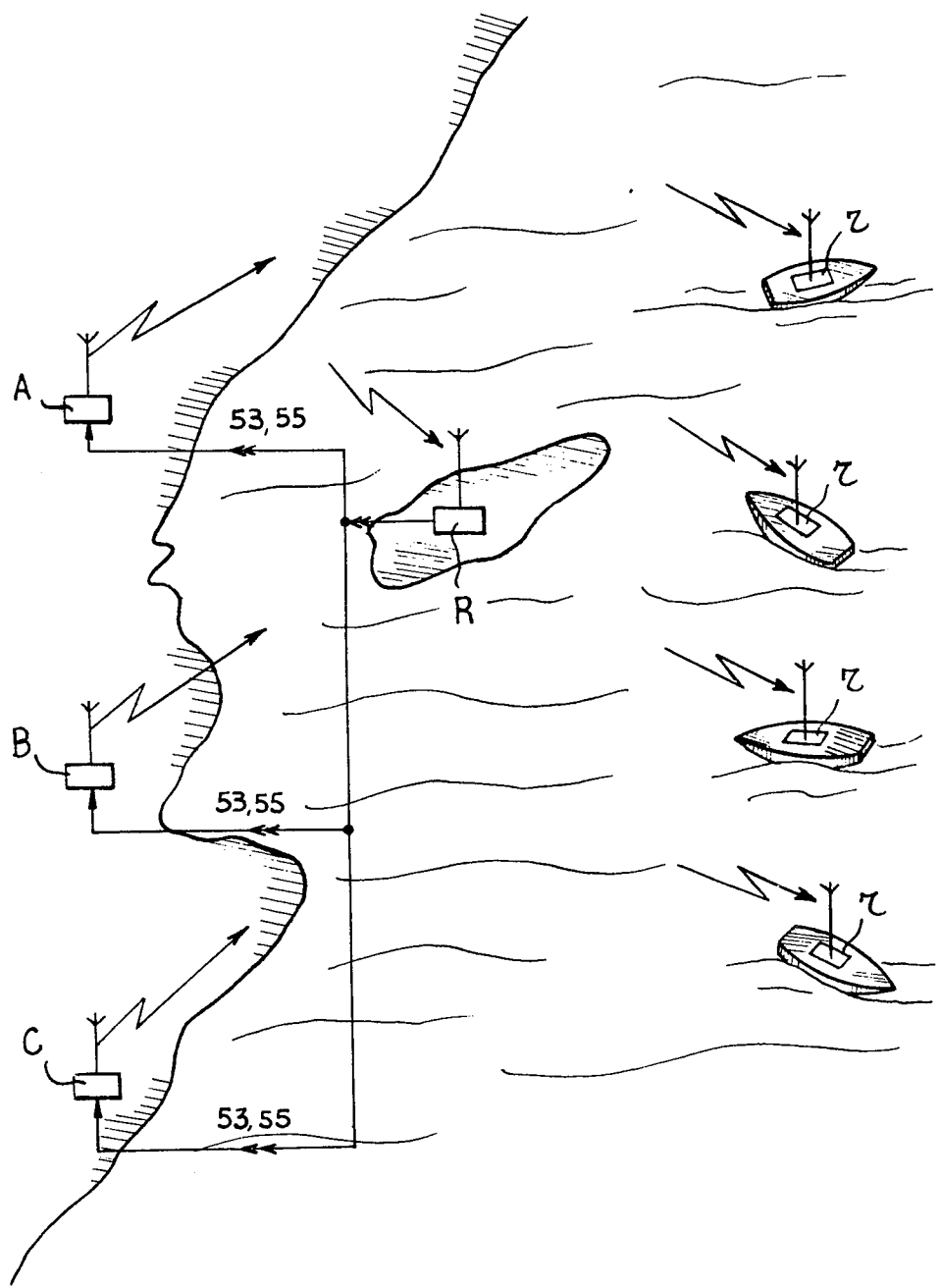
FIG. 1 is a diagrammatic sketch illustrating generally the transmission installations with their interconnections and radio position-fixing receivers.

FIG. 1 shows diagrammatically three transmitting stations A, B and C. It is known that two transmitting stations are sufficient in a hyperbolic method of radio position-fixing for defining a position line. Three transmitting stations therefore permit a position to be obtained. It will be noted that if position-fixing is to be carried out with three coordinates, not three but at least four transmitting stations are necessary for determining a position. In what follows in this detailed description, it will be assumed that three transmitting stations permit the determination of a position.

FIG. 1 also shows a listening station R and a plurality of moving receivers r. The number of moving receivers is not limited, which is generally expressed by qualifying a method of radio position-fixing as being "non-saturable."

The listening station R shown is connected by any suitable means to the transmitting stations A to C for maintaining a known phase relationship between the different waves sent out by these stations. In FIG. 1, lines 53 to 55 constitute a diagrammatic representation of these links. Their function according to the present invention will be explained later.

In what follows in this description, the transmission installations are assumed to be fixed. It will be understood that all or some of them could be moving for certain applications. For a non-saturable method of radio position-fixing, it will suffice if their position is known with sufficient precision. The position of the transmission installations should be fully defined, at least relatively to the geographical region in which the receivers are moving.

The transmission installations comprise a chain of transmitting stations at least equal to two in number and having different specific frequencies, for forming a radio position-fixing chain.

It is very advantageous to provide at least one listening station for one chain of transmitting stations.

All the listening stations associated with a chain of transmitting stations are so controlled that each transmitting station of the chain is received by at least one listening-station. Each listening station therefore receives the momentary waves of certain transmitting stations. To the extent that the listening station is fixed relative to the transmitting stations, there is no Doppler effect problems for reception at the level of this listening station. Consequently, this listening station may be equipped with a relatively simple receiver of sufficient precision.

In a first type of transmission installation (not shown), the listening stations may re-transmit reference information for all the radio position-fixing receivers, in a region whose range should be substantially equal to that of the transmitting stations to which the retransmission of the reference information relates (bisignal method of radio position-fixing).

In a second type of transmission installation (FIG. 1), the listening stations may be connected to the transmitting stations for transmitting to them control information intended to maintain the sequential waves radiated by the various transmitting stations in known phase relationships, advantageously fixed, for each of the measuring frequencies (monosignal radio position-fixing method).

There will now be described two slightly different examples of particular radio position-fixing chains according to the invention. In both cases, the nominal values of the frequencies transmitted are strictly defined, that is to say they have very precise values. In the first, denoted by I, which corresponds to the first embodiment of receiver described later, the values of the frequencies comprise numerous significant figures, generally different from zero. In the second, denoted by II, which corresponds to the second embodiment of receiver and its highly preferred modification, which will be described later, the nominal values of the frequencies are close to the first but are strictly equal to round values.

In each case, the measuring frequencies $F_j$, that is to say those transmitted sequentially successively for each of the transmitting stations, but only one at a time, are 6 in number and have the values of the following table:

| j | I - $F_j$ (kc/s) | II - $F_j$ (kc/s) |
|---|---|---|
| 1 | 332.015703 | 332 |
| 2 | 406.006566 | 406 |
| 3 | 392.086897 | 392 |
| 4 | 403.130494 | 403 |
| 5 | 405.250357 | 405.250 |
| 6 | 405.846835 | 405.750 |

It should be noted that the above "measuring" frequencies have been given this designation because their values define the sensitivity factors of the phase measurements. However, phase measurements having this sensitivity will be made for the most time on signals of low frequencies less than the measuring frequencies, as will be seen later.

FIG. 2 illustrates diagrammatically on a selected portion of the frequency axis, the position of the specific frequencies continuously transmitted according to the invention at the rate of one by each transmitting station. These specific frequencies $Fs_i$ have been selected by way of example as 10 in number, and are distributed in the band situated between the measuring frequencies $F_6$ and $F_2$. Of course, there is no need for geographical correspondence between the values of the specific frequencies and the geographical position of the corresponding transmitting stations. The values of the frequencies $Fs_i$, expressed in kilocycles, may be established as follows:

| i | I - $Fs_i$ (kc/s) | II - $Fs_i$ (kc/s) |
|---|---|---|
| 1 | 405.860934 | 405.781250 |
| 2 | 405.875114 | 405.796875 |
| 3 | 405.889377 | 405.812500 |
| 4 | 405.903724 | 405.828125 |
| 5 | 405.918156 | 405.843750 |
| 6 | 405.932673 | 405.859375 |
| 7 | 405.947276 | 405.875000 |
| 8 | 405.961966 | 405.890625 |
| 9 | 405.976744 | 405.906250 |
| 10 | 405.991610 | 405.921875 |

An example will now be described of the distribution in time of the waves transmitted on the measuring frequencies (or transmission programmes) for a radio position-fixing chain having 10 transmitting stations ($i$ varying from 1 to 10).

Each transmitting station $E_i$ radiates repetitively the interrupted waves $O_{ij}$, the index $i$ being the same as that of the transmitting station. Each wave $O_{ij}$ has an index $j$ corresponding to one of the aforesaid measuring frequencies $F_j$ ($j = 1$ to 6). Transmission is according to the transmission programme illustrated by FIG. 3. In this figure, the time is shown diagrammatically on a time axis graduated in minutes and half-minutes. The half-minute (30 seconds) is the elementary duration of transmission of the measuring frequencies. The transmission programme shown in FIG. 3 is drawn up for the case where the number of transmitting stations is equal to 10. In the particular embodiment illustrated in this figure, each transmitting station transmits successively the measuring frequencies $F_1$ to $F_6$ during the elementary periods of 30 seconds. The transmission is displaced by an elementary period or passing from one transmitting station to that of the line immediately following in the table of FIG. 3.

A necessary condition for permitting each frequency to be transmitted by only one transmitting station at a time is that the duration of the sequence or transmission cycle is at least 10 times 30 seconds, that is to say 5 minutes. For the programme shown in FIG. 3, this period is effectively equal to 5 minutes.

It is clear from FIG. 3 that the transmission programme is obtained by carrying out a circular substitution from the first line of the table of this figure. It is obvious that any other distribution permitting each measuring frequency to be transmitted by only one station at a time, that is to say, it should be present in only one square of a column of the said table, comes within the scope of the present invention. If the number of measuring frequencies is very much less than that of the transmitting stations, it may be advantageous for the measuring frequencies not to be transmitted in close succession by each transmitter. This makes it possible in effect to ensure that in a given geographical zone, the interrupted waves of interest to a receiver are received at the rate of one at a time.

Embodiments of transmission installations will now be described with reference to FIGS. 4 to 6.

Figure 4:
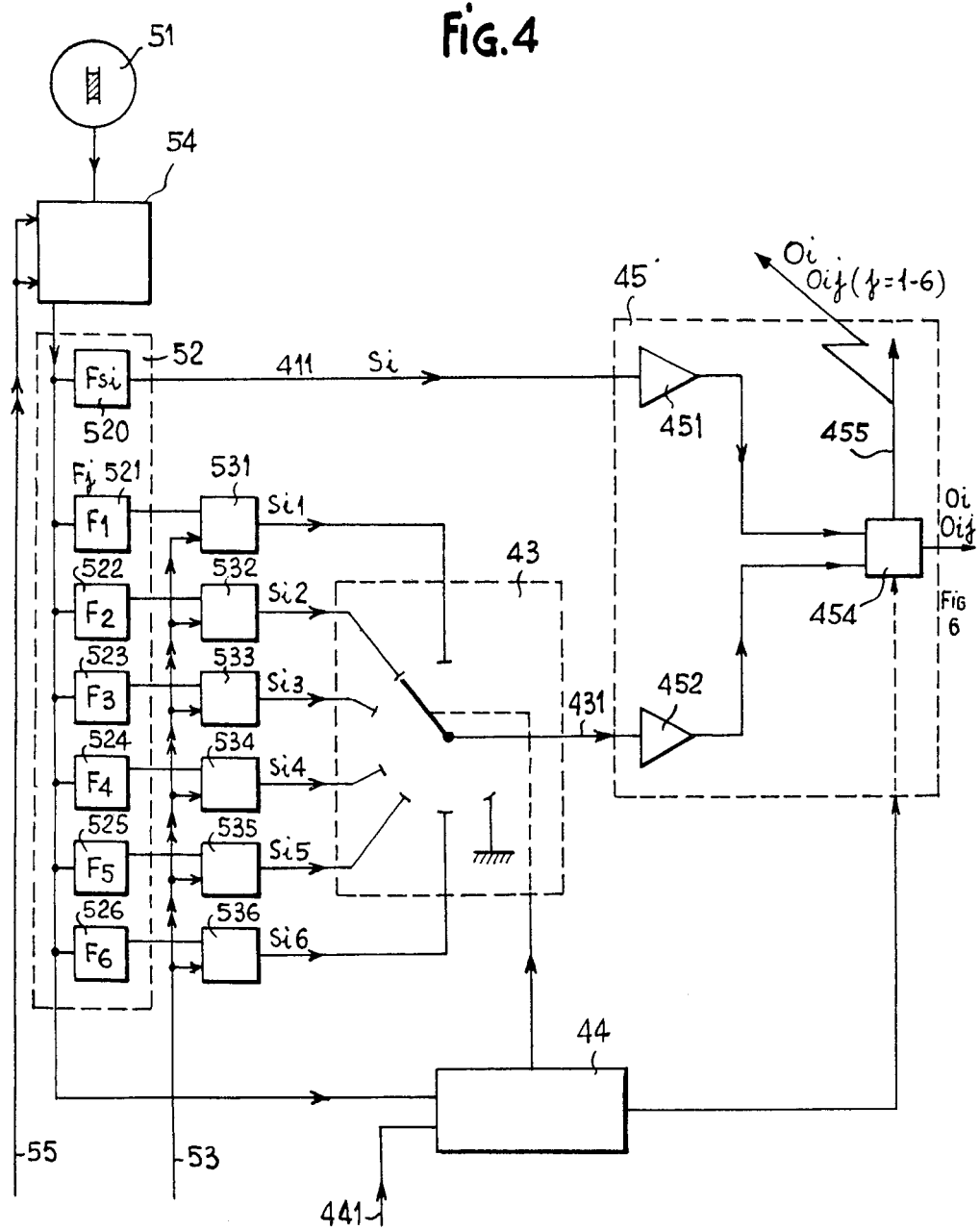
FIG. 4 is the basic circuit diagram of an embodiment of a transmitting station according to the invention.

FIG. 4 shows the basic circuit diagram of one embodiment of a transmitting station according to the invention. It will be recalled that the value of the index $i$ is fixed for a given transmitting station $E_i$.

The transmitting station of FIG. 4 comprises a single source formed by a free oscillator 51, whose output is connected to a frequency setting circuit 54 adapted to modify within predetermined limits the frequency of the signal supplies by the oscillator 51. The output of circuit 54 supplies a frequency setting signal to a frequency supply center 52 supplying, on the one hand, from a circuit 520 to a line 411 a first local signal $S_i$ having the specific frequency $Fs_i$, and on the other hand from circuits such as 521 to 526 second local signals $S_{ij}$ having the measuring frequencies $F_j$ ($j = 1$ to 6). Phase-shifting circuits such as 531 to 536 are interposed respectively in the outputs of the frequency supply center 52 supplying the measuring frequencies $F_j$ ($j = 1$ to 6) for adjusting the phase of the second local signals $S_{i1}$ to $S_{i6}$.

The frequency setting circuit 54 is connected to a frequency setting control line 55. Line 55 permits frequency setting to be controlled for all the frequencies, including the specific frequency $Fs_i$ and the measuring frequencies $F_j$ ($j = 1$ to 6). The phase-shifters 531 to 536 permit the adjustment of the phase of the second local signals $S_{ij}$, hence each of the interrupted waves $o_{ij}$ transmitted by the transmitting station, for obtaining between all the transmitting stations the aforesaid known phase relationship, advantageously fixed for each measuring signal (monosignal method of radio position-fixing).

The second local signals $S_{ij}$ ($j = 1$ to 6) present at the outputs of the phase-shifters 531 to 536 are transmitted separately to an electronic switching circuit 43 shown diagrammatically in the dashed line box in FIG. 4. The earthed connection of the switch 43 represents the absence of transmission of any wave $O_{ij}$ on a measuring frequency by the transmitting station. The switch 43 shown is such that its output 432 at any instant is connected to only one of its inputs. The switching operations are controlled by a programme circuit 44, shown diagrammatically in the interior of the switch 43 by a short-dashed line. The programme circuit 44 is capable of effecting, as a function of the time, in the switch 43 the connections corresponding for example to those which are shown in one of the lines of the table of FIG. 3. For this purpose, it receives time information coming from the frequency center 52, for example, as shown in FIG. 4. This supplies a very stable chronometric standard which, for supplying the time on the macroscopic scale is divided in the manner known per se. The setting of the programme circuit 44 to time, which may be done once and for all, may also be effected or corrected by means of an input 441, for example by manual intervention on a display device or by a time-keeper (not shown) or again from time signals.

The output 411 of the frequency center 52 and the output 431 of the electronic switch 43 are routed separately to the inputs of a transmission circuit 45 comprising amplification means 451 and 452 respectively for the continuous first local signal $S_i$ from circuit 520, and for the second local signals $S_{ij}$ supplied sequentially by the switch 43. The transmission circuit 45 also comprises a mixing and aerial tuning circuit 454 with an aerial 455 for reuniting the output signals of the amplification means 451 and 452, for thus continuously transmitting a wave $O_i$ having the specific frequency $Fs_i$, and waves $O_{ij}$ ($j = 1$ to 6) having the measuring frequencies in an interrupted and recurrent manner, according to the programme controlled by the circuit 44.

Figure 6:
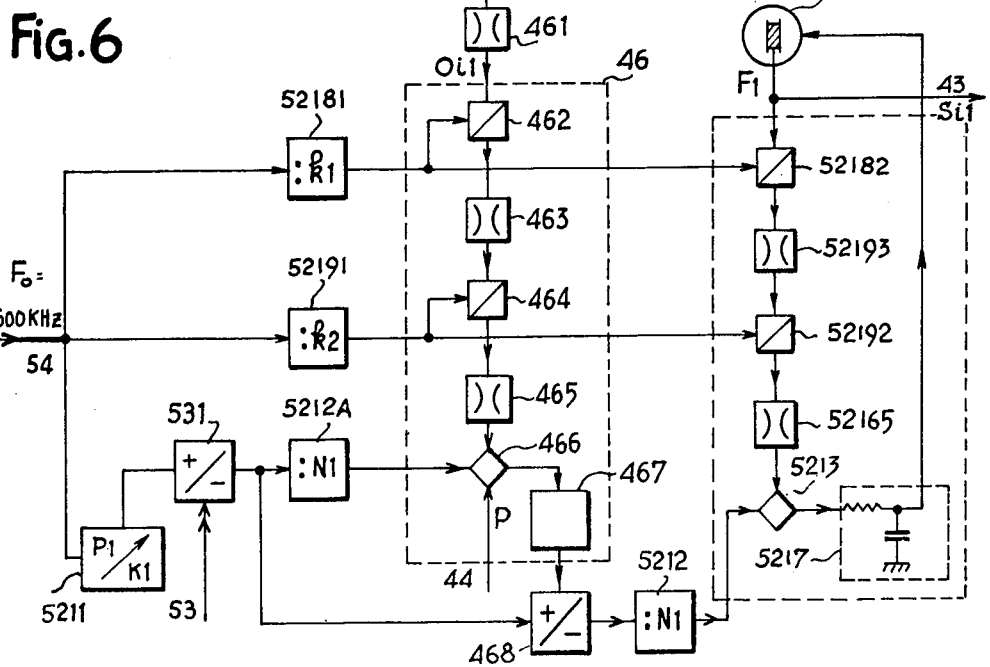
FIG. 6 illustrates the detailed diagram of an embodiment modification of the circuit 521 of FIG. 5.

For the embodiment of FIG. 6, the circuit 454 comprises in addition an output for supplying the signals proportinal to the transmitted waves ($O_i$; $O_{ij}$), for example by means of a capacitor of low capacitance connected to the base of the aerial.

In FIG. 4, the switch 43 and the transmission circuit 45 are shown in an arrangement such that at the most a single measuring frequency is transmitted at each instant by a transmitting station. It is obviously also within the scope of the present invention to provide transmitting stations in which a number of measuring frequencies are transmitted at a time. Likewise, it is possible to provide a transmission programme in which, in the time interval separating two transmissions of an interrupted wave on the same measuring frequency by the same transmitting station, only some of the other measuring frequencies form the subject of a transmission of interrupted waves. As previously stated, the fundamental condition is that, for a given chain, there are never two transmitting stations which, at the same time, radiate a interrupted wave on the same measuring frequency.

Furthermore, FIG. 4 shows a transmission circuit 45 comprising only one aerial. In what follows, it should be understood that a modification of the invention consists in using two separate aerials for radiating respectively the permanent waves and the interrupted waves, or more generally, aerials of a number at the most equal to the maximum number of different frequencies capable of being transmitted simultaneously.

An example of a detailed embodiment of the frequency setting device 54 is illustrated in FIG. 24 and will be described later in the context of the receiver. It will merely be noted that it supplies a very stable frequency equal to 9.6 Mc/s for frequency values of group II and 5 Mc/s for frequency values of group I.

Figure 5:
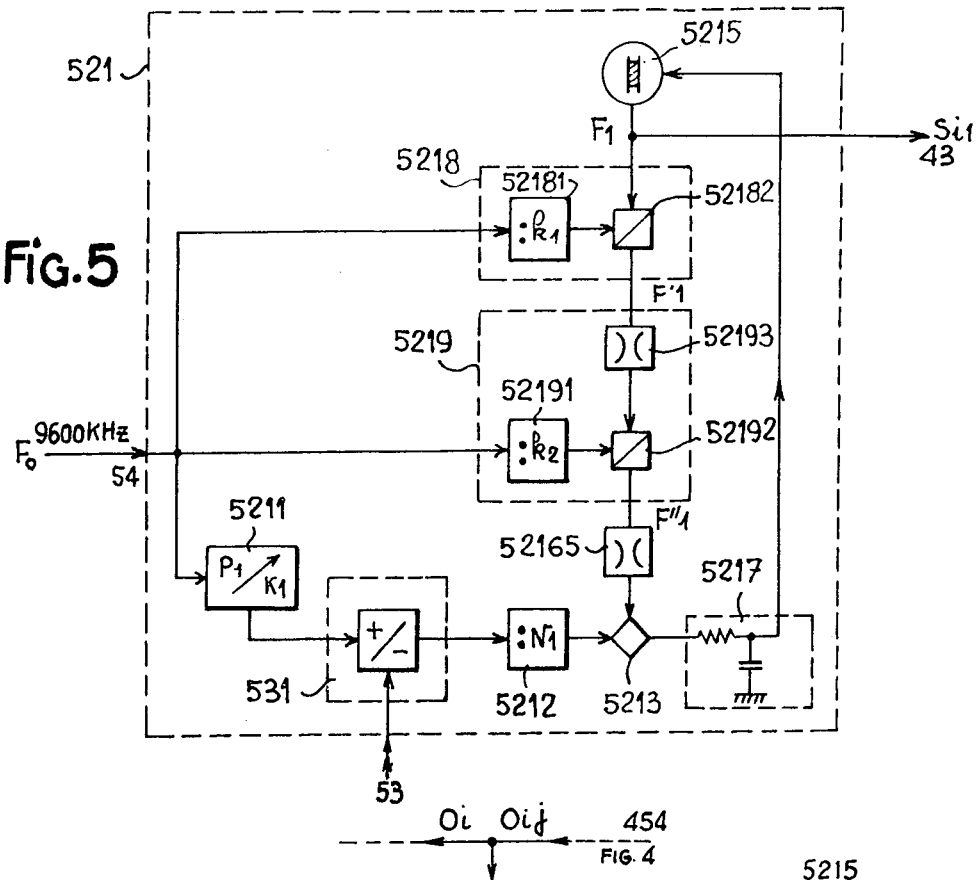
FIG. 5 is a detailed diagram of an embodiment of the circuit 521 of FIG. 4.

A detailed embodiment example of the circuit 521 of the frequency center is illustrated in FIG. 5 and will be described in the following.

It will first be recalled that to obtain in a frequency center a frequency of desired value with high stability, it is known to use an oscillator tuned to this desired frequency and to control it relative to a frequency source of high stability.

It is therefore necessary to compare a frequency derived from the oscillator concerned with a frequency derived from the frequency source. Currently, synthesisers are the most flexible means for making such a comparison. However, their output noise, taking into account the limitations on their input frequency, render them practically useless for the frequencies of the particular radio position-fixing chain described in the foregoing, which frequencies range from 332 to 406 kc/s.

In Appendix A to application Ser. No. 316,428, now U.S. Pat. No. 3,983,559 issued Sept. 28, 1976, frequency-changing means are proposed for use at high frequencies taken from a predetermined range, with heterodyne frequencies derived from a single source of high stability.

In Appendix A of said above-mentioned patent there is described in particular a stage type of frequency changing comprising, on the one hand, means for dividing the frequency of a source of high stability for supplying a heterodyne frequency taken from successive multiples of a frequency value $f$, the value $f$ being associated with the frequency-changing stage, and on the other hand a circuit for mixing the input signal with the selected heterodyne frequency. Filtering means are possibly also provided.

The heterodyne frequency is taken from the said multiples such that the output signal of the mixing circuit has a frequency of between $f/2$ and $f$.

Preferably, the successive multiples of the frequency value $f$ associated with the frequency changing stage are selected from the multiples passing from the order 2 to the order 6; they therefore constitute a sub-group of the group of multiples $2 \cdot f$, $3 \cdot f$, $5 \cdot f$, $6 \cdot f$. It will be assumed that such is the case in what follows in the present description.

The equivalent of the frequency source of Appendix A of said above-mentioned patent is formed by the source 51 and the frequency setting circuit 54 of FIG. 4. On the contrary, the oscillators intended to process the frequencies to be transmitted ($Fs_i$ and $F_j$) must be considered as supplying input signals for the frequency changes described in the said Appendix A of the above-mentioned patent.

The signal supplied by each oscillator serves to control that oscillator. It is therefore desirable that each signal produced by an oscillator has its own frequency-changing route to avoid mixing two control magnitudes.

On the contrary, the source of the very stable frrequency $F_o$ (circuits 51 and 54) is the same for all the signals of the oscillators. Each heterodyne frequency, for a frequency-changing route intended for a transmission frequency amongst $Fs_i$ and $F_j$, is given by a division factor of the frequency F.

The circuits such as 521 (FIGS. 4 and 5) producing the measuring frequency $F_1$ will now be considered again. It will be borne in mind that each transmitting station comprises six circuits of this type for respective measuring frequencies $F_1$ to $F_6$, and another for a specific frequency $Fs_i$.

The value of the frequency is to transmitted is different for each of these circuits. The application of the teaching of Appendix A of the above-mentioned patent becomes clear on taking the whole of these circuits, although only the circuit intended for the measuring frequency $F_1$ will be described in detail with a view to simplification.

The predetermined frequency range containing the frequencies to be transmitted for the particular radio position-fixing chain extends from 332 to 406 kc/s.

It has been assumed that the upper limit of the predetermined frequency range is at the most equal to $6 \cdot f_1$, the value of frequency $f_1$ being associated with a first frequency changing stage. It is therefore necessary that the value of frequency $f_1$ should be at least equal to 406: 6 = 67.6 kc/s. By way of example, it will be assumed that the value of frequency $f_1$ is equal to 80 kc/s.

Consequently, multiples of the order of 4, 5 and 6 of the frequency $f_1$, that is to say heterodyne frequencies 320 kc/s, 400 kc/s, suffice to produce a first frequency change on any frequency selected from the predetermined range from 332 to 406 kc/s, by obtaining at the output of this first frequency-changing stage an output frequency comprised between 40 and 80 kc/s, the heterodyne frequency being selected from the above-mentioned multiples of $f_1$.

This selection explained in the aforesaid Appendix A of the above-mentioned patent is made as follows: the heterodyne frequency is selected to be equal to the multiple of $f_1$ which is the upper limit or lower limit of the interval in which occurs the selected frequency of the input signal of the change of frequency in the predetermined range depending on whether this selected frequency of the input signal is situated in the lower or upper half respectively of the said interval.

In FIG. 5, a first frequency-changing type 5218 receives an input signal from an oscillator 5215 of the controlled type; this input signal should have a frrequency equal to the measuring frequency $F_1$.

The heterodyne frequencies are derived from the frequency $F_o$ supplied by the frequency-setting circuit 54. This frequency $F_o$ is supposed to be equal to 9,600 kc/s. The frequency $F_o$ is applied to a divider-counter 52181 of the frequency changing stage 5218. The output of the divider-counter 52181 provides a heterodyne signal $H_1$ which is applied to a mixer 52182.

In the particular radio position-fixing chain of group II, the frequency $F_1$ applied to the input of the mixer 52182 has the value 332 kc/s. This frequency is situated in the first half of the interval $(4 \cdot f_1, 5 \cdot f_1)$, that is to say 320 kc/s to 400 kc/s. Consequently, the division factor $k_1$ of the divider-counter 52181 should be such that its output frequency $H_1$ is equal to the lower limit of this interval $(4 \cdot f_1, 5 \cdot f_1)$, namely 400 kc/s.

It will be immediatey seen that for other values of input frequency to be transmitted, i.e. in the circuits such as 520, 522 and others, the heterodyne frequency may be equal to another multiple of the value of frequency $f_1$. The division factors $k_1$ of the respective first frequency-changing stages may be different, but the frequency $f_1$ associated with these first stages is always the same.

Consequently, for a frequency $f_1$ equal to 80 kc/s, it is necessary to have available at the output of circuit 54 a frequency $F_o$ making it possible, by frequency division to obtain multiples of the order of 4, 5 and 6 of the frequency $f_1$. The value of the frequency $F_o$ should therefore be equal to or a multiple of 4.8 Mc/s. It will be noted that the value of $F_o$ mentioned above, i.e. 9.6 Mc/s is perfectly suitable.

It will now be understood that whatever may be the frequency to be produced in the frequency group comprising a specific frequency $Fs_i$ (having a predetermined value of $i$) and the measuring frequencies $F_j$ ($j =$ 1 to 6), a first frequency-changing stage such as 5218 having a heterodyne frequency selected as indicated in the foregoing from multiples of $f_1$ equal to 320 kc/s, 400 kc/s and 480 kc/s, supplies an output signal whose frequency lies between 40 and 80 kc/s.

Therefore, reverting to the circuit 521 of FIG. 5 concerning the measuring frequency $F_1$, the output frequency of the first frequency-changing state 5218 is comprised between 40 and 80 kc/s. Of course, it is the same for all the first stages such as 5218 used respectively for processing the other frequencies to be transmitted. In present day technology, a frequency of between 40 to 80 kc/s cannot be supplied with acceptable noise by the output of a synthesiser followed by a frequency divider, that is why the circuit 521 of FIG. 5 comprises a second frequency-changing stage 5219 comprising in the same way as the first a divider-counter 52191, a mixer 52192 with in addition the filter 52193. In manner known per se, the filter 52193 allows the passage to the mixer of stage 52192 of only the useful signal for this frequency-changing stage. It will be noted that there is normally no frequency image problem in the devices of FIG. 5, because the input signal is a pure sinusoidal local signal, contrary to what was the case in Appendix A of the above-mentioned patent.

Taking into account the frequency range of 40 to 80 kc/s and the possibilities of the synthesisers, the second frequency-changing stages such as 5219 are associated for example with a frequency value $f_2$ equal to 16 kc/s, that is to say one-fifth of the maximum of the frequency range. Other frequency values $f_2$ for the second stages are given in Appendix A of the above-mentioned patent, regarding which it will be remarked that the numerical values defining the frequency ranges of the successive frequency-changing stages are the same as in the present specification.

In the present case, the division factor $k_2$ of the counter-divider 52191 is selected for supplying one of the multiples of the order of 4 and 5 of the frequency $f_2$ equal to 16 kc/s. These multiples are 64 kc/s and 80 kc/s.

It has been previously seen that the frequency $F_1$ is equal to 332 kc/s, and that the heterodyne frequency of the first stage 5218 of FIG. 4 is equal to 400 kc/s. It therefore occurs that the frequency $F'_1$ of the useful output signal of the first stage 5218 is equal to 68 kc/s.

The value of frequency $f_2$ associated with the second frequency-changing stage is 16 kc/s; the multiple $4 \cdot f_2$ is equal to 64 kc/s, whereas the multiple $5 \cdot f_2$ is equal to 80 kc/s. The input frequency of the second stage 5219, which is equal to 68 kc/s, is in the lower half of the interval $(4 \cdot f_2, 5 \cdot f_2)$. The heterodyne frequency of the second stage 5219 is therefore equal to the upper limit $5 \cdot f_2$ of this interval, i.e. 80 kc/s. The division factor $k_2$ of the counter-divider 52191 is then equal to 120, the frequency to be applied to it being 9.6 Mc/s.

Under these conditions, the frequency signal $F''_1$ available at the output of stage 5219 (or at the output of the filter 52165 which follows immediately this second stage), has, therefore, a frequency equal to 12 kc/s; generally, the output frequency of the second stages such as 5219 is between 8 and 16 kc/s.

The frequency $F''_1 = 12$ dc/s is applied to a detector 5213, the function of which is frequency difference detection and which is in the form, for example, of a phase detector. The other input of the detector 5213 receives a signal supplied from the frequency $F_o = 9.6$ Mc/s by a synthesiser 5211 followed by a counter-divider 5212.

A synthesiser possesses by construction a characteristic number K and is capable of supplying at its output a multiple of order $p$ of the sub-multiple of order K of the frequency $F_o$ applied to its input. Such a synthesiser may be used in two ways: either preregulated, in which case the order of the multiple $p$ is fixed by construction of the circuit, or the order of the multiple $p$ is adjustable in a controlled manner, for example in response to numerical information.

The maximum value of the frequency $F''$ capable of being applied to the detector 5213 is 16 kc/s. The division factor of the divider-counter 5212 is therefore advantageously selected equal to 600, such that maximum regulation of the synthesiser 5211 enables a frequency, which is equal to 16 kc/s, to be obtained from the frequency $F_o = 9.6$ Mc/s.

The frequency $F''_1$ is equal to 12,000 c/s. From this value follows the preadjustment of the number $p_1$ of synthesiser 5211, so that a frequency equal to 12,000 c/s will be available at the output of the divider-counter 5212.

On the contrary, the characteristic number $K_1$ common to synthesisers such as 5211 depends on the resolution with which the frequencies to be transmitted ($Fs_i$ and $F_j$) are defined. Among the frequencies of group II, the measuring frequencies $F_j$ are all multiples of 250/16 c/s. It follows that the number K1 of the synthesisers allotted to the measuring frequencies is equal to $16000/250 = 64$, while the number K1 of the synthesisers allotted to the specific frequencies is equal to $64 \times 16 = 1024$.

For frequencies of group I, the number K1 of the synthesisers is much higher, the values indicated being multiples of 0.001 c/s.

The output of the detector 5213 is applied by means of a time constant circuit 5217 for controlling the oscillator 5215 such that the measuring frequency $F_1$ is connected to the very stable frequency F.

The output signal of the oscillator 5215 is used for supplying the measuring frequency $F_1$. It is furthermore known that each measuring frequency such as $F_1$ is subject to phase displacement in a circuit 531 before transmission. As shown in FIG. 5, the phase-shifting circuit 531 consists simply of a +/− box inserted between the synthesiser and the counter-divider 5212. The phase-shifting operation of the +/− box is due to the division factor N1. The output signal of the oscillator 5215 is transmitted directly to the switching circit 43 as second complex signal $S_{t1}$.

The control input of the +/− box receives phase control signals transmitted by a line 53. By means of the +/− box, it is possible to add or subtract (by inhibition) pulses to or from those supplied by a frequency source. The +/− box is advantageously constructed as indicated in FIGS. C7 to C9 of Appendix C of the above-mentioned patent. The output of the synthesiser of FIG. 5 corresponds to the HORLOGE (TIME) lines of FIGS. C7 and C9 of Appendix C of the above-mentioned patent.

A table will now be given summarising the embodiment of the circuits of the frequency centre of a transmitting station with the frequency values of the particular radio position-fixing chain of group II described in the foregoing. For the frequency values of group I, only the numbers $p$ and K, characteristics of the synthesisers, have been modified.

| kc/s | 1st stage $f_1 = 80$ kc/s | | | 2nd stage $f_2 = 16$ kc/s | | 3rd stage synthesiser |
|---|---|---|---|---|---|---|
| | $4f_1$ 320 kc/s | $5f_1$ 400 kc/s | $6f_1$ 480 kc/s | $4f_2$ 64 kc/s | $5f_2$ 80 kc/s | |
| $F_o = 9600$ | :30 | :24 | :20 | :150 | :120 | $N_1 = 600$ |
| $Fs_i$ (i = 2) 405.796875 | | | * | * | | $K_1 = 1024$ $p_1 = 653$ |
| $F_1$ 332 | | * | | | * | $K_1 = 64$ $p_1 = 48$ |
| $F_2$ 406 | | | * | * | | $K_1 = 64$ $p_1 = 40$ |
| $F_3$ 392 | * | | | * | | $K_1 = 64$ $p_1 = 32$ |
| $F_4$ 403 | | | * | * | | $K_1 = 64$ $p_1 = 52$ |
| $F_5$ 405.250 | | | * | * | | $K_1 = 64$ $p_1 = 43$ |
| $F_6$ 405.750 | | | * | * | | $K_1 = 64$ $p_1 = 41$ |

The first column of this table relates on different lines to the frequency values to be transmitted. Only a single specific frequency $Fs_i$ equal to 405.796875 kc/s ($i = 2$) has been considered. The values for the other transmitting stations are easily deduced therefrom (only the number $p$ changes).

The second column illustrates the heterodyne frequency (multiple of the value $f_1 = 80$ kc/s), which is selected from the three possibilities $4 \cdot f_1$, $5 \cdot f_1$, $6 \cdot f_1$ for the first frequency changing stages allocated to the different frequency values to be transmitted. The third column illustrates the heterodyne frequency (multiple of the value $f_2 = 16$ kc/s) which is selected from two possibilities $4 \cdot f_2$, $5 \cdot f_2$ for the second frequency changing stages allocated to the different frequency values to be transmitted.

The fourth column concerns presetting of the number $p$ of the synthesiser supplying the frequency applied to the detector such as 5213 according to the different frequency values to be transmitted. Each frequency supplied by the synthesiser followed by a divider may be considered as the heterodyne frequency of a last frequency changing stage of the second type according to appendix A of the above-mentioned patent.

The arrangements of FIG. 5 enable all the frequency changes to be made for the controls of the different oscillators supplying the frequencies to be transmitted, from a single frequency source $F_o$. However, since a phase correction is advantageously effected in addition to the frequency correction in the circuit 54, it may serve for one of the frequencies to be transmitted, advantageously for the specific frequency $Fs_i$. That is why, in FIG. 4, no phase-shifter is shown on line 411, upstream of the circuit 520. In constructing the circuit 520 in accordance with FIG. 5, therefore, it is possible in some cases not to use a phase-shifter such as the +/− box 531 of FIG. 5. The table given above illustrates clearly that, in each transmitting station, for seven different frequencies to be transmitted, five frequency dividers suffice for supplying the heterodyne frequencies of all the first and second frequency changing stages and seven frequency synthesiser-divider assemblies.

With the circuits considered in FIGS. 4 and 5, from the output of the source 51, the signals are in the form of square-wave signals or pulses, whose descending front for example corresponds to a characteristic instant of the period of a sinusoid. The shaping and filtering of these pulsed signals for obtaining square-wave signals, then sinusoidal waves at the aerial level are regarded as known by the person versed in the art, and it should be understood that the circuit 45 is the symbolic diagram or block diagram of the means employed for this purpose.

FIG. 6 illustrates an advantageous modification of a transmitting station according to the invention, in the form of complements to the circuits 521 and 531 of FIG. 5. All the elements of FIG. 5 will be found in FIG. 6 with the same references.

In addition, the output of the +/− box 531 is connected to the divide-by-$N_1$ counter 5212, by means of another +/− box 468. Another divide-by-$N_1$ counter 5212A is connected directly to the output of the +/− box 531. It will also be noted that the divider-counters 52181 and 52191 of FIG. 5 are situated on the left of FIG. 6, while the mixers 52182 and 52192, the filters 52193 and 52165 and the phase detector 5213 are arranged in a dashed-line box on the right of FIG. 6.

The elements identical with those of this latter box are arranged in another box 46 in dashed lines in the middle of the figure, respectively the mixers 462 and 464, the filters 463 and 465, and the phase detector 466.

The signals proportional to the waves $O_i$ and $O_{ij}$, coming from the circuit 454 of FIG. 4, are applied to a filter 461, which isolates the signal $O_{i1}$ having the measuring frequency $F_1$ corresponding to the circuit 521.

The signal $O_{i1}$ at the frequency $F_1$, coming from the aerial, therefore undergoes in the dashed-line box 46 exactly the same treatment as the signal at frequency $F_1$ of the oscillator 5215 in the dashed-line box on the right. However, the phase detector 466 has an inhibition input P connected to the programme circuit 44 and its output is connected to the circuit 467, which responds to the output of the phase detector 466 for controlling the +/− box 468 so as to cancel the detected phase difference.

Of course, for the signal $O_i$ (circuit 520), there is no inhibition of the phase detector such as 466. It is even possible, as a modification, to suppress completely the frequency changes on the source 5205 (such as 5215).

When the wave $O_{i1}$ is not radiated, the programme circuit 45 inhibits the phase detector 466, the +/− box 468 allows an unchanged signal to pass, and the circuit of FIG. 6 functions like that of FIG. 5.

On the contrary, during the transmission of the wave $O_{i1}$ (taking into account the transient conditions), the circuits situated in the box 46 react by means of the +/− box 468 on the oscillator 5215, such that the wave $O_{i1}$ itself is controlled directly by the frequency F from the circuit 54. The condition to be observed is a constant phase difference at the phase detector 466.

The circuitry of FIG. 6 makes it possible to reduce the residual instability of the transmitted frequencies (due in particular to the switching operations), relative to the frequency F of the single source, available at the output of the frequency-setting circuit 54. The representative signals of the waves $O_i$ and $O_{ij}$ may be obtained in numerous other ways, for example by an auxiliary aerial arranged in the vicinity of the principal aerial of circuit 454.

With reference to FIGS. 4 and 5, a transmitting station was described comprising a frequency setting circuit 54 and phase-shifting circuits 531 and 532. The scope of the present invention also includes the provision of a transmitting station comprising a single free oscillator without frequency setting circuit or phase-shifting circuit. It is also possible to provide a transmitting station with frequency setting circuit 54 and without phase-shifting circuits, such as 531 and 532.

On these different modifications depend on the one hand the stability required for the free oscillator 51, and on the other hand, the mode of operation of the listening stations, such as R in FIG. 1, as will now be explained.

In the case (not shown) where there is no frequency setting circuit 54 or phase-shifters 531 to 536, the measuring frequencies are supplied directly from the source 51 through the frequency centre 52. Each listening station receives at least the sequential waves originating from a number of transmitting stations and supplies, preferably by retransmission, information on the relative phases of these sequential waves $O_{ij}$ ($i$ variable) for each of the measuring frequencies $F_j$. To the extent that each listening station is fixed relative to the transmitting stations which it receives, these phase measurements are not affected by any Doppler effect, and serve as reference to take into account the stability of the oscillators of the transmitting stations, and possibly certain propagation disturbances.

The reference information on the relative phases is transmitted in any adequate manner, with a geographical range substantially equal to that of the transmitting stations concerned (bisignal method of radio position-fixing).

Under these conditions, the choice of the intrinsic stability of the free oscillator of each transmitting station depends essentially on the period of the transmission programme of the sequential waves, while taking into account the desired precision for position determination.

In the case (also not shown) where only one frequency setting circuit 54 is used, the stability required for the source 51 is less good to the extent of the possibilities of correcting the frequency of that source. In fact, once the frequency setting of all the transmitting stations has been effected by the circuit 54, the specific and measuring frequencies may be regarded as equivalent to those provided in the preceding case. Each listening station may then still operate in the manner described in the foregoing for phase reference information (bisignal method).

Finally, in the case where the transmitting stations comprise a frequency setting circuit 54 and phase-shifters 531 to 536, the listening stations such as R (FIG. 1) also make frequency measurements or comparisons on the continuous waves $O_i$ having the specific frequencies, in addition to measurement of the difference in phase between the interrupted waves $O_{ij}$ having each measuring frequency $F_j$ supplied by the different transmitting stations $E_i$ (A,B,C in FIG. 1 for example). Very advantageously, the listening stations then comprise a receiver of the present invention hereinafter described.

The frequency-setting control by the lines 55 of FIG. 1 acts on a circuit 54 of each transmitting station. The correction magnitude is evaluated either by comparison of the specific (or measuring) frequencies of the transmitting stations one with another, or with respect to a frequency standard, which may be provided at the level of a listening station, or with respect to the mean of the real frequencies radiated by a certain number of transmitting stations, or by a weighted combination of all or part of thes various pieces of information. The frequency setting control is carried out by any known means such that the ratio of the real value to the nominal value of each specific frequency $Fs_i$ is the same for all the transmitting stations of the chain.

From phase difference measurements, the control by lines such as 53 (FIG. 1) of phase-shifters such as 531 to 536 of each transmitting station for obtaining known phase relations, advantageously fixed, may be effected either relative to one of the transmitting stations, taken as master, or relative to an absolute reference standard connected to the listening stations either with respect to a mean of these phase measurements or by a weighted combination of all or part of these various pieces of information.

The advantage of this latter type of transmission (monosignal) is that it is not necessary to transmit phase reference information unless the required stabilities are extremely high.

The Applicants have found that in this latter case a free oscillator 51 having a stability of $10^{-8}$ enables satisfactory results to be obtained.

If the table giving group II of the measuring frequencies is examined again, it appears that the frequencies used, considered from the standpoint of frequency allocations, are in the number of four pure frequencies and a band of 250 c/s between 405 750 and 406 kc/s.

It will later be seen that the use of continuous waves for reception produces a considerable reduction in the bandwidths necessary for the reception of the interrupted signals. If the frequencies selected are of the order of 400 kc/s, the necessary bandwidth is less than 0.1 c/s.

When the transmission frequencies are of the order of 400 kc/s (several hundreds of kc/s), taking into account the extreme narrowness of the bandwith a radiated power very much less than 1 watt is sufficient to obtain at sea useful ranges of 400 km by night and 800 km by day.

The transmitting stations are advantageously distributed along a coast, the distance between two neighbouring transmitting stations being, for example, between 100 and 300 km.

The lowest sensitivity obtained by difference of the frequencies $F_2$ and $F_6$ corresponds to a frequency of 250 c/s in group II, and therefore to a wavelength of about 1,200 km. It is known to the person skilled in the art that to be able to suppress ambiguity, the wavelength corresponding to the lowest sensitivity should be at least double the distance between two transmitting stations used conjointly. This distance ought therefore to be at the most equal to 600 km. The above-mentioned measuring frequencies thus permit total removal of ambiguity, for example in the manner described later.

Furthermore, a frequency band of about 14 c/s exists between two adjacent specific frequencies. However, the frequency band on reception is less than 0.1 c/s as we have seen above.

Starting from the particular radio position-fixing chain, whose frequency values have been given above, it is possible to construct other different chains by proportionally modifying all the frequencies transmitted to arrive at differences of about 3 c/s for example.

It will be noted that the transmitting equipment may be readily adapted by the circuit 54 of the free oscillator 51, which serves as base for all the frequencies. As will be seen in the following, the same applies to the receiving equipment.

The general structure of the receiver according to the present invention will now be described with reference to FIG. 7.

Generally, this radio position-fixing receiver comprises on the one hand for receiving the continuous waves:

a first generating circuit 61 for generating continuously $N'$ complex first local signals $S'_k$, whose respective complex frequencies $F's_k$ have nominal values equal to those of the selected specific frequencies $Fs_k$, comprising means for the independent modification of the real frequency $F's_k$ of each of the complex first local signals in the vicinity of its nominal value.

a first synchronous receiving circuit 62 for the continuous waves $O_k$ having the said specific frequencies $Fs_k$ selected by means of the first corresponding local signals $S'_k$, supplying the respective specific frequency residues $R'_k$, a first frequency control circuit 63 responding to the specific frequency residues $R'_k$ and connected to means for modification of the frequency of each of the first complex local signals $S'_k$ for causing the real frequencies $F's_k$ of the said first complex local signals $S_k'$ to be equal to the frequencies of the corresponding continuous waves $O_k$ as received.

These first circuits concern the continuous waves $O_k$ received on the selected specific frequencies $Fs_k$. It should be understood that each receiver is capable of treating $N'$ specific frequencies $Fs_k$ among the available N specific frequencies $Fs_i$, where the said $N'$ frequencies may be any of the N specific frequencies. In what follows, a receiver capable of treating $N'$ predetermined specific frequencies will first be described.

On the other hand, concerning the reception of the interrupted waves, the receiver according to the invention comprises:

a second generating circuit 64 connected to the first generating circuit for generating, in correspondence with each first complex local signal $S'_k$, a number $n'$ comprised between 1 and $n$ of second complex local signals $S'_{km}$, whose respective complex local frequencies $F'_{km}$ have nominal values equal to those of $n'$ measuring frequencies $F_m$ selected from the $n$ measuring frequencies $F_j$ each measuring frequency $F'_{km}$ being compelled to be proportional to the controlled frequency $F's_k$ corresponding to the same specific frequency $Fs_k$, according to a proportioanlity ratio equal to the ratio of the nominal values of the corresponding measuring frequency $F_m$ and of the specific frequency $Fs_k$, the second generating circuit comprising means for modifying the phase of each second local signal $S'_{km}$, a programme circuit 65 capable of supplying utilization control signals $P_{km}$ of each interrupted wave $O_{km}$ received on a measuring frequency $F_m$ and corresponding to a specific frequency $Fs_k$, such that each utilisation control of a interrupted wave $O_{km}$ is situated temporarily within a transmission time interval of the said interrupted wave, a second synchronous receiving circuit 66, connected to the programme circuit 65, for the interrupted waves $O_{km}$ having the said selected measuring frequencies $F_m$, capable of effecting synchronous reception of each interrupted wave $O_{km}$, by means of the corresponding second local signal $S'_{km}$, in a manner controlled by the corresponding utilisation control signal $P_{km}$, and of supplying respective interrupted phase residue $R'_{km}$, corresponding to each second local signal $S'_{km}$;

a second phase control circuit 67 receiving the interrupted phase residues $R'_{km}$, and connected to the means modifying the phase of each of the second complex local signals $S'_{km}$ for compelling the phases of these second complex local signals $S'_{km}$ to be equal to the phase of the interrupted waves $O_{km}$ as received, except for a phase constant, which is the same for all the second local signals $S'_{km}$ corresponding to the same measuring frequencies $F_m$.

The interrupted waves $O_{km}$ each correspond to a transmitting station having particular specific frequency $F_{s_k}$. The programme circuit is used for re-establishing on reception the correspondence between each interrupted and repetitive wave $O_{km}$ of frequency $F_m$ and the specific frequency allotted to the station transmitting the said wave.

Advantageously, the receiver comprises a circuit 68 for treating the phases of the second complex local signals $S'_{km}$. In fact, these second local signals have relative phases which are representative of ambiguous information of hyperbolic position-line of the receiver relative to the transmitting stations.

Figure 7:
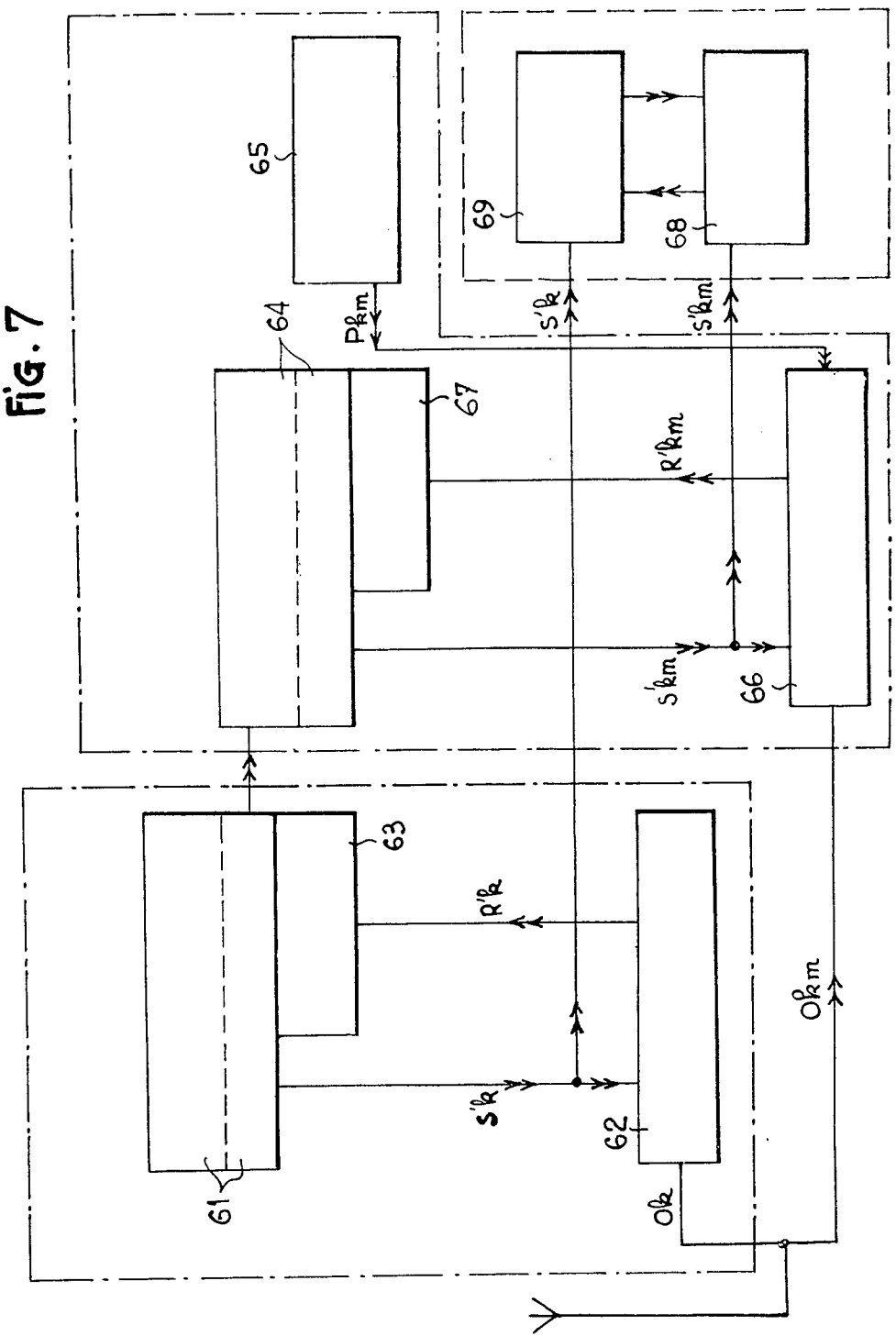
FIG. 7 is the general basic circuit diagram of a radio position-fixing receiver according to the invention.

According to the invention, information on the variations in relative distance is obtained from first local signals $S'_k$ in the circuit 69 of FIG. 7.

Different embodiments will be described further on of the ambiguity suppressing device, which supplies position information calculated from the phases of the second complex local signals, these phases being periodically re-adjusted during a reception of the corresponding interrupted wave.

On its part, the circuit 69 supplies position-line information obtained permanently by integration from the variations extracted from pairs of first local signals $S'_k$. The values of this position-line information of circuit 69 are compared periodically (for example in the circuit 68) with the values calculated from corresponding measured phases. The position-line information of circuit 69, which is output information, is corrected to cancel the deviation given by the comparison, with a time constant of greater or lesser value, depending on the operational needs.

In all the preferred embodiments which will be described in detail in the following, use is made of frequency changes for synchronous reception.

There will now be described a first receiver embodiment, in which the values of the frequencies $F_{s_i}$ and $F_j$ are those of the first group previously defined.

In this first receiver embodiment, each of the first and second complex signals $(S')$, whose frequency will be denoted generally by the discrete variable F, comprises a complex component $(G')$ of nominal frequency substantially equal to $(1 - x) F$, and a unique component $(g')$ of nominal frequency substantially equal to $x \cdot F$, the coefficient $x$ being the same for all these signals. It is evident that the complex component $G'$ can comprise only one component signal in the case where only one frequency change is made.

As will be seen in the following, the coefficient $x$ is of low value compared with unity, for example $0^{-5}$. In the relations between frequencies of this description, the word substantially signifies that equalities are realised according to the precision selected for position-fixing, taking into account the technological possibilities of the electronic circuits.

The unique components $g'$ (or $xF$) of the first and second complex local signals are therefore between themselves in proportionality relationships which substantially respect the proportionality relationships existing between the complex frequencies themselves, hereinbefore denoted by the generic variable F.

The first particular preferred embodiment of receiver is illustrated by the basic diagram of FIG. 8, to which reference will now be made.

Figure 8:
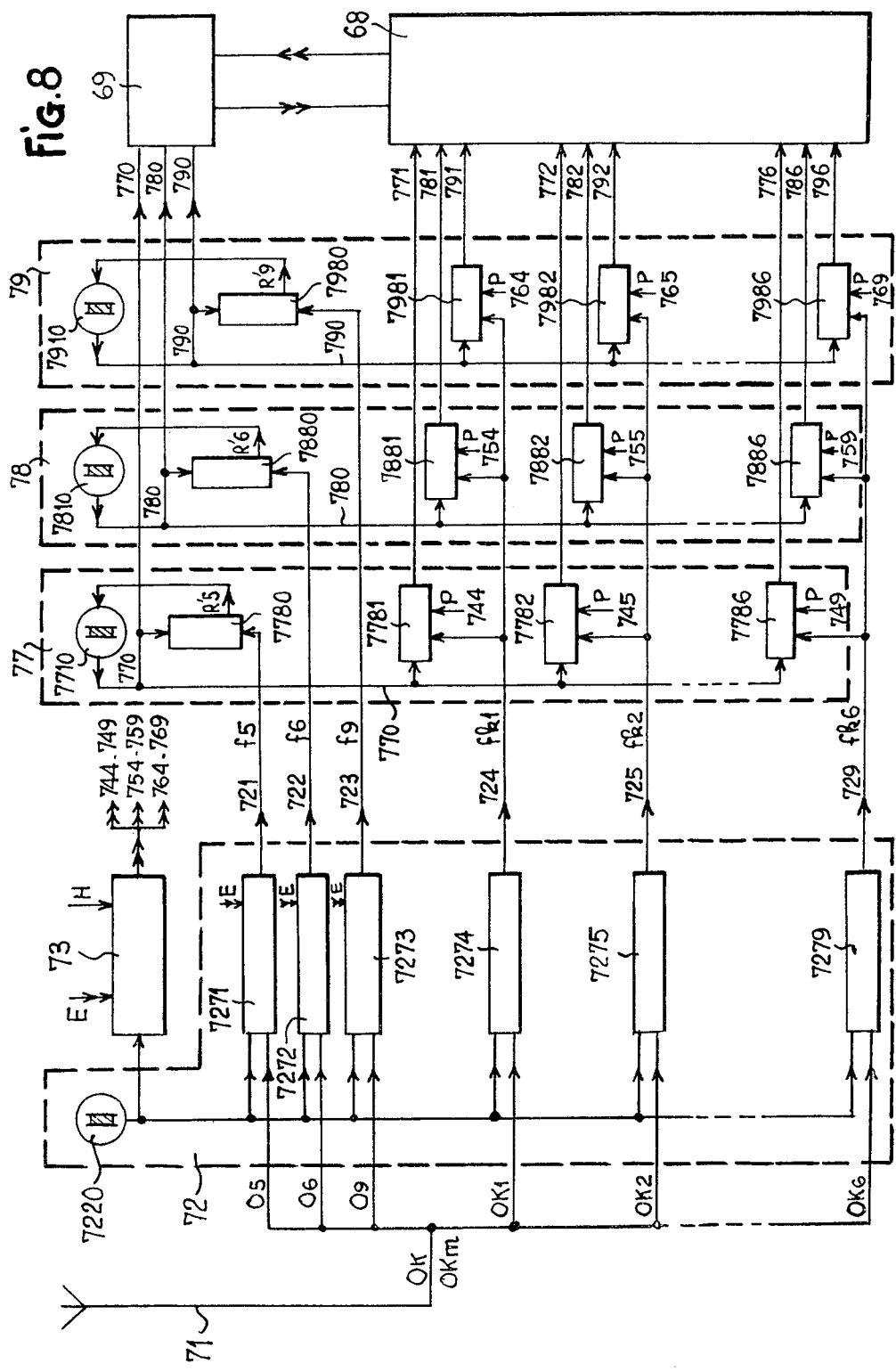
FIG. 8 is the basic circuit diagram of a first embodiment of a receiver according to the invention.

FIG. 8 shows a complete diagram of the receiver which comprises a first frequency source 7220, and three second frequency sources 7710, 7810 and 7910, each consisting for example of a quartz oscillator.

In FIG. 8, the aerial 71 of the receiver is connected to a frequency changing circuit 72. This circuit produces a frequency change of all the frequencies received; that is to say, of the continuous waves $O_k$ having the selected specific frequencies $F_{s_k}$ and of the interrupted repetitive waves $O_{km}$ having the selected measuring frequencies $F_m$. The heterodynes are the complex components $G'_k$ and $G'_{km}$ respectively associated with the complex local signals.

These components $G'_k$ and $G'_{km}$ are generated from the frequency source 7220 of the frequency changing circuit 72. Three frequency changing chemicals 7271 to 7273 are used for the continuous waves $O_k$ having the selected specific frequencies $F_{s_k}$ (in FIG. 8, it is assumed that the indices $k$ have for these channels the respective values 5, 6 and 9 in a manner controlled at the inputs E). The channels 7271 and 7273 therefore receive respectively the waves $O_5$, $O_6$ and $O_9$ from the aerial 71, and also each receive the signal from the source 7220 for producing the corresponding heterodynes $G'_k$ (it should be noted that the selection of these waves $O_5$, $O_6$, $O_9$ from the continuous waves $O_k$ received, is effected by filters in the channels 7271 to 7273). The outputs of the channels 7271 to 7273 are the lines 721 to 723 of FIG. 8. These lines transmit the signals derived from the waves $O_5$, $O_6$ and $O_9$ after frequency changes, the said signals being denoted respectively by the symbols $f_5$, $f_6$ and $f_9$.

The sequential waves $O_{km}$ having the measuring frequencies $F_m$, received by the aerial 71, ar not distinguished relative to the specific frequency $F_{s_k}$ to which they correspond, that is to say to the index $k$ of the transmitting station generating them. The signals picked up by the aerial 71 on the measuring frequencies $F_1$ to $F_6$ will therefore be denoted by the symbols $O_{k1}$ to $O_{k6}$.

The circuit 72 comprises frequency changing channels 7274 to 7279 respectively for the waves $O_{km}$, that is to say $O_{k1}$ to $O_{k6}$, the distinction according to the value of the index $m$ being made in the interior of these channels. Each of these channels receives the signal from the source 7220 for producing the corresponding heterodynes $G'_{km}$. The channels 7274 to 7279 have respective outputs 724 to 729 supplying sequential signals $f_{k1}$ to $f_{k6}$ derived from the sequential waves $O_{km}$ after frequency changes.

FIG. 8 also shows the programme circuit 73 which on the one has an input for receiving high-frequency time signals, for example from the source 7220. The programme circuit 73, on the other hand, has an input H for timing the programme and an input E (which may comprise a number of conductors) for selecting the transmission stations, that is to say, the specific frequencies. This programme circuit 73 comprises a plurality of output lines P, one line per output $P_{km}$ associated with both a selected specific frequency $Fs_k$ and a measuring frequency $F_m$. These output lines are connected to individual phase detection circuits each for supplying a signal $P_{km}$ (same reference as the line) for the utilisation control of a sequential wave $O_{km}$ having a measuring frequency $F_m$ coming from a transmitting station $E_k$, therefore associated with a selected specific frequency $Fs_k$.

The outputs 721 to 723 of the circuit 72 transmit the signals $f_5$, $f_6$ and $f_9$ to respective control circuits 77, 78 and 79. Each of these control circuits also receives the signals $f_{km}$ from the output lines 724 to 729 of circuit 72. As mentioned above, these signals $f_{km}$ are available on different lines for the different values of 1 to 6 of the index $m$, without distinction of each line according to the index $k$. On the contrary, each control circuit is associated with a selected specific frequency and effects the first control (in frequency) and the corresponding second controls (in phase).

For that reason, the lines 724 to 729 are sent to each control circuit 77 to 79. On the other hand, the control circuits 77 to 79 receive respectively the lines 721 to 723.

The control circuits 77 to 79 each have the function of carrying out;

a first frequency control by using the unique components $g'_k$ of the one $S'_k$ of the first local signals for synchronous detection with the continuous signal $f_k$ concerned;

second phase controls by using the unique components $g'_{km}$ ($k$ fixed; $m$ variable) of the second local signals $S'_{km}$ of the same index $k$ for respective synchronous detections with the corresponding interrupted signals $f_{km}$, correspondence being put into concrete form by the signals $P_{km}$ of the programme circuit.

The programme circuit 73 is so arranged as to supply for each interrupted wave corresponding to a selected specific frequency (which selection is materialised on the input line E of circuit 73) a utilisation control signal $P_{km}$, comprised in the interior of the time interval during which the said interrupted wave $O_{km}$ is transmitted. The transmission programme being periodical, it is easy for the person skilled in the art to produce such a circuit. Each utilisation control signal is advantageously delayed relative to the commencement of the wave $O_{km}$ to take into account the transient conditions occurring at the commencement of the transmission and above all at the commencement of reception, of the interrupted waves, as well as of the possible programme displacements.

The programme circuit comprises three output pluralities: a plurality 74 of outputs 744 to 749, connected to the control circuit 77, a plurality 75 of outputs 754 to 759, connected to the control circuit 78 and a plurality 76 of outputs 764 to 769, connected to the control circuit 79.

The control circuits 77, 78 and 79 of FIG. 8 each comprise a respective second source 7710, 7810 and 7910. Each of these second sources is associated with a selected specific frequency $Fs_k$, and is used for generating the unique component $g_k'$ (of nominal frequency $x \cdot Fs_k$) of a first complex local signal $S_k'$ and the unique components $g'_{km}$ (of nominal frequency $x \cdot F_m$) of the second complex local signals $S'_{km}$ associated with the same specific frequency $Fs_k$. The circuits 77, 78, 79 being furthermore of identical conception, only circuit 77 will be described with reference to FIG. 8.

In the control circuit 77, the second source 7710 supplies on a line 770 a signal which is transmitted more particularly to a synchronous detection channel 7780. In the interior of this channel 7780, the unique component $g'_5$ of the first local signal $S'_5$ corresponding to the specific frequency $Fs_5$ is produced. The synchronous detection channel 7780 receives by the line 721 the aforesaid signal $f_5$, derived after frequency changes from the permanent wave $O_5$ having the specific frequency $Fs_5$. The output of channel 7780 supplies a residue $R'_5$ for reacting on the second source 7710, such that the unique component $g'_5$ has exactly the same frequency as the signal $f_5$.

In this way, the second source 7710 is continuously controlled in frequency relative to the signal $f_5$.

If we now consider the first complex signal $S'_5$ comprises a complex component $G'_5$ produced in the frequency changing channel 7271 and a unique component $g'_5$ processed in the synchronous detection channel 7780, it appears that the first complex signal $S'_5$ in its entirety is set in frequency relative to the continuous wave $O_5$ as received, by means of the reception channel consisting of the frequency changing channel 7271 and the synchronous detection channel 7780.

The waves $O_{k1}$ to $O_{k6}$ received, having respectively the measuring frequencies $F_1$ to $F_6$ form the subject of frequency changes with the heterodyne frequencies taken from the first source 7220, just like the continuous waves $O_k$ having the specific frequencies $Fs_k$. Consequently, the complex components $G'_{km}$ ($m = 1$ to 6) of the corresponding second complex local signals have frequencies which are in a relation of proportionality, expressed in the form of a rational number, with respect to the frequencies of the complex components $G'_k$ occurring for the continuous waves $O_k$ having the selected specific frequencies $Fs_k$.

As explained in the foregoing, if the same proportionality relation according to the coefficient X is respected in the control circuits 77 to 79 both for the unique components $g'_k$ and for the unique components $g'_{km}$, the unique components $g'_{km}$ of the second complex local signals $S'_{km}$ are set in frequency relative to the sequential waves $O_{km}$ as soon as the second source associated with the specific frequency $Fs_k$ concerned is set in frequency relative to the continuous wave $O_k$ having the said specific frequency $Fs_k$.

We shall now continue the description of the circuit of FIG. 8 in so far as concerns the reception (synchronous detection) of the sequential waves $O_{5m}$ having the measuring frequencies $F_m$ ($m$ varying from 1 to 6), considering first of all the wave $O_{5,1}$.

The second source 7710 is connected by the line 770 to a synchronous detection and phase control channel 7781 associated with the measuring frequency $F_1$, and the sequential wave $O_{5,1}$. The unique component $g'_{5,1}$ is produced in the circuit 7781. The instants at which the sequential wave $O_{5,1}$ is used are controlled by the signal $P_{5,1}$ on the line 744 coming from the programme circuit 73. When the line 744 is activated (for example $P_{5,1}$ is present), the signal $f_{k1}$ present on the line 724 corresponds to the wave $O_{5,1}$, that is to say the signal $f_{5,1}$ is concerned. Therefore, when the line 744 is activated, the circuit 7781 supplies at its output 771 a unique component $g'_{5,1}$ controlled in phase relative to the signal $f_{5,1}$.

Preferably, the duration of activation of the line 744 is less than the duration of the sequential signal $f_{5,1}$, in order to eliminate the influence of transient conditions and possible deviations in the timing of the reception programme circuit.

When the line 744 is not activated, the phase control is blocked at the last value used, and the signal present on the line 771 is then governed only by the second source 7710, and therefore follows the frequency variations of the continuous wave $O_5$ coming from the same transmitting station $E_5$ as the sequential wave $O_{5,1}$.

There is thus obtained on the line 774 a continuous signal having the same quality of radio position-fixing information as that which the sequential wave $O_{5,1}$ would supply if it were transmitted continuously.

It is pointed out that the second complex signal $S'_{5,1}$ is continuously set in frequency from the second source 7710; it is periodically monitored and if necessary adjusted in phase relative to the sequential wave $O_{5,1}$ by means of the reception channel formed by the frequency changing channel 7274 and the synchronous detection channel 7781.

The circuits 7782 and 7786 function in the same way as the circuit 7781, but for the sequential waves $O_{5,2}$ to $O_{5,6}$, in response to the signals of programmes $P_{5,2}$ to $P_{5,6}$ of the lines 745 to 749, respectively. The outputs of these circuits are the lines 772 to 776, respectively.

The control circuits 78 and 79 function in the same way as circuit 77, but they are respectively associated with two other specific frequencies, which in FIG. 8 have the indices $k$ equal to 6 and 9, respectively.

It will be remarked that in the embodiment shown in FIG. 8, the complex components $G'_{k1}$ of the complex local signals $S'_{k1}$ are generated independently of the index $k$. The sequential waves $O_{k1}$ are distinguished with regard to the transmitting station of origin, that is to say the index $k$ only as from synchronous detection and phase control channels such as the circuit 7781. Since the frequency changes $G'_{km}$ are common for all the sequential waves $O_{km}$ corresponding to the same measuring frequency $F_m$, direct comparison of the phases of the unique components $g'_{km}$ available at the output of the synchronous detection and phase control channels is therefore identical by construction with a phase-difference measurement between the waves $O_{km}$ as they would be received if they were continuous and if it were possible to distinguish them and do this for each value of the index $m$.

It appears that the above-mentioned first and second generating circuits comprise common parts. These common parts comprise more particularly the first source 7220 and the second source such as 7710. Each first local signal $S'_k$ comprises a high-frequency component $G'_k$ (possibly true complex) produced from the first source 7220, and a low-frequency unique component $g'_k$ produced from one of the second sources such as 7710. Each second local signal $S'_{km}$ comprises a high-frequency component $G'_{km}$ (possibly true complex) produced from the frequency source 7210 independently of the specific frequency $Fs_k$, therefore of the value of the index $k$ with which it is associated, and a low-frequency unique component $g'_k$ produced from one of the second frequency sources, such as 7710, according to the selected specific frequency $Fs_k$ with which it is associated.

We shall now described detailed embodiment diagrams of certain elements of FIG. 8.

Figure 9:
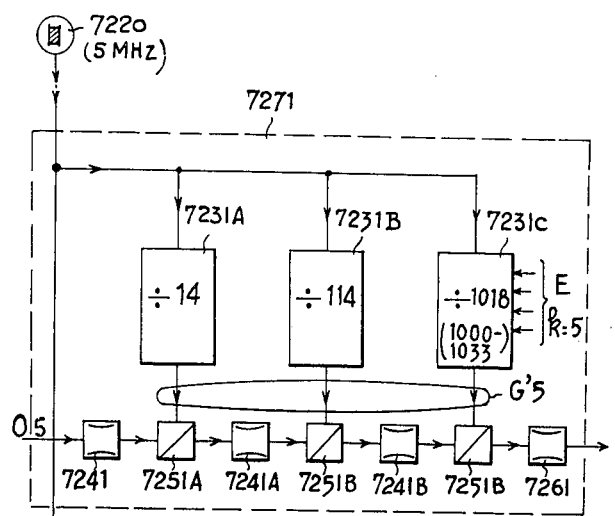
FIGS. 9 and 10 represent respectively the detailed diagrams of the reception path or channel with frequency changes 7271 and synchronous detection path or channel 7780 of FIG. 8, FIGS. 9 and 10 being regrouped to show better an example of first local signal on reception.
Figure 10:
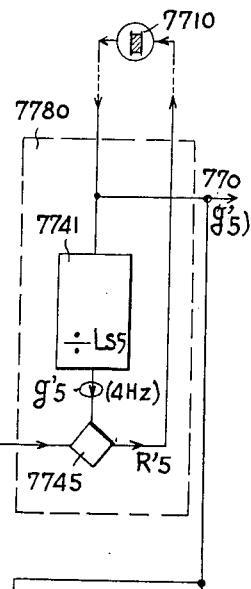

FIGS. 9 and 10 illustrate respectively the frequency changing channel 7271 and associated synchronous detection channel 7780. These two figures have been regrouped to bring out better all the components of the first complex local signal $S'_5$ and their use in the reception channel.

The frequency changing circuit 72 comprises the signal source 7220, called first source, advantageously formed by a quartz oscillator, and adapted to supply square-wave or pulsed signals, such that for example their descending front corresponds to a characteristic instant of the sinusoidal period.

In the detailed embodiment of FIG. 9, several frequency changes are employed. The signal of the source 7220 is subject to three frequency divisions in the divider-counter circuits 7231A, 7231B and 7231C. The output of each of the divider-counters 7231A to 7231C supplies a single component of the high-frequency complex component $G'_5$ of the first complex local signal $S'_5$.

In FIG. 9, the wave $O_5$ is the subject of filtering in circuit 7241, then of a first frequency change by mixing in the circuit 7251A with the single high-frequency component supplied by the divider-counter 7231A, then of a second filtering in the circuit 7241A, then of a second frequency change in the mixing circuit 7251B, utilising the single component supplied by the divider-counter 7231B, then of filtering in the circuit 7241B, then of a third frequency change in the circuit 7251B, using the single component supplied by the divider-counter 7231C, then of a final filtering in the circuit 7261 for supplying the aforesaid signal $f_5$ on the line 721. Very advantageously, the circuit 7261 also produces clipping so that the signal $f_5$ is a square-wave signal.

FIG. 9 shows clearly that the complex component $G'_5$ is formed of simple components supplied respectively by the circuits 7231A to 7231C. The frequency and phase of the complex component $G'_5$ are respectively equal to the algebraic sum of respectively the frequencies and phases of the simple components, each sign depending on the production of the corresponding frequency change.

The shaping of the signals delivered by the divider-counter, such as 7231A to 7231C for their use in the frequency changing circuits is regarded as known to the person versed in the art.

One of the divider-counters has a counting modulus controlled by the inputs E of the transmitting station selector. For example, in FIG. 9, the divider-counter 7231C is concerned. The production of this control is regarded as known to the person versed in the art.

The signal $f_5$ is transmitted by the line 721 to the synchronous detection channel 7780 associated with the second source 7710 of the control circuit 77.

The second source 7710 comprises for example a quartz oscillator and is adapted to supply square-wave or pulsed signals in the same way as the first source 7220.

In FIG. 10, the signal of the second source 7710 is divided in a divider-counter 7741 to provide the unique component $g'_5$ of the first local signal $S'_5$. This unique component $g'_5$ and the signal $f_5$ are applied to a synchronous detector 7745, which supplies continuously a specific frequency residue $R'_5$ used for reacting on the frequency of the source 7710 such that the frequency of the signal $g'_5$ is equal to that of the signal $f_5$. When this condition is achieved, the signal supplied by the source 7710 is representative of the component $g'_5$ with a weight equal to the division factor of the counter 7741. This representative signal is sent to the line 770. This signal is thus used on the one hand for generating the unique components $g'_{5m}$ ($m = 1$ to 6) of the second local signals associated with the same specific frequency, on the other hand in the circuit 69 as mentioned previously.

The description of FIGS. 9 and 10 will now be resumed, using precise frequency values.

In group I, the precise value of the specific frequency $Fs_5$ is 405.918156 kilocycles per second.

The first source 7220 has a frequency of 5 Mc/s assumed to be accurate to better than $10^{-9}$; the dividers 7231A, 7231B and 7231C have respective division factors equal to 14, 114 and 1,018; they therefore supply respectively frequencies equal to 357.142857 kc/s, 43.859649 kc/s and 4.911591 kc/s. The sum of these three frequencies is equal to 405.914097 kilocycles per second, which is the frequency of the complex component $G'_5$. The signal $f_5$ therefore has a frequency equal to $405.918156 - 405.914097 = 4.059$ c/s.

The second source 7710 has then a frequency such that frequency division in circuit 7741 supplies a unique component $g'_5$ of frequency equal to 4.059 cycles per second. The aforesaid coefficient $x$ is equal to $10^{-5}$.

The synchronous detector 7745 reacts by the residue $R'_5$ on the source 7710 such that the frequency of this source is modified in order that the signal $f_5$ and the unique component $g'_5$ are strictly synchronous in frequency.

Very advantageously the synchronous detector 7745 is of the phase detector type. Nevertheless, the continuous residue $R'_5$ is used for reacting on the frequency of the second source 7710 such that the whole of the local signal $S'_5$, formed of the complex component $G'_5$ and the unique component $g'_5$, is strictly synchronous in frequency and phase with the continuous wave $O_5$ as received. For that reason, the residue $R'_5$ is called specific frequency residue.

It should be noted that the divider 7231C supplies in a manner controlled by the inputs E a division factor variable according to the discrete values between 1,000 and 1,033 for the choice of the specific frequencies.

Furthermore, each second source such as 7710 should be capable of relative variations of $10^{-3}$ at least in the vicinity of its nominal value, assuming a speed of the receiver of 3 m/sec in the direction of a transmitter. The speed of propagation of electromagnetic waves being $3 \times 10^8$ m/sec, the Doppler effect is then $10^{-8}$ for local signals, and therefore $10^{-3}$ for their unique components, the value of the coefficient $x$ being substantially equal to $10^{-5}$.

Very advantageously, the division factor of the divider-counter 7741 is proportional to the wavelength $Ls_5$ corresponding to the preference specific frequency $Fs_5$ according to a power of 10 of the length measurement unit employed.

The division factor is approximate for technological reasons. Most often, it is adequate if the approximation made is of the order of $10^{-3}$, because for a duration of sequence of 5 minutes, a speed of 3 m/sec involves a movement of about 1,000 meters, and the corresponding error is then of the order of one meter.

Under these conditions, it is possible to take the same division factor for all the counters such as 7741, since the specific frequencies have the same value to within $3 \times 10^{-4}$.

Figure 11:
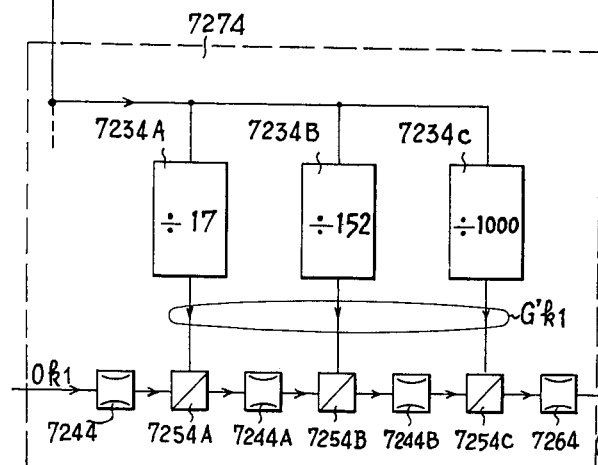
FIGS. 11 and 12 represent respectively the detailed circuit diagrams of the reception path or channel with frequency changes 7274 and of the synchronous detection and phase-control circuit of FIG. 8, these two FIGS. 11 and 12 being regrouped to show better an example of second local signal at reception.
Figure 12:
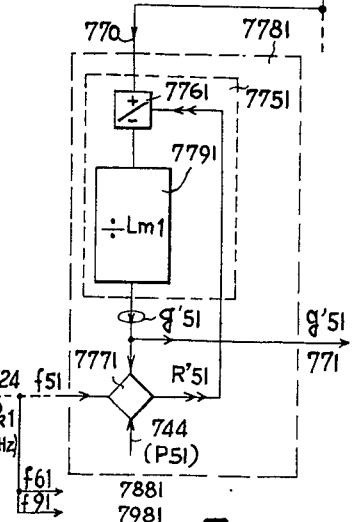

FIGS. 11 and 12 illustrate respectively the frequency changing channel 7274 and the synchronous detection and phase control channel 7781. These two figures have been regrouped to show better the assembly of the second complex local signal.

FIG. 11 illustrates channel 7274 comprising three dividers of the frequency of the signal of the first source 7220. This channel 7274 is formed in a manner similar to the frequency-changing channel of FIG. 10. It will not therefore be described in detail. It will merely be pointed out that the divider 7734C does not comprise any transmitting station selection control input, since the frequencies of the sequential waves are the same, irrespective of the transmitting station radiating them.

The measuring frequency $F_1$ common to the sequential waves $O_{k1}$ has the exact value of 322.015703 kc/s. The dividers 7234A to 7234C have division factors respectively equal to 17, 152 and 1,000 and therefore supply from the frequency of 5 megacycles per second exactly of the first source 7220 frequencies equal respectively to 294.117647 kc/s, 32.894736 kc/s and 5.000000 kc/s.

The complex component $G'_{5,1}$ of the second local signal $S'_{5,1}$ has therefore a frequency equal to 332.012383 kc/s whence the signals $f_{k1}$ have a frequency substantially equal to 3.320 c/s (which is correct since the coefficient $x$ is equal to $10^{-5}$).

In FIG. 12, the signal from the second source 7710 is applied to the circuit 7751 which produces the unique component $g'_{5,1}$ with controlled phase-shifting. The circuit 7751 comprises for this purpose a $+/-$ box 7761, used as controlled phase-shifter, and a divider-counter 7791. Very advantageously and in the same manner as for the counters such as 7741 the division factor of the divider-counter 7791 is proportional to the wavelength $Lm_1$ corresponding to the measuring frequency $F_1$. The output of the divider-counter supplies the said unique component $g'_{5,1}$ to a synchronous detector 7771, of phase detector type, which also receives the signals $f_{k1}$ from the line 724 and is activated by the programme signal $P_{5,1}$ by the line 744.

In the absence of programme signal on the line 744, the synchronous detector 7771 supplies a zero residue $R'_{5,1}$. Consequently, the $+/-$ box 7761 neither adds nor suppresses any pulse of those of the signal of the second source 7710. Consequently also, the phase of the unique component $g'_{5,1}$ is only governed by the signal of the source 7710 in a manner tied to the continuous wave $O_5$ as received.

When a programme signal is present on the line 744, this represents the fact that the signal $f_{k1}$ present on the line 724 is the signal $f_{5,1}$ and that it is necessary to make the synchronous detection of it. At this moment, a phase residue $R'_{5,1}$ may appear, this residue being applied to the $+/-$ box 7761 for adding or suppressing the pulses (or for example descent fronts) in the signal supplied by the source 7710. The result is a durable modification of the phase of the unique component $g'_{5,1}$ such that the latter is synchronous in phase with the signal $f_{5,1}$ (it should be recalled that the frequency synchronism between $g'_{5,1}$ and $f_{5,1}$ is already ensured by synchronisation of the second source 7710 by means of the permanent wave $O_5$).

It will be noted that the phase modification of the component is equal to the phase modification of the signal of the source 7710 divided by the modulus of the counter 7791. The addition or suppression of a pulse modifies by one phase revolution the phase of the signal passing through the +/− box.

Considering now the second local complex signal $S'_{5,1}$ comprising the complex component $G'_{k1}$ (common, irrespective of $k$) and the unique component $g'_{5,1}$ it becomes clear that this signal is continuously governed from the continuous wave $O_5$ by means of the second source 7710 and that, periodically, this signal is controlled in phase to be strictly synchronous in frequency and phase with the sequential wave $O_{5,1}$ as and when received.

The action of governing the second complex signal $S'_{5,1}$ from the continuous wave $O_5$ corresponds to an integration of the phase variations derived from the continuous wave $O_5$, the point of departure of this integration being the last phase value obtained for the second local signal $S'_{5,1}$ from the sequential wave $O_{5,1}$. In fact, according to this governing, there are applied to the second local signal $S'_{5,1}$ frequency and phase variations proportional to those manifested on the continuous wave $O_5$, the proportionality ratio being equal to the ratio of the nominal frequencies.

When the sequential wave $O_{5,1}$ is again received, any possible errors appearing in the integration are corrected such that the second local signal $S'_{5,1}$ is caused (most often with a time constant) to be synchronous with the sequential wave as received.

The errors due to governing or integration are normally very slight and in general due to causes foreign to the propagation of the waves such as for example the limited accuracy of the sources, and the inevitable approximations for the practical realisation of the division factors for example.

An essential advantage of the invention is that the phase control periodically effected on each second complex signal such as $S'_{5,1}$ by means of the corresponding sequential wave such as $O_{5,1}$ ensures the quality of the radio position-fixing information carried by each second local signal, whereas the integration errors would be considerable in the long term relative to the desired precision.

The result is that each local signal such as $S'_{5,1}$ is a continuous signal having substantially the same quality on the radio position-fixing plane as that which the corresponding sequential wave $O_{km}$ would supply if it were continuously transmitted, which of course is impossible to realise, because two continuous waves $O_{km}$ having the same value of the index $m$ could not be distinguished on reception.

The control of the frequencies of the first complex local signals $S'_k$ relative to the specific frequencies $Fs_k$ of the waves $O_k$ as received is carried out only on their unique component $g'_k$. The unique components $g'_{km}$ of the second complex local signals and the component $g'_k$ of the first complex local signal (all corresponding to the same specific frequency $Fs_k$) are taken from the same source while respecting the proportionality ratios $F_m/Fs_k$ above-mentioned.

We thus have the following relations: - first complex local signals:

$$S'_k = g'_k + g'_k$$

which in fact is valid for the frequencies of these signals:

$$F'S_k = (1-x)F'S_k + x \cdot F'S_k$$

- second complex local signals:

$$S'_{km} = G'_{km} + g'_{km} \text{ or:}$$

$$F'_{km} = (1-x)F'_{km} + x \cdot F'_{km}.$$

These relations will now be written, taking into account the nominal values of the frequencies, assuming that the index $k$ has a fixed value.

The complex components $G'_k$ and $G'_{km}$ have nominal frequencies respectively equal to $(1-x)Fs_k$ and $(1-x)F_m$, since the nominal values of the frequencies $F'_{s_k}$ and $F'_{km}$ are respectively $Fs_k$ and $F_m$. These components are taken from the same source for a value of the index $k$ (or better whatever the index $k$ may be, as illustrated in FIG. 8). If we call G the nominal frequency of this source and dG the instantaneous deviation of the real frequency of this source relative to its nominal value, it follows that the nominal frequencies of the components $G'_k$ and $G'_{km}$ ought to be multiplied by $(1 + dG/G)$ for obtaining the real frequencies.

In the same way, the unique components $g'_k$ and $g'_{km}$ have the respective nominal frequencies $x \cdot Fs_k$ and $x \cdot F_m$ (the index $k$ being fixed and the index $m$ variable). They are taken from the same source of nominal frequency $g_k$, whose instantaneous deviation is $dg_k$ including the frequency control, this being true only for one value of the index $k$.

The nominal frequencies of the components $g'_k$ and $g'_{km}$ ought therefore to be multiplied by $(1 + dg_k/g_k)$ for obtaining the real frequencies.

Moreover, the frequencies of the received waves are modified relative to the transmission frequencies because of the Doppler effect. Denoting by $v_k$ the speed of the receiver in the direction of the transmitting station $E_k$ ($k$ fixed) transmitting continuously the specific frequency $Fs_k$, sequentially the measuring frequencies $F_m$ (waves $O_{km}$), and denoting by $c$ the speed of propagation of the waves, the real frequencies received are:

$$F_k(1 + v_k/c)$$

and $$F_m(1 + v_k/c)$$

It will be noted that this assumes that the transmission frequencies are strictly equal to their respective nominal values. This assumption is correct because any deviations take into account the ratios of the nominal values (see above). These deviations are therefore translated by errors in the speeds $v_k$, which disappear since only the difference in the speeds $v_k$ are used for determining the position-lines at the end of the working operation.

The continuous control of frequency applied to the first complex signal $S'_k$ realises the equality:

$$Fs_k(1 + v_k/c) = (1-x) \cdot Fs_k(1 + dG/G) + x \cdot Fs_k(1 + dg_k/g_k)$$

the first term being the real frequency of the wave $O_k$ received and the second term the real frequency of the first local signal $S'_k$.

This relationship is simplified to give:

$$V_k/c = (1-x)dG/G + x \cdot dg_k/g_k$$

The continuous control of frequency on the first local signal $S'_k$, which is exercised on the unique component $g'_k$ (source $g_k$) realises this condition continuously.

The second local signals $S'_{km}$ have real respective frequencies ($k$ fixed; $m$ variable) which are written as follows:

$$F'_{km} = (1-x) F_m (1 + dG/G) + x \cdot F_m (1 + dg_k/g_k)$$

The condition for these continuous real frequencies $F'_{km}$ to be respectively equal to the frequencies $F_m (1 + v_k/c)$ of the waves $O_{kl}$ as and when received is written as follows:

$$F_m (1 + v_k/c) = (1-x) F_m (1 + dG/G) + x \cdot F_m (1 + dg_k/g_k)$$

which simplifies to give:

$$v_k/c = (1-x) dG/G + x \cdot dg_k/g_k$$

This condition being realised by the continuous frequency control on the first local signal $S'_k$, it is clear that the second local signals $S'_{km}$ as generated are already set to frequency for receiving the waves $O_{km}$. It will be noted that the instability of the frequency source $G$ is compensated by the control $dg_k$ of the frequency source $g_k$.

Moreover, the above-mentioned condition may be written:

$$dg_k/g_k = \frac{1}{x} v_k/c - \frac{1-x}{x} dG/G$$

If now two different values, 5 and 6 for example, are given to $k$ and the two corresponding equations are subtracted, and if the source $G$ is common for all the values of $k$:

$$dg_5/g_5 - dg_6/g_6 = \frac{1}{x \cdot c} (v_5 - v_6)$$

Hitherto, $g_5$ and $g_6$ have been considered as (any) nominal values of the frequencies of the sources $g$.

We have seen that the nominal frequencies of the unique components $g'_5$ and $g'_6$ are respectively equal to:

$$x \cdot Fs_5 = xc/Ls_5 \text{ and } xFs_6 = xc/Ls_6,$$

$Ls_5$ and $Ls_6$ being the respective wavelengths associated with $Fs_5$ and $Fs_6$.

It is advantageous according to the invention to take all the nominal frequencies such as $g_5$ and $g_6$ equal to one another; for example, the frequency $g_5$ is then proportional in a ratio $z$ to $Ls_5 \cdot x \cdot Fs_5$, and the frequency $g_6$ is proportional in the same ratio $z$ to $Ls_6 \cdot x \cdot Fs_6$ (it will be recalled that products such as $Ls_5 \cdot Fs_5$ are all equal to $c$).

It follows directly therefrom that the expression $dg_5/g_5 - dg_6/g_6$ may be written:

$$\frac{dg_5 - dg_6}{z \cdot x \cdot c}$$

Consequently, the above equation becomes $$dg_5 - dg_6 = z(v_5 - v_6)$$

Integration of such a difference as a function of the time therefore furnishes information on the difference of the distances from the receiver to the transmitting stations $E_5$ and $E_6$.

Since the unique component $g'_{5,1}$ has a frequency proportional, according to the aforesaid coefficient $x$, to the measuring frequency $F$ of the sequential wave $O_{5,1}$, which is also that of the second local signal $S'_{5,1}$, it follows that this unique component $g'_{5,1}$ by itself carries the phase information of radio position-fixing, as set forth in the foregoing.

As shown in the foregoing, the unique component $g'_{5,1}$ is already set in frequency relative to the sequential signal $f_{5,1}$ because of the continuous action on the second source 7710 by means of the continuous wave $O_5$. This is why the residue $R_{5,1}$ is called interrupted residue of phase.

In a general manner, in the present specification the word residue is used in a not very common sense. In fact, it is a question of a residual signal resulting from the synchronous reception of a wave and used for causing a local signal to be strictly synchronous (in frequency and/or phase) with the received wave. The residue is therefore an error signal supplied by synchronous detection and used in synchronous reception. The nature or shape of this error signal depends essentially on the conception of the synchronous detection circuit and the means employed for controlling the local signal.

It should be understood that the controls called frequency controls, which employ the specific frequency residues as error signals are advantageously second order controls. Furthermore, all the controls more often comprise time constants (several seconds) which are advantageously obtained by means of divider-counters when the residues are in the form of pulse trains.

With regard to the controls called phase controls, it should be pointed out that these controls may be first order controls. In fact, assuming that the receiver is moving at constant speed, and regardless of the order of the controls called frequency controls, the phase controls are unaffected by any delay whatever time constant is used.

Figure 13:
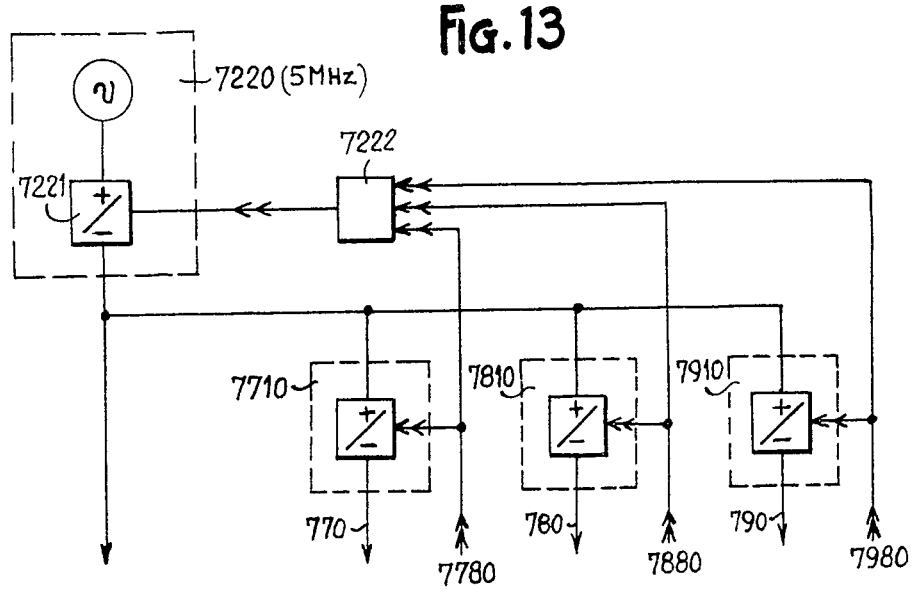
FIG. 13 illustrates a modification of the first embodiment of the receiver of the invention, in which the second sources 7710, 7810, 7910 of FIG. 8 are taken from the first source 7220 of FIG. 8 by means of frequency modification circuits (or boxes +/−) respectively.

FIG. 13 illustrates a preferred embodiment of the second sources 7710, 7810 and 7910.

The first source 7220 supplies signals having for example a frequency of 5 Mc/s. These signals are sent, possibly by means of a +/− box 7221, towards respective second sources 7710, 7810 and 7910. Each of these second sources is itself formed by a +/− box controlled by the respectively associated frequency control circuit, namely 7780, 7880 and 7980. In this way, the second sources are drawn directly from the first sources by means of respective frequency modification circuits formed by the +/− boxes.

If the +/− box 7221 is suppressed, the frequency variations of the first source 7220 should be compensated completely by the frequency controls acting on the second sources 7710, 7810 and 7910, with the coefficient multiplier $1/x$ of the order of $10^5$. The source 7220 ought therefore to have excellent stability.

For that reason, according to the embodiment as shown in FIG. 13, it is very advantageous to combine all or part of the frequency modification information supplied by the circuits 7780, 7880 and 7980 in a circuit 7222, which supplies a control signal for the +/− box 7221. In this way, the source 7220 is governed by the mean of all or part of the frequencies of the continuous waves received, which reduces the stability required for tis first source 7220, and renders the functioning of the entire receiver more sure, taking parasitic and other noise sources into account.

An interesting modification of the lay-out as shown in FIG. 13 is to cause only one of the signals supplied by the circuits 7780, 7880 and 7980 to set on the +/− box 7221 in suitable proportions and with a suitable time constant. If, for example, the signal of circuit 7780 is thus used, the +/− box of the associated source 7710 may be suppressed; in fact the signal of the first source is then itself set in frequency relative to the cntinuous wave corresponding to the circuit 7780 (wave $0_5$ in the example selected). The other frequency controls are effected as before.

The modifications described with reference to FIG. 13 also have the advantage that all the local signals for reception are drawn from the same sources 7220. In the description of one example of the method of radio position-fixing of the invention, it was stated that the necessary bandwidths are extremely narrow, and consequently a number of different radio position-fixing chains may be obtained by slightly modifying in the same proportion all the values of the transmission frequency. With the modifications described with reference to FIG. 13, it is merely necessary at the receiver to correspondingly modify slightly the frequency of the first source 7220 for receiving at choice one of the radio position-fixing chains. This enables second sources havng the same nominal frequency to be readily obtained.

Embodiments of +/− boxes are described and illustrated in FIGS. C7 and C9 of Appendix C of the above-mentioned patent. FIGS. C3a C4a and C5a of Appendix C of the above-mentioned patent show embodiments of phase detectors which could be advantageously used in this invention FIG. B6 of Appendix B of the above-mentioned patent illustrates embodiments of phase detectors. With regard to the transformation of the herein discussed residues from such phase detectors in the form of pulse trains for controlling the +/− units, circuits and time diagrams are shown in FIGS. B4, B4a, and B10 of Appendix B and FIG. C6 of Appendix C of the above-mentioned patent. In each case, reference will be made to the description made with reference to the figures mentioned.

The utilisation of the signals supplied on the lines 770 to 776, 780 to 786 and 790 to 796 of FIG. 8 will now be described. It should be borne in mind that these signals are in logical form, that is to say, in the form of squarewave or pulsed signals, the descending front (for example) being representative of a characteristic instant of the period of a sinusoid.

For supplying position-line information, the signals available on the conductor lines, whose last reference numbers are identical with 1 to 6, may be subject of phase measurements, for example by using the information of Appendix D of the above-mentioned patent. As previously stated, the values of the various measuring frequencies are selected for supplying "differential sensitivities" of desired values. It will also be noted that the sum of all the measuring frequency values supplies a value sensitivity well above the sensitivity of each of them.

This phase difference information available in numerical form is processed in a computer assembly. It is necessary that this information should be sampled before each processing by the computer.

Very advantageously, the computer operates on the principle described in Appendices B and C of the above-mentioned patent.

The information of the appendices of the above-mentioned patent will now be briefly recalled.

Most of the known methods of suppressing ambiguity use signals having among them well established frequency and phase relations. The differential sensitivities drawn from such signals permit the passage from radio position-fixing information of great precision to radio position-fixing information which is both less precise and less ambiguous, the latter not being, however, independent of the former: in fact, the sensitivites of less precise measurements should be sub-multiples of sensitivities of precise measurements.

According to the information of these appendices of the above-mentioned patent, a different process is advantageously employed, which also makes use of differential sensitivities but following a "progressive refinement" by successive approximations permitting the passage from less precise measurements to those which are more precise. The principle advantage of this "progressive refinement" is that it enables the ambiguity of a radio position-fixing measurement to be caused partly to disappear by means of another measurement made on a lower sensitivity, having some mathematical relation with that of the first measurement, provided that the sensitivities are all known.

A distinction will be made between the bisignal method of these patents, which corresponds in the present invention to the case where the listening stations retransmit reference phase information for all the receivers, and the monosignal method, which in the present invention corresponds to the case whre the listening stations are used for reacting on the transmitting stations to provide a known phase relatonship between the sequential waves radiated by these stations.

To apply the method of Appendices B and C of the above-mentioned patent, it is necessary to distinguish totally the function of the local signals used in these two documents (which will be called computed local signals in the present description), and the function of the local signals called complex of the present invention. The computed local signals and the complex local signals have in common only the designation "local," because they are generated locally for comparison with the received signals.

It has previously been stated that the second complex local signals of the present invention are the exact image of what the sequential waves having measuring frequencies would be if they were continuously transmitted.

According to the method of Appendices B and C of the above-mentioned patent, use is made of computed local signals carrying position-line information expressed by a quantity $x$, these computed local signals having phase differences of the form $k + Kx$ relative to a phase reference.

According to the present invention, each measured phase difference, for a measuring frequency, between two corresponding second complex local signals, is also of the from $k + Kx$, adopting the notation of Appendices B and C of the above-mentioned patent.

It is therefore possible to compute each quantity x defining a hyperbolic position-line according to the teaching of Appendices B and C of the above-mentioned patent.

Moreover, the present invention makes it possible to provide total suppression of ambiguity. In this case, the initial estimated value of each quantity x is supplied direct by the computer.

In the description of the cited Appendices of the above-mentioned patent, the computed values of the quantities x are displayed directly. According to the present invention, these computed values are subjected to subsequent processing before display.

There will now be described with reference to FIG. 14 the general operation of the circuit 68 and an embodiment according to the invention of circuit 69.

For this purpose, the circuit 68 is in addition adapted to compare the position-line information x obtained by processing phase-difference measurements made on complex second signals (lines 771 to 776; 781 to 786; 791 to 796) with position-line information available at its inputs 681, coming from circuit 69, and to supply at outputs 685 correction information according to the result of this comparison.

As previously mentioned, the phase information available at the inputs 771 to 776; 781 to 786; 791 to 796 from second complex local signals is periodically sampled, the position-line information supplied by circuit 69 is sampled at the same time.

In the computer 68, the above-mentioned phase information is processed to remove all or part of the ambiguity and supply position-line information. This position-line information is compared with that supplied by the circuit 69.

These comparisons supply differences between the position-line information of the circuit 69 and position-line information computed from phase information in the circuit 68. These differences are used in any suitable manner for correcting more or less rapidly the position-line information supplied by the circuit 69.

Very advantageously and as previously pointed out, circuit 69 continuously receives the first local signals $S_K'$ or at least their unique components $g_k'$, with a suitable weighting. Preferably, the respective second sources have the same nominal frequency and the signals of these second sources are applied respectively by the lines 770, 780 and 790 to the circuit 69.

To simplify the description, it will be considered that the transmitting station corresponding to line 780 is common to the two measurements made of difference in distance.

Figure 14:
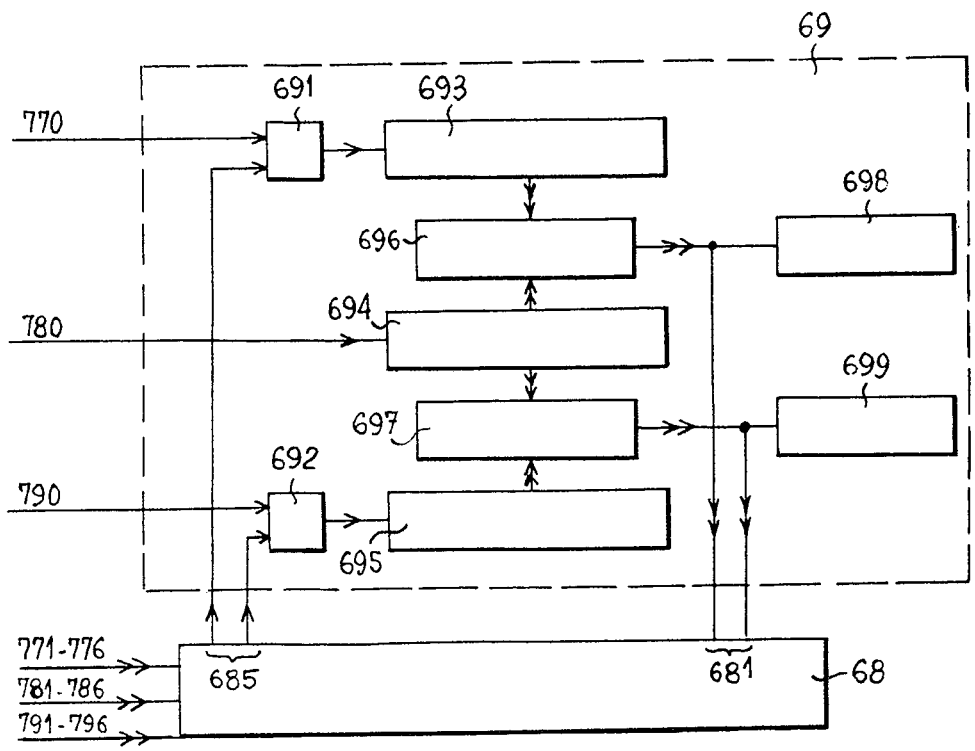
FIG. 14 illustrates for the first embodiment of the receiver, circuit 68, not detailed, of phase difference measurement and determination of position lines, and circuit 69, detailed, of position information display by using signals taken on the reception of specific frequencies.

Ignoring for the present the existence of circuits 691 and 692 in FIG. 14, each of the signals of the second sources is transmitted from lines 770, 780 and 790 respectively, to integrator-counters 693, 694 and 695; these counters count the number of descending fronts (for example) in the signals from the second sources, that is to say the number of periods of these signals, or again form an integration of the frequency of these signals.

Each integrator counter has separate outputs for all its stages. The outputs of counters 693 and 694 are connnected respectively in correspondence to the inputs of a parallel subtracter 696. Likewise, the outputs of counters 695 and 694 are connected to inputs of a parallel subtracter 697.

The subtracters 696 and 697 each supply a difference between the contents of the counters to which it is connected.

The difference in the contents of two counters such as 693 and 694 is (still ignoring circuit 691) equal to a difference in number of periods in the signals from the line 770 and from the line 780 having the same nominal frequency.

The effect of the nominal frequencies on these differences therefore disappears, since they imply the subtraction of two equal numbers of periods.

The variations of the differences contained in the subtracters 696 and 697 are therefore related to the differences of the real frequencies of the second sources which bring in their stability and the Doppler effect.

It has been shown in the foregoing that the effect of instabilities disappears by owing to the first controls referred to as frequency controls and bacause the first source G is common.

There remains therefore the Doppler effect which has been expressed by the relationship hereinbefore stated:

$$dg_5 - dg_6 = z(v_5 - v_6)$$

The subtracter 696 supplies a difference between the integrations $(g_5 + dg_5)$ and $(g_6 + dg_6)$ respectively in the counters 693 and 694. The nominal frequencies of the sources $g_5$ and $g_6$ are equal; there remains, therefore:

$$(dg_5 - dg_6) = z(v_5 - v_6) dt = z(D_5 - D_6) + Q,$$

$D_5$ and $D_6$ being the distances from the receiver to the transmitting stations $E_5$ and $E_6$, and Q being an integration constant. The difference of the distances $D_5 - D_6$ is a piece of position-line information x supplied by the subtracter 696 except for a constant.

This position-line information is applied to the inputs 681 of the circuit 68, which applies adequate correction signals to the circuits 691 and 692, adapted to add or suppress descending fronts in the signals of the second sources. The time constants with which the correction signals are produced depend on the operating conditions in each particular case.

When the receiver is started, the circuit 68 first acts in correcting by the circuits 691 and 692 (preferably very rapidly) the position-line information supplied by the subtracters 696 and 697, so as to bring the integration constant Q to a value selected for the hyperbola group considered.

The position-line information is displayed in display circuits 698 and 699. As previously stated the divider-counters such as 7741 have a division factor proportional according to a power of 10 to a wavelength with the desired unit of measurement. In this case, the differences of distance are displayed directly with this unit of measurement.

Afterwards the receiver functions "in step," the corrections made by the circuit 68 being then possibly much slower and therefore more elaborate.

As stated in the foregoing, the receiver just described is advantageously used in the listening stations, with the exception of the operational circuits 68 and 69 which in that case have a different function. This is of interest principally when the information on the specific frequencies has to be processed.

In a second embodiment of the radio position-fixing receiver of the invention, each of the first and second complex signals $(S_k'; S_{km}')$, whose frequency is denoted generally by F comprises a complex component H and a unique component $f'$ having a frequency of value substantially equal to $f$. The value of the frequency $f$ is common to all the complex local signals, and for example is equal to 4 c/s. The frequencies $F - f$ of each complex component, on the contrary, are different from each other.

The values of the above-mentioned frequencies are termed substantially equal in the sense that the electronic circuits employed for generating the local signals have limited possibilities in regard to precision in frequency production.

Figure 15:
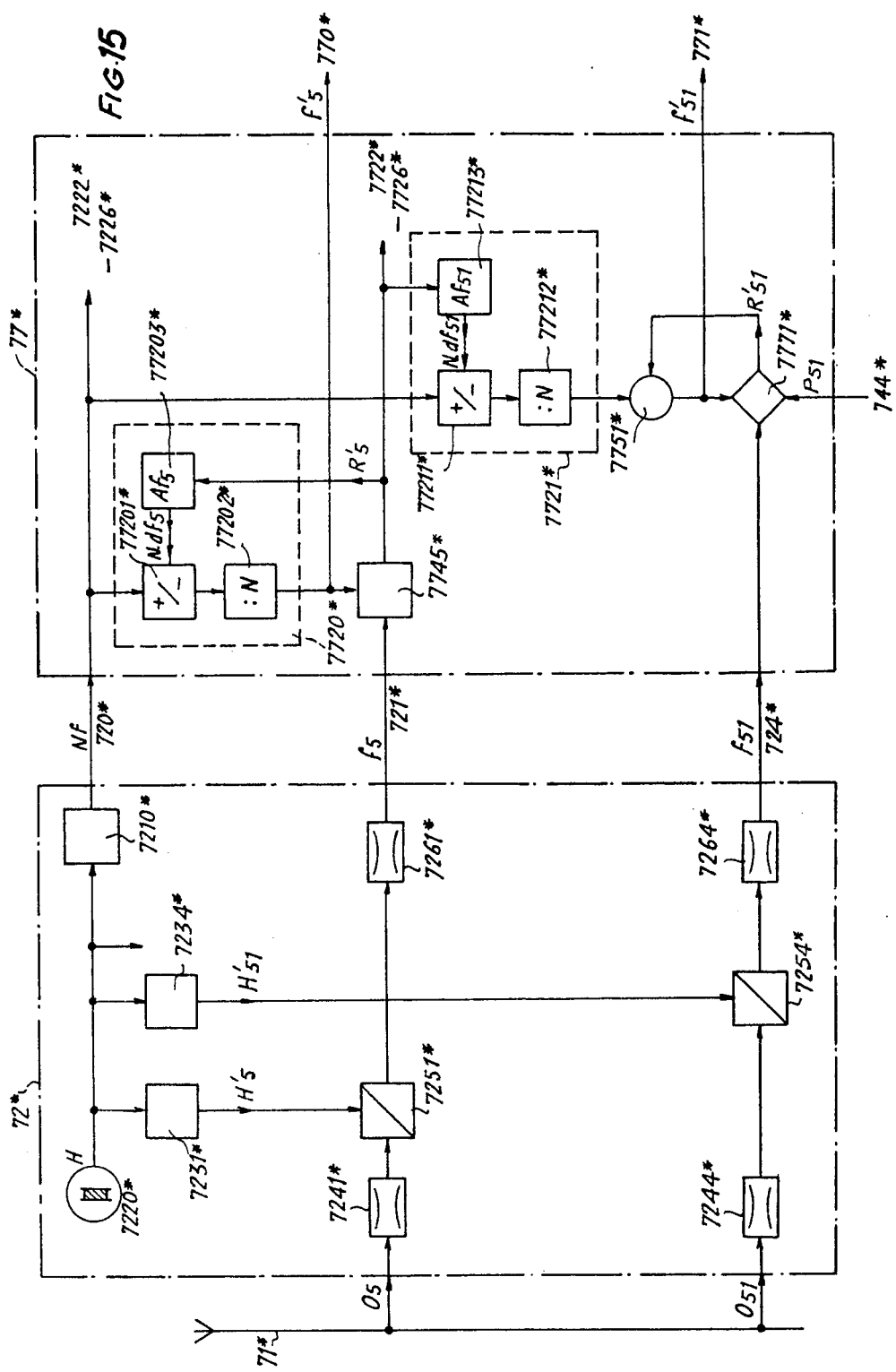
FIG. 15 illustrates partly a second embodiment of the receiver according to the present invention in a form showing the operation of the control circuits 77* by comparison with FIGS. 9 to 12.

FIG. 15 is a general part diagram of a receiver comprising frequency changes made by means of a frequency changing circuit 72*, in which a unique frequency source serves to supply not only the complex components, but also the unique components of the complex first and second local signals. In FIG. 15, this unique source bears the reference 7220*.

In particular, the frequency centre comprises a supplementary stage 7210* intended to supply a frequency U, being a multiple of the frequency f common to all the unique components, on a line 720* in the direction of the control circuits 77*, 78*, 79*. Generally, the frequency U may be merely tied to the frequency f common to all the unique components, and is not necessarily multiple.

To facilitate distinction from the first receiver embodiment, all the numerical references of this second embodiment will be followed by an asterisk*, while as far as possible the same numerical references denote the same circuits.

In addition, the complex components and the unique components are different from those of the first embodiment; for that reason, H' will now denote the complex components ($H_k'$; $H_{km}'$) and $f'$ the unique components ($f_k'$; $f_{km}'$).

Of course, the resulting change in the complex components has an influence on the frequencies of the signals $f_k$ and $k_{km}$, which are derived from the received waves, after frequency change with, as heterodyne frequencies, signals. The symbols $f_k$ and $f_{km}$, however, are retained, because the value of the frequencies changes, but the intrinsic definition remains the same.

FIG. 15 shows the frequency changing in circuit 72* and the control circuit 77*, limited to the parts concerning the continuous wave $O_5$ and the sequential wave $O_{5,1}$.

FIG. 15 shows that the signal $O_5$ is the subject first of all of one or more frequency changes by means of the complex component $H_5'$, derived from the unique source 7220* by means of a circuit 7231* which is advantageously a frequency divider.

Another circuit 7210*, advantageously of the frequency divider type, supplies from the source 7220* a frequency $U = N \cdot f$ on the line 720*. The frequency $N \cdot f$ is the multiple of N order of the frequency $f$ common to all the unique components.

The frequency $U = N \cdot f$ is applied to a frequency modification and division circuit 7720* having an input for receiving the specific frequency residue $R_5'$.

The output signal of the circuit 7720* is applied to a frequency difference detector 7745* which receives at another input the signal $f_5$ of the line 721*, derived from the continuous wave $O_5$ after frequency changes by means of the complex component $H_5'$. The output of the frequency difference detector 7745* supplies the specific frequency residue Rhd 5', which on the one hand is applied to the frequency modification and division circuit 7720* and, on the other hand to other frequency modification and division circuits 7721* to 7726*, relative to the signals $f_{5m}$ derived, after frequency changes, from the sequential waves $O_{5m}$.

The output signal of circuit 7720* is the unique component $f_5'$ of the first local signal $S_5'$. Its nominal frequency is $f$, close to 4 c/s, and its real frequency depends on the specific frequency residue $R_5'$. When control has been effected, we have $f_5 = f_5' = f + df_5$ (these symbols representing the frequencies in the equality).

To simplify the account, in block 77* only the part is considered which relates to the measuring frequency $F_1$, and to the sequential wave $O_{5,1}$, which after frequency changing by the complex component $H_{5,1}'$ becomes a low frequency signal $f_{5,1}$, present on the line 724*. A programme signal $P_{5,1}$ present on the line 744* coming from the programme circuit 74*, indicates for example the moments at which the sequential wave $O_{5,1}$ is normally received.

The frequency modification and division circuit 7721* receives the specific frequency residue $R_5'$ for supplying at its output, in a manner described hereinafter, a signal of frequency close to $f$ and already set in frequency for receiving the signal $f_{5,1}$. This signal is applied to a controlled phase-shifter 7751* which may be of the mechanical of phase-shifter. The output of the controlled phase-shifter 7751* is connected to a phase input of a phase detector 7771*, whose other phase input receives the signal $F_{5,1}$. The phase detector 7771* functions only when a programme signal $P_{5,1}$ is present on the line 744*. Under these conditions, it supplies a sequential phase residue $R_{5,1}'$, which is applied to the controlled phase-shifter 7751*, to be in phase, except for the phase constant, with the signal $f_{5,1}$ derived from the sequential wave $O_{5,1}$.

In the control circuit 77*, the circuit 7720*, already mentioned, comprises a +/− box 77201* followed by a divide-by-N counter 77202*, the output of the latter being applied to the detector 7745*.

The frequency residue $R_5'$ supplied by the output of the detector 745* is applied to a circuit 77203*, called circuit $Af_5$ (control for $f_5$), which controls the +/− box 77201* and the structure of which will be described later.

The frequency residue $R_5'$ is also applied to a circuit 77213*, called $AF_{5,1}$ (control for $f_{5,1}$) and forming part of the circuit 7721*. The output of this circuit $Af_{5,1}$ is used for the control of a +/− box 77211*, which receives the signal N.f from the line 720* for transmitting it by means of a divide-by-N frequency divider 77212* to the already mentioned phase-shifter 7751*.

As in the first receiver embodiment, the +/− boxes permit the modification of a frequency, and are advantageously constructed in the manner described in appendices B and C of the above-mentioned patent.

In the absence of a frequency modification control by the circuit $Af_5$ or 77203* of FIG. 15, the detector 7745* receives a frequency of value $f$. The residue $R_5'$ is used by the circuit $Af_5$ to order a frequency modification $N \cdot df_5$ which tends to cancel the said frequency residue $R_5'$. The frequency $f_5'$ applied by the circuit 7720* to the detector 7745* is therefore equal to $f + df_5$. It is clear that the magnitude of frequency control $N \cdot df_5$ has the function of compensating the instability of the frequency $f$, due to that of the unique source 7720*, at the same time as causing the local frequency $f_5'$ to be equal to the frequency $F_5$ derived from the wave $O_5$ received.

As will be seen later, the circuit $Af_{5,1}$ of the block 7721* deducts from the residue $R_5'$ a frequency $N \cdot df_{5,1}$ such that:

$$\frac{df_{5,1}}{df_5} = \frac{F_1}{Fs_5}.$$

Figure 16:
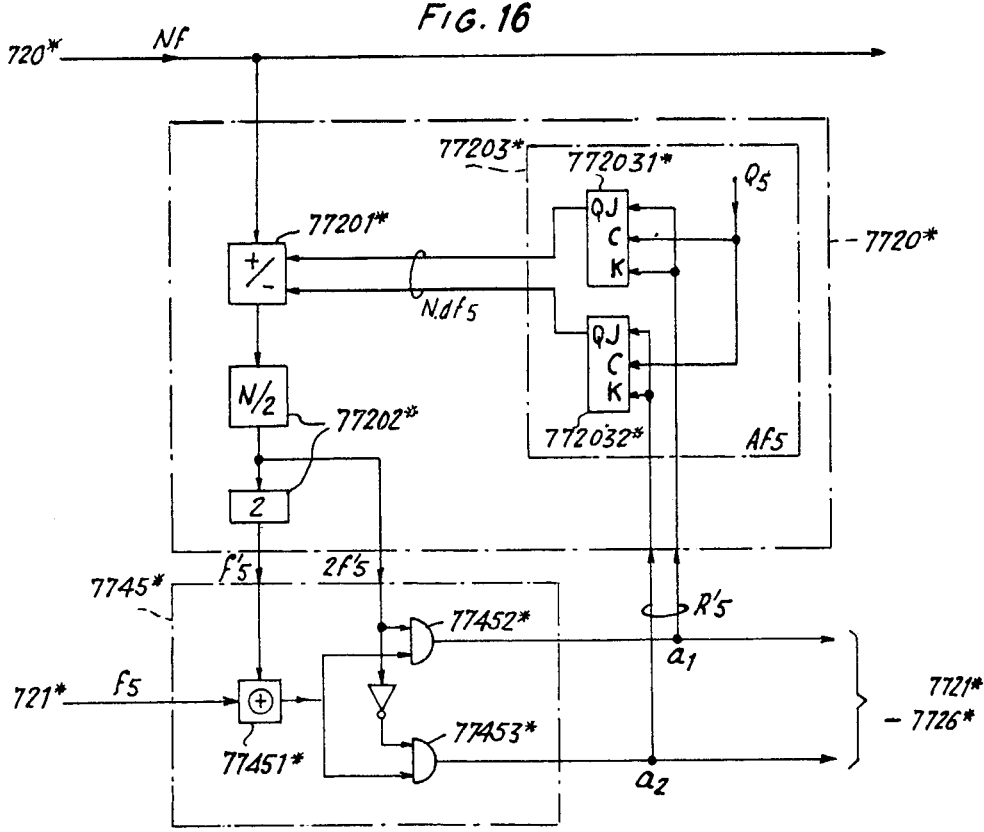
FIG. 16 is the detailed electric circuit of the blocks 7720* and 7745* of the control circuits 77* of FIG. 5.

FIG. 16 illustrates a particular embodiment example of the circuits $Af_5$ and 7745*.

The frequency difference detector 7745* comprises a logical exclusive OR circuit 77451*, which receives on the one hand the signal $f_5$ derived from the wave $O_5$ after frequency changes, and on the other hand the unique component $f_5'$ which are both assumed to be in the form of square-wave signals.

The output of the last stage but one of the counter 77202* supplies a frequency signal $2 \cdot f_5'$, which is applied directly to an AND gate and after inversion to an AND gate 77543*. These two AND gates receive as other input the output of the exclusive OR circuit 77451*. The outputs of the AND gates 77452* and 77453* supply respectively the signals $a_1$ and $a_2$.

The person versed in the art will understand that only one of the signals $a_1$ and $a_2$ can be at the TRUE level at a given instant. Furthermore, considering the phase difference between the signal $f_5'$ and the signal $f_5$, only the signal $a_1$ is at the true level during each interval when this phase difference is positive, while it is the signal $a_2$ when this phase difference is negative, provided the phase difference remains in absolute value below a quarter cycle.

The circuit 7745* of FIG. 16 is called frequency difference detector. The person versed in the art will understand that a frequency control may be very well produced with, for magnitude of error, a phase difference whose mathematical derivative relative to time represents a frequency difference.

The signals $a_1$ and $a_2$ constituting the residue $R_5'$ are applied, in FIG. 16, in parallel to the two inputs J and K of the multivibrator circuits J-K 772031* and 772032*, respectively. The clock inputs C of these two multivibrator circuits receive an auxiliary frequency $Q_5$.

One or the other of these two multivibrator circuits therefore applies to the +input or to the −input of the +/− box 77201* trains of square-wave signals of frequency $Q_{5/2}$. The duration of each train depends solely on that of the logical level 1 of the signal $a_1$ or of the signal $a_2$. This modifies the frequency $f_5'$ for producing the control of the unique component $f_5'$ relative to the signal $f_5$.

Figure 17:
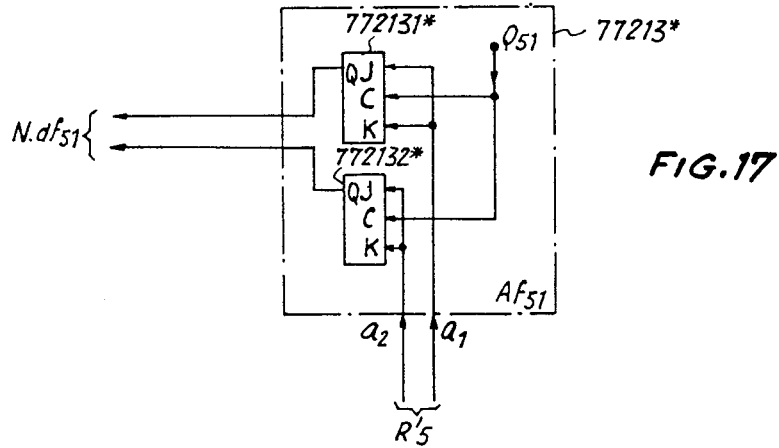
FIG. 17 is the detailed diagram of the frequency setting circuit Af51 of FIG. 5, which receives the frequency residue $R_s'$ from the detector 7745*.

As shown in FIG. 17, the circuit $Af_{5,1}$ or 77213* comprises similarly two multivibrators JK 772131* and 772132* receiving in the same way the signals $a_1$ and $a_2$. These multivibrators receive, on the contrary, a different auxiliary frequency $Q_{5,1}$ at their clock inputs C.

With this two-multivibrator circuit lay-out, the mean value of the frequency correction $N \cdot df_5$ is equal to the product of the residue $R_5'$ (difference between the mean values of $a_1$ and $a_2$) multiplied by half the auxiliary frequency Q:

$$N \cdot df_5 = R_5' \cdot \frac{Q_5}{2}.$$

If the phase difference $\Delta \phi$ is expressed as a fraction of a phase rotation, it will be understood that, for the device 7745*, the residue $R_5'$ is equal to $-2 \cdot \Delta \phi$, which implies:

$$N \cdot df_5 = - Q_5 \cdot \Delta \phi.$$

The sign − indicates that there has certainly been a control and the value of $Q_5$ conditions the frequency gain of this control, because the phase difference $\Delta \phi$ is non-dimensional.

In FIG. 17 also, a frequency modification is produced by the circuit $Af_{5,1}$ or 77213* from the same residue $R_5'$. However, this time the gain is defined by the value of the auxiliary frequency $Q_{5,1}$.

According to the invention, it is necessary to produce the conditions:

$$\frac{Q_{5,1}}{Q_5} = \frac{F_1}{Fs_5} \text{ whence } \frac{df_{5,1}}{df_5} = \frac{F_1}{Fs_5}.$$

Furthermore, although only one bistable multivibrator such as 772131* (FIG. 17) has been shown, it is often necessary to connect in series with each multivibrator a binary counter of modulus Z, or better to employ a reversible counter of modulus Z, of which the two + and − inputs are connected respectively to the outputs of a circuit such as 77213* (FIG. 17). In this case the control relationship becomes $$N \cdot df_5 = R_5' \cdot \frac{Q_5}{2 \cdot Z}$$

There will now be described with reference to FIG. 18 an embodiment of the phase control constituted by the phase detector 7771* and the phase-shifter 7751*.

Figure 18:
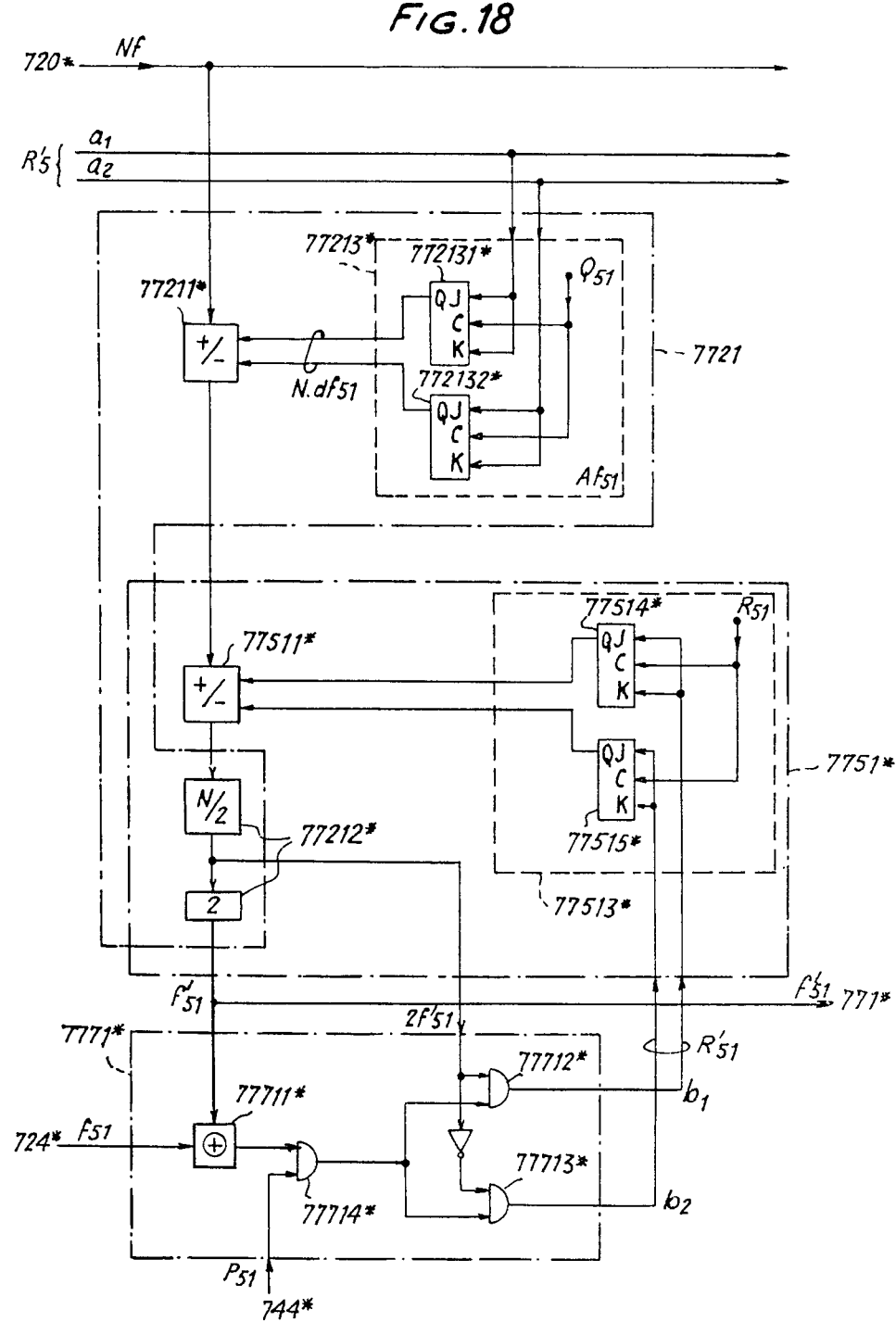
FIG. 18 illustrates the detailed circuit diagram of another part (blocks 7721*, 7751* and 7771*) of the control circuits 77* of FIG. 15.

In FIG. 18, it is evident that this phase control is constituted in the same way as the frequency control of FIG. 16, except that the exclusive OR circuit 77711* is followed by an AND gate 77714* receiving the activation command signal $P_{5,1}$ on the line 744*.

When the signal $P_{5,1}$ is at the level 1, the phase detector functions normally. When, on the contrary, the signal $P_{5,1}$ is at zero level, the outputs $b_1$ and $b_2$ (analogous to $a_1$ and $a_2$) of the detector 7771* remain permanently at zero. The multivibrators JK 77514* and 77515* of the circuit $A\phi_{51}$ 77513* are then blocked. No correction is therefore applied to the +/− box 77511 and the signal $f_{5,1}'$ retains the phase acquired in the course of the preceding control period.

It will be noted that the divide-by-N circuit 77212* of FIG. 18, is common to the frequency modification circuit 7721* and to the phase-shifting circuit 7751*.

The frequency $R_{5,1}$ applied to the bistable multivibrators 77514* and 77515* defines the value of the time constant applied to the phase control thus obtained.

If, for example, the phase difference between the signals $f_{5,1}'$ and $f_{5,1}$ is + ¼ cycle (+ $\pi/2$), the frequency applied to the +/− box 77511* is $$-R_{5,1} \cdot \Delta \Phi = \frac{R_{5,1}}{4}.$$

The resulting variation in frequency for $f_{5,1}'$ is equal to $$\frac{-R_{5,1}}{4N}.$$

The time constant $\tau$ of the control is the time necessary to take up the phase difference of ¼ cycle with a frequency modification either: $\dfrac{-R_{s,1}}{4N}$, or: $\tau \cdot \dfrac{R_{s,1}}{4N} = \dfrac{1}{4}$ $\tau = \dfrac{N}{R_{s,1}}$.

The time constants of the phase controls are selected more particularly as a function of the duration of transmission of the sequential waves, and of the quality of the frequency setting by means of the frequency controls.

The person versed in the art will understand that for such a control to function correctly, the frequency $R_{51}$ should normally be selected higher than $N \cdot f_{51}'$, that is to say 4N c/s. This shows the usefulness of connecting the counters (not shown) in series with the bistable multivibrators such as 77514* and 77515*, in the manner described in the foregoing for $Af_{51}$. These counters enable the time constant to be diminished while retaining a frequency $R_{51}$ higher than $N \cdot f_{51}'$.

Figure 19:
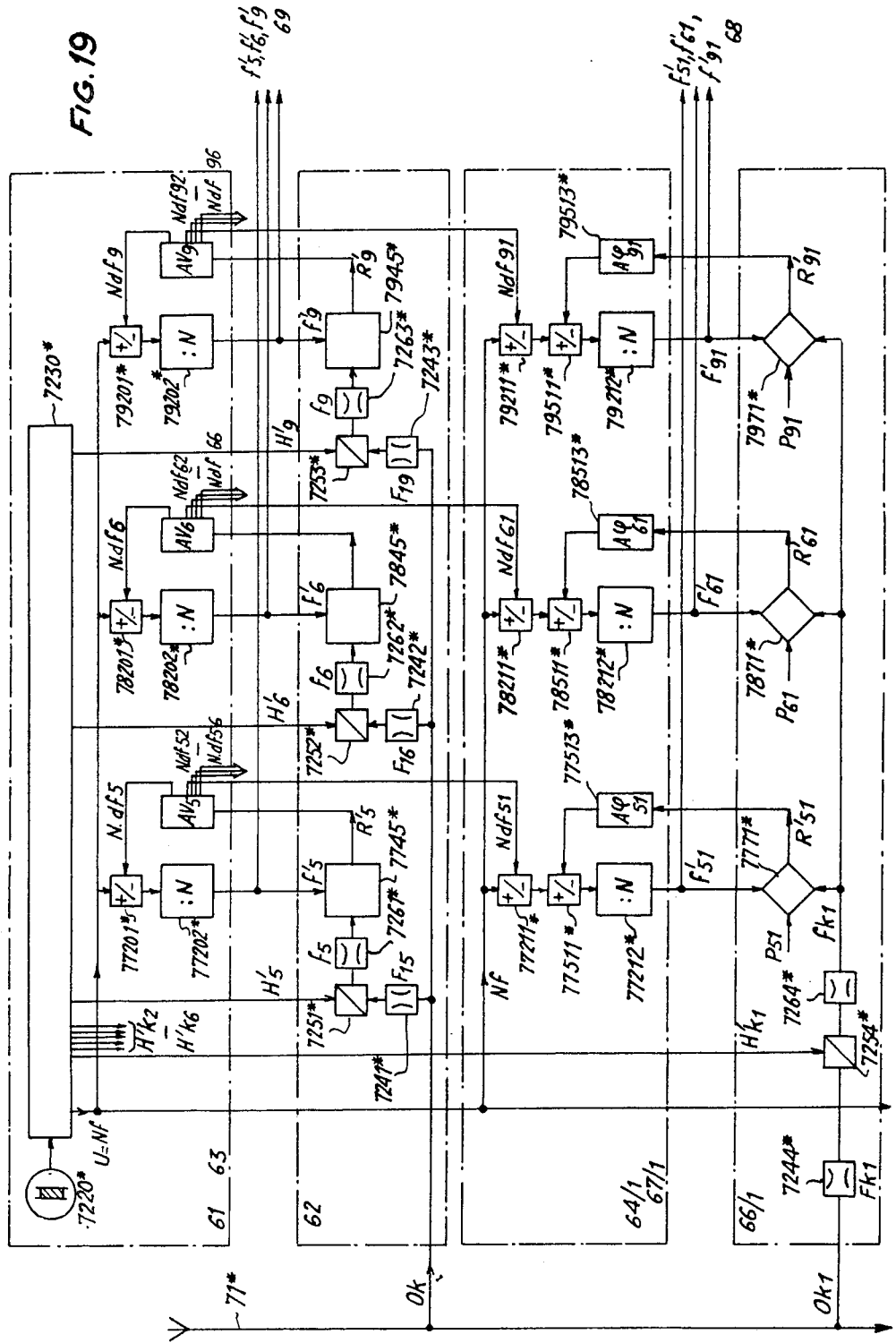
FIG. 19 is the general electric circuit diagram of the second embodiment of the receiver according to the invention.

FIG. 19 illustrates the general circuit diagram of a receiver according to FIGS. 15 to 18.

The different elements have been regrouped according to the general structure of the receiver of FIG. 7. However, the programme circuit 65 and the operational circuits 68 and 69 have been omitted to simplify the figure. In addition, the first control circuit 63 has been included in the first generating circuit 61, and the second control circuit 67 has been included in the second generating circuit 64. The frequency supply centre 7230* supplies the heterodyne frequencies serving on the one hand the first synchronous reception circuit 62, and on the other hand the second synchronous reception circuit 66. To clarify the figure, the heterodyne frequencies are all supplied by the frequency supply centre 7230* of the first generating circuit 61, whereas in FIG. 7 it is implicitly assumed that they are in part supplied by the second generating circuit 64 for the second complex local signals. This is not of importance to the extent where only the unique components of the first complex local signals (circuit 61) and of the second complex local signals (circuit 64) are subjected respectively to the first (frequency) control and the first and second (frequency and phase) controls.

Finally, the index 1 shown in FIG. 19 for the circuits 64/1 and 67/1, as well as the circuit 66/1 indicates that only the circuits relating to the sequential waves $O_{k1}$ having the measuring frequencies $F_1$ are shown, it being understood the circuits relating to the other frequencies are analogous.

In FIG. 19, it has been assumed that the three transmitting stations received are $E_5$, $E_6$ and $E_9$ and have the specific frequencies $Fs_5$, $Fs_6$ and $Fs_9$, as in the first embodiment.

The three circuits $AV_5$, $AV_6$ and $AV_9$ each comprise a control circuit such as $Af_5$ (77203* in FIG. 15), and as many circuits $Af_{5,1}$ (77213* in FIG. 15), and measuring frequencies processed by the receiver.

The circuits $A\phi_{km}$, such as the circuit $A\phi_{5,1}$, or 77513* shown in FIG. 19 are all of a constitution identical with that of circuit 77513* of FIG. 18.

If we consider the continuous wave $O_5$ arriving at the circuit 62 of FIG. 19, it is filtered in circuit 7241*, is the subject of one or more frequency changes illustrated by the circuit 7251* by means of the complex component $H'_5$ (it is in fact simple for one frequency change and truly complex for a number of frequency changes), then filtered again in the circuit 7261* to supply the signal $f_5$ derived after frequency changing of the wave $O_5$. From the frequency $U = N \cdot f$ supplied by the frequency centre 7230*, the +/− box 77201* followed by the divide-by-N counter 77202* supplies the unique component $f'_5$, which is applied to the detector 7745* at the same time as the signal $f_5$. The frequency residue $R'_5$ supplied by this detector 7745* is applied to the circuit $AV_5$ which, by its part $Af_5$ or 77203* (FIG. 16) controls the +/− box 77201*, and by its part, such as $Af_{5,1}$ or 77213* (FIGS. 17 and 18) controls the +/− box 77211* of the circuit 64/1 and 67/1 of FIG. 19, and analogous +/− boxes (not shown) for the other momentary waves $O_{5m}$.

The sequential wave $O_{5,1}$ applied to the circuit 66/1 of FIG. 19 is filtered by a circuit 7244*, is then subjected to one or more frequency changes, illustrated by the circuit 7254*, by the complex component $H'_{k1}$ (which is then respectively simple or truly complex), and is filtered again by the circuits 7264* to supply the signal $f_{5,1}$ derived after frequency change of the sequential wave $O_{5,1}$. It will be seen that up to now the reception of the wave $O_{5,1}$ has not been separated from that of the other waves $O_{k1}$.

The phase detector circuit 7771* receives the signal $f_{5,1}$ among all the signals $f_{k1}$ by selecting them in a manner controlled by the programme signal $P_{5,1}$.

The +/− box 77211* receives the signal $U = N \cdot f$ from the frequency centre 7230* and sets it in frequency relative to the continuous wave $O_5$ by means of the signal $N \cdot df_{5,1}$ supplied as described in the foregoing by the circuit $AV_5$ in its part $Af_{5,1}$ or 77213*. The output of the +/− box 77211* is applied to another +/− box 77511*, followed by a divide-by-N counter 77212*, whose output supplies the unique component $f'_{5,1}$ (of the second complex local signal $S'_{5,1}$), which is applied to the other input of the phase detector 7771*. The latter supplies the phase residue $R'_{5,1}$, which is applied to the circuit $A\phi_{5,1}$ or 77513* for controlling the +/− box 77511* such that unique component $f'_{5,1}$ will be in phase, except for a phase constant with the signal $f_{5,1}$ derived from the sequential wave $O_{5,1}$ as and when received.

In FIG. 19, the continuous waves $O_6$, $O_9$ and the corresponding sequential waves $O_{6,1}$ and $O_{9,1}$ are treated in the same way, it being understood that the phase constant for control on the unique components $f'_{5,1}$, $f'_{6,1}$ and $f'_{9,1}$ should be the same for the signals relating to the same measuring frequency (same value of the second index). This phase constant may correspond for example to a phase shift in the filtering and frequency changing circuits, which are common to all the sequential waves having the same measuring frequency.

Figure 20:
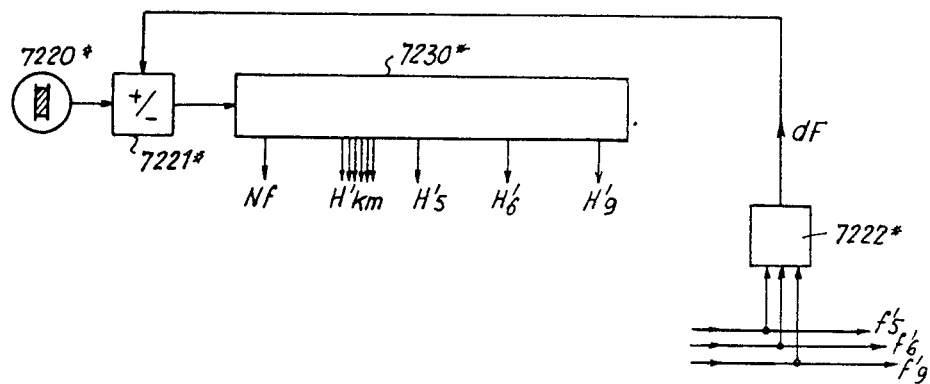
FIG. 20 is a partial electric circuit diagram of a modification of FIG. 19, in which the frequency of the single source 7220* is the subject of a frequency correction before being applied to the frequency centre 7230*.

FIG. 20 illustrates diagrammatically and partly a modification of the receiver of FIG. 9, in which the unique components $f'_5$, $f'_6$ and $f'_9$ are combined in a block 7222* for modifying by means of a +/− box 7221* the frequencies applied by the source 7220* to the frequency centre 7230*. This effects a modification of all the frequencies supplied by the frequency centre while retaining their relationship. The stability required for the source 7220* is then less. Of course, it is possible to utilise only some of the signals such as $f'_5, f'_6$ and $f'_9$. If only one of them is used, an interesting modification of the receiver is obtained which will be described hereinafter with reference to FIG. 22.

The general operation of a receiver of the second embodiment will now be explained.

In the first control circuit 63, the control of the frequencies $F's_k$ of the first complex local signals $S'_k$ relative to the specific frequencies $Fs_k$ of waves $O_k$ as received is effected from frequency residues $R'_k$ supplied by the output of synchronous detection effected on the unique components $f'_k$.

These controls have the effect of applying a frequency correction $df_k$ to the frequency of each complex first signal $S'_k$, and this frequency correction may relate to the unique component or in an embodiment modification to the complex component. The frequency $F's_k$ of each first complex local signal is therefore:

$$F's_k = H'_k + f + df_k.$$

The second complex local signals $S'_{km}$ receive, for each specific frequency $Fs_k$, a frequency modification $df_{km}$ which is proportional to $df_k$ in the ratio of the nominal value of the measuring frequency $F_m$ to the nominal value of the specific frequency $Fs_k$:

$$df_{km} = \frac{F_m}{Fs_k} \cdot df_k.$$

Consequently, for each second complex local signal $S'_{km}$ we have $$F'_{km} = H'_{km} + f + \frac{F_m}{Fs_k} \cdot df_k.$$

All the frequencies of the complex components ($H'_k$; $H'_{km}$) and unique components ($f$) are drawn from the same source, irrespective of the value of the indices $k$ and $m$. Since H denotes the nominal frequency of the said source and dH the instantaneous difference of the real frequency of the source relative to its nominal value, it follows that the nominal frequencies of the components $H'_k$, $H'_{km}$ and $f$ should be multiplied by $$\left(1 + \frac{dH}{H}\right)$$

to obtain the real frequencies. In addition, it will be noted that the complex components $H'_k$ and $H'_{km}$ have, as nominal frequency, respectively $Fs_k - f$ and $F_m - f$; each unique component has a nominal frequency equal to $f$.

Considering now the frequencies of the received waves, they are modified by Doppler effect according to the speed $v_k$ of the receiver in the direction of the corresponding transmitting station $E_k$, for each value of the index $k$.

The specific frequencies received are therefore:

$$Fs_k \left(1 + \frac{v_k}{c}\right)$$

and the measuring frequencies received are $$F_m \left(1 + \frac{v_k}{c}\right).$$

The symbol $c$ denotes the rate of propagation of the waves considered, assumed to be the same for all of them. It appears clearly from the second equation that the real frequency of a received sequential wave $O_{km}$ differs in general according to the value of the index $k$ as soon as the receiver moves relatively to the transmitting stations. That is why the signals $S'_{km}$ are different for the same value of the index $m$ and when the index $k$ varies.

The continuous frequency control applied to each complex first local signal $S'_k$ effects the following equality between the real received frequency and the real frequency of the local signal:

$$Fs_k\left(1 + \frac{v_k}{c}\right) = (Fs_k - f)\left(1 + \frac{dH}{H}\right) + f\left(1 + \frac{dH}{H}\right) + df_k,$$

this relationship is simplified to provide:

$$\frac{v_k}{c} = \frac{dH}{H} + \frac{1}{Fs_k} \cdot df_k;$$

this condition is therefore realised continuously by the first control circuit 63.

The real frequencies of the complex second local signals $S'_{km}$ are written, for each value of the indices $k$ and $m$, according to the second term of the following equation, where the first term is the real frequency of the wave $O_{km}$ as received (and when it is received):

$$F_m\left(1 + \frac{v_k}{c}\right) = (F_m - f)\left(1 + \frac{dH}{H}\right) + f\left(1 + \frac{dH}{H}\right) + \frac{F_m}{Fs_k} \cdot df_k.$$

This relationship expresses the condition for the real frequency $F_{km}$ of each second complex local signal to be equal to the frequency:

$$F_m\left(1 + \frac{v_k}{c}\right)$$

of the wave $O_{km}$. The relationship is simplified to become:

$$\frac{v_k}{c} = \frac{dH}{H} + \frac{1}{Fs_k} \cdot df_k.$$

It appears that this condition is already realised by the permanent frequency control on the first local signal $S'_k$. Consequently, the second local signals $S'_{km}$ as generated are already set to frequency for receiving the waves $O_{km}$. The instability dH of the frequency source H is compensated by each frequency correction $df_k$.

In a first embodiment, the frequency corrections $df_k$ and $df_{km}$ are applied to the unique components for the first and second complex signals. In a second embodiment, the frequency corrections are applied to the complex components, and preferably only to one of the simple components of each complex component, as will be seen later.

Advantageously, the receivers also use frequency corrections $df_k$ for obtaining information on the difference of the distances from the receiver to two transmitting stations.

Indeed, the control conditions set forth in the foregoing may be written:

$$\frac{df_k}{Fs_k} = \frac{v_k}{c} - \frac{dH}{H}.$$

Giving now to $k$ two different values, for example 5 and 6 corresponding to the transmitting stations $E_5$ and $E_6$, subtraction of the two corresponding equations gives:

$$\frac{df_5}{Fs_5} - \frac{df_6}{Fs_6} = \frac{1}{c}(v_5 - v_6).$$

Integration of such a difference as a function of time therefore provides information on the difference in the distances from the receiver to the transmitting stations $E_5$ and $E_6$.

In the examples of particular radio position-fixing chains, the values of the frequencies $Fs_k$ are very close and their relative difference never exceeds 1 thousandth. Consequently, by integrating directly the differences $df_5 - df_6$, the relative error does not exceed the thousandth. This error is corrected from time to time before it becomes appreciable by means of information supplied from the measuring frequencies.

The rate of repetition of this correction obviously depends on the speed of the moving object; by way of example, for a moving object travelling at 6 knots on the base line of a hyperbolic network, the error would be at the most of the order of a meter at the end of five minutes.

In addition, when the frequency corrections are made on the unique components $f'_k$ of the first complex signals, it is clear that the difference of the frequencies of two of them, $f'_5 - f'_6$ for example, it identical with the difference $df_5 - df_6$; it may therefore form the subject of an integration for supplying information on difference in distances.

Figure 21:
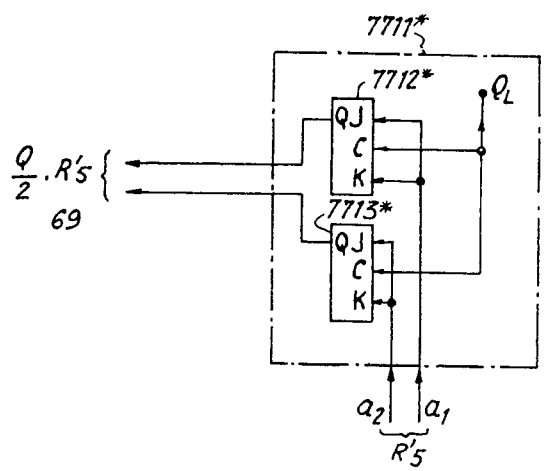
FIG. 21 illustrates the detailed diagram of a device of the second embodiment of the receiver for transforming the specific frequency residues such as $R_s'$ with a view to their use for supplying information on the difference of the distances from the receiver to two transmitting stations.

As a modification, the device of FIG. 21 is used. This figure shows a circuit 7711* of similar construction to that of the circuit 77203* of FIG. 16, and in which the two multivibrators J-K 7712* and 7713* also receive the signals $a_1$ and $a_2$ forming the specific frequency residue $R'_5$. The frequency applied to the time inputs of the two multivibrators J-K of FIG. 21 is a frequency $Q_L$. In the manner previously described, the output signals of the two multivibrators have the mean value $$(Q_L/2) \cdot R'_5.$$

This result corresponds in fact to the analogous relationship described in the foregoing for the circuit 77203* which supplies a mean value of frequency correction $N \cdot df_5$ satisfying the relationship:

$$N \cdot df_5 = R'_5 \cdot (Q/2).$$

The modification permitted by the device of FIG. 21 consists in integrating specific frequency residues for use in operation instead of integrating frequency differences of unique components, such as $f'_5 - f'_6$.

Furthermore, it is recalled that according to the present invention it is advantageous that the frequency $Q_5$ is proportional to the specific frequency $Fs_5$ according to a factor $q$, i.e. $Q_5 = q \cdot Fs_5$, and the likewise $Q_{5,1} = q \cdot F_1$, the factor $q$ being the same for all the frequencies received. This then satisfies the condition stated in the foregoing:

$$\frac{Q_{5,1}}{Q_5} = \frac{F_1}{Fs_5} \text{ because } \frac{Q_{5,1}}{F_1} = \frac{Q_5}{Fs_5} = q.$$

Reverting now to the relationship:

$$\frac{df_5}{Fs_5} - \frac{df_6}{Fs_6} = \frac{1}{c}(v_5 - v_6),$$

taking what has gone before into consideration, this relationship may be written:

$$\frac{q}{2 \cdot N}(R'_5 - R'_6) = \frac{1}{c}(v_5 - v_6).$$

The integration of the difference of the residues $R'_5$ and $R'_6$ as a function of time therefore also makes it possible to obtain information on the difference of the distances from the receiver to the transmitting stations $E_5$ and $E_6$.

For this reason, a circuit such as 7711* of FIG. 21 enables the residue $R'_5$ to be weighted by means of a frequency $Q_L$ before integration which supplies differences in the distances to the transmitting stations.

The frequency $Q_L$ has the same value regardless of the index $k$ of the transmitting station concerned. It is selected in accordance with the measuring unit desired for the said integration.

Furthermore, the approximation already mentioned in the foregoing and consisting in assuming that the frequencies $Fs_k$ are extremely close and in neglecting the difference between them, is expressed by the fact that the frequencies $Q_k$ (such as $Q_5$) are all the same.

As already mentioned, an error occurs in the information of differences in distance obtained by integration of the difference $R'_5 - R'_6$ after weighting by $Q_L$. This error is slight enough to be able to be corrected from time to time, every five minutes for example by means of phase information supplied by the second complex local signals of the receiver.

Figure 22:
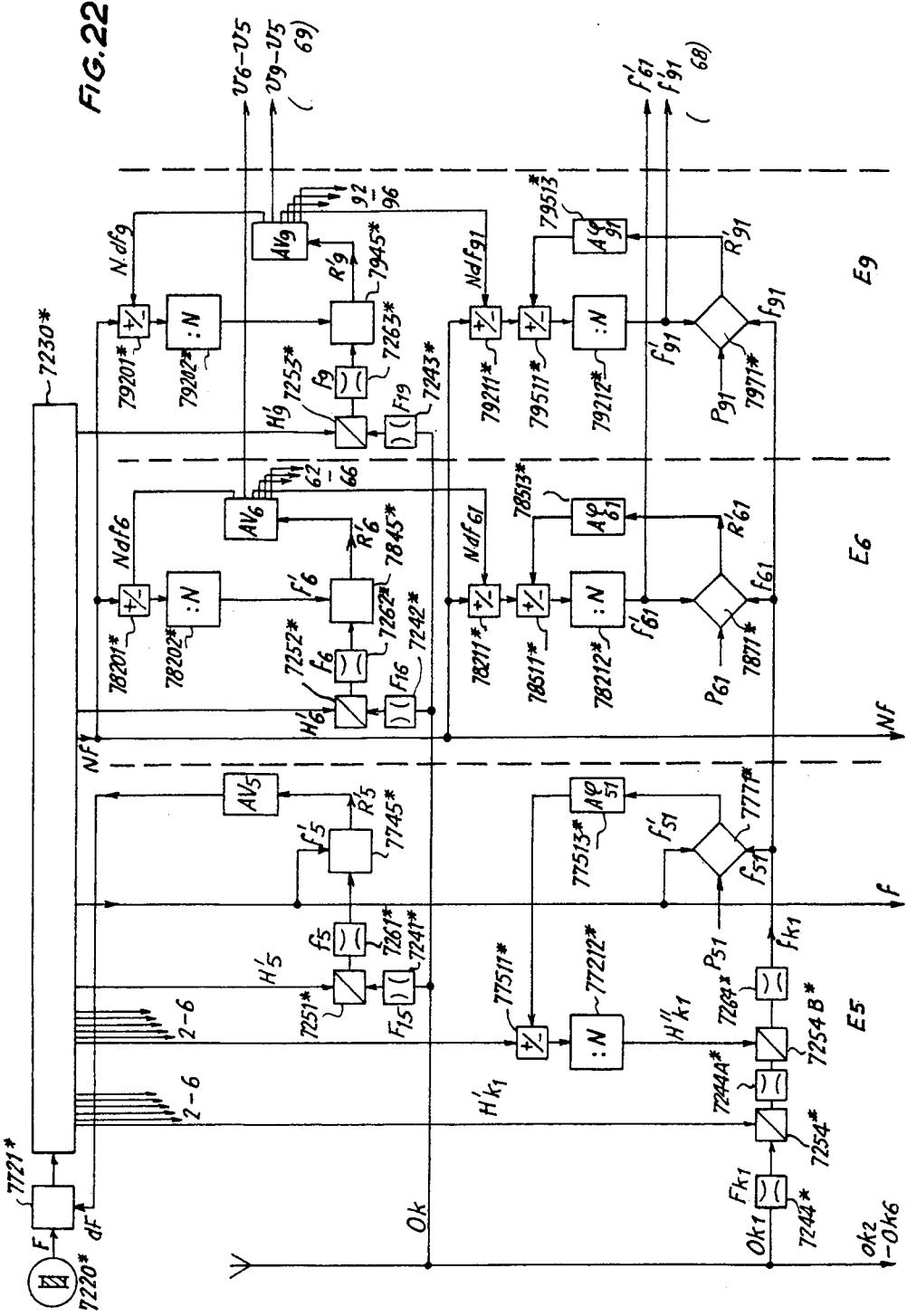
FIG. 22 is the general electric circuit diagram of a modification of the second embodiment of receiver according to the invention, in which the frequency of the single source is modified according to the control effected on one of the first complex signals.

FIG. 22 will now be described. In this figure, the residue $R'_5$ is used in the circuit $AV_5$ for controlling directly the +/− box 7721* arranged between the unique source 7220* and the frequency centre 7230*. In this case the circuit $AV_5$ comprises only a circuit of the type $Af_5$ (77203* in FIG. 6), the frequency $Q_5$ having a suitable value in relation to the value of the frequency to be corrected.

In FIG. 22, the residue $R'_5$ relating to the transmitting station $E_5$ therefore produces an overall modification of all the frequencies forming the first and second complex signals and supplied by the frequency centre 7230*.

Tge right-hand part of FIG. 22, relating to the transmitting stations $O_6$ and $O_9$ is identical with the corresponding part of FIG. 19 except that the signals intended for the circuit 69 (not shown) are extracted from the circuits $AV_6$ and $AV_9$, which for this purpose each comprise a circuit such as 7711* of FIG. 21.

The action of the residue $R'_5$ on the +/− box 7721* has the effect of not only modifying the signal $f'_5$ (in fact strictly identical with $f$), applied to the detector 7245*, but also of modifying the complex components H'$_5$ and H'$_{km}$. In FIG. 22, it will be observed that the sequential waves are subject to two frequency changes, and therefore that the second complex local signals have a complex component which is truly complex and in which, for the measuring frequency F$_1$, comprises for example two simple components denoted in FIG. 22 by H'$_{k1}$ and H''$_{ki}$.

It may consequently be considered that the whole of the complex local signals are set in frequency relative to the continuous wave O$_5$ emanating from the transmitting station E$_5$. The frequency and phase setting circuits relating to the transmitting stations O$_6$ and O$_9$ therefore operate relative to the frequency-setting relating to the transmitting station E$_5$.

In FIG. 22 phase setting relative to the sequential wave O$_{5,1}$ is effected not on the unique component f'$_{5,1}$ but on the simple component H''$_{k1}$, which forms part of the complex component common to the second local signals S'$_{k1}$ regardless of the value of the index $k$, hence of the transmitting station concerned.

For this purpose, the circuits A$\phi_{5,1}$ have a suitable time constant while the +/− box and the divide-by-N counter 77512* are adapted to act on the simple component H''$_{k1}$, instead of acting as in FIG. 19 on the unique component f'$_{5,1}$. Consequently, the frequency difference detector 7745* and the phase detector 7771* both receive directly and at the same time a frequency f, a divide-by-N divider being assumed to be incorporated in the frequency centre 7230*.

The effect of this arrangement is that the phase correction relative to the transmitting station E$_5$ and obtained for the measuring frequency F$_1$ by means of the sequential wave O$_{5,1}$, is applied to a heterodyne frequency H''$_{k1}$. The result is that this phase correction is also applied to the other sequential waves O$_{k1}$ at the moment of this frequency change. Consequently, the signals f'$_{6,1}$ and F'$_{9,1}$ are representative of the phase difference between the sequential wave O$_{5,1}$ and the sequential waves O$_{6,1}$ and O$_{9,1}$.

All the signals supplied to the operational circuit are therefore expressed in relation to the permanent and sequential waves coming from the transmitting station E$_5$ serving in fact as reference. In this case, the hyperbolic networks have the transmitting station E$_5$ in common, and operational information is obtained directly in relation to the transmitting station E$_5$.

The relationships given in the foregoing remain valid. However, the frequency correction dF plays a special part, this being that of compensating the instability dH of the source. These equations read better by replacing (dH/H) by $$\frac{dF}{F} - \frac{df_5}{Fs_5},$$

which causes the term:

$$-\frac{df_5}{Fs_5}$$

to appear in the equations concerning the stations E$_6$ and E$_9$, thus verifying the fact that the transmitting station E$_5$ serves as reference.

Figure 23:
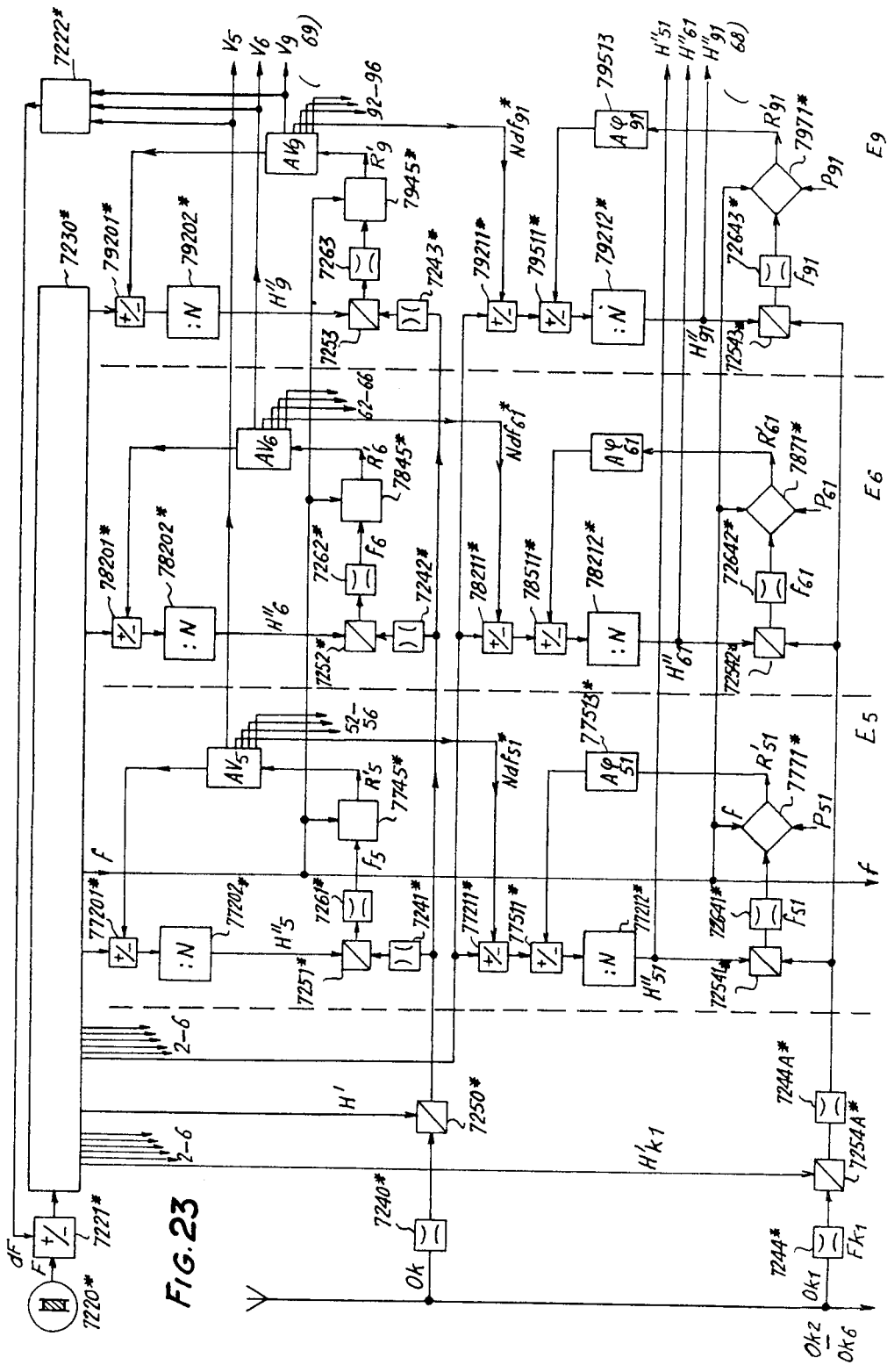
FIG. 23 is the general electric circuit diagram of another modification of the second embodiment of receiver, in which the frequency and phase controls relate to complex components of the first and second complex local signals.

FIG. 23 shows the general circuit diagram of another modification of the second embodiment of receiver, advantageous for moving objects having a high speed.

All the complex components of the first and second complex signals carry two simple components, one of which (H'; H'$_{k1}$) is common regardless of the index $k$ and therefore of the transmitting station concerned, and the other (for example H''; H''$_{5,1}$) depends on the transmitting station.

The frequency and phase corrections are applied in this embodiment to the said simple component which depends on the transmitting station, while the unique component is not modified by the first and second controls.

Thus, in FIG. 23, the component H''$_5$ applied as second heterodyne frequency to the wave O$_5$ is subjected to a frequency modification controlled by the circuit AV$_5$ in response to the residue R'$_5$ supplied by the detector 7745*, frequency modulation being effected by the +/− box 77201* followed by the divide-by-N counter 77202*, the output of the divider-counter 77202* being applied to the mixer 7251*.

The circuit AV$_5$ also controls frequency setting of the component H''$_{5,1}$ by the +/− box 77211*, while phase setting is controlled by the A$\phi_{5,1}$ circuit 77513* in response to the residue R'$_{5,1}$, phase setting being effected by the +/− box 77511* followed by the divide-by-N counter 77212*, whose output is applied to the mixer 72541*.

To sum up, detections are always made on unique components at the level of the frequency difference detector circuit 7745* and phase detector circuit 7771*, while frequency modifications are carried out respectively on the heterodyne frequencies H''$_5$ and H''$_{5,1}$, the latter also undergoing a phase modification.

The use of a common mixer 7250* for all the continuous waves is justified particularly because the specific frequencies are very close to one another. There is, on the contrary, no problem in using a common mixer denoted by 7254A for all the sequential waves having the same measuring frequency, specifically F$_1$.

In FIG. 23, the circuits AV$_5$, AV$_6$ and AV$_9$ comprise a weighting circuit such as the circuit 7711* of FIG. 21, for supplying speed information V$_5$, V$_6$ and V$_9$ to the circuit 69 (not shown).

This information V$_5$, V$_6$ and V$_9$ is respectively proportional to the frequency residues R'$_5$, R'$_6$ and R'$_9$ and, in a manner similar to what is shown in FIG. 20, they are combined in a circuit 7222* to be applied to the +/− box 7221* for total correction of the frequency of source 7220* before application to the frequency centre 7230*.

The simple components H''$_{5,1}$, H''$_{6,1}$ and H''$_{9,1}$ represent by their relative phases the phase differences between the sequential waves O$_{5,1}$, O$_{6,1}$ or O$_{9,1}$, but the said components are continuous. They are sent to the phase exploitation circuit 68 (not shown).

The signals H'' such as H''$_{5,1}$, H''$_{5,2}$ (not shown), etc. may or may not have the same frequency, the result is a very considerable complication for the production of the other simple components of the complex components, and in particular the impossibility of making frequency changes in the manner indicated hereinafter.

If they do not have the same frequency, there is then no major problem in producing the heterodyne frequencies; the difficulty is transferred back to the treatment of signals such as H''$_{5,1}$, H''$_{5,2}$, etc. by the circuit 68 (not shown). In this circuit, however, it is such easier to accommodate signals having different frequencies.

It will be observed in addition that if the mixer 7250* is common for the continuous waves as shown in FIG.

23, the frequencies H''₅, H''₆ and H''₉ have necessarily different nominal values when the unique component *f* is also common, regardless of the index *k* and thus of the transmitting station concerned. If they are equal, it is possible as a modification to use them for obtaining, by integration, information of distance differences.

Hitherto, in the description of the second receiver embodiment, the embodiment of the frequency changes and the frequency centre 7230* has not been discussed in detail.

A point common to all the embodiments of the invention is that the unique component of each complex local signal has a very low nominal frequency (a few c/s), and requires a very narrow pass band of the order to 0.5 c/s.

The teachings of Appendix A of the above-mentioned patent, will be applied, it being pointed out the the frequencies mentioned therein have values agreeing with the values indicated in the first example of radio position-fixing chain set forth in the foregoing.

For a better understanding of the conditions for applying these frequency changes of the embodiment of the receiver according to the present invention, and the resulting advantages, reference will be made to the description of the transmission installations which has been made in the foregoing.

Since the number of heterodyne signals to be supplied by the frequency centre is then fairly high, it is advantageous to utilise for their production the devices described with reference to FIG. A3 of Appendix A of the above-mentioned patent, of the aforesaid Appendix A of the above-mentioned patent.

Since the reception of the specific frequencies is to be continuous, it is evident that the constituent elements of the corresponding reception channels will have characteristics fixed in the sense of the aforesaid patent specification, several stages of frequency changes being possibly common.

The reception of the sequential waves having the measuring frequencies is on the contrary interrupted. It is then sufficient to use a reception channel for each measuring frequency, with fixed characteristics and possibly common elements, according to FIG A7 of Appendix A of the above-mentioned patent of the aforesaid Appendix A of the above-mentioned patent. At the limit, a single reception channel is used for all the sequential waves and all the measuring frequencies, the characteristics of the elements constituting this reception channel being then modifiable by switching, in the sense of the aforesaid Appendix A of the above-mentioned patent, according to a predetermined programme dependent on the reception programme of the sequential waves.

Of course, the arrangements illustrated in FIGS. A4 and A6 of Appendix A of the above-mentioned patent of the said Appendix A of the above-mentioned patent are also advantageously applicable to the embodiment of receivers according to the invention.

The importance of the use of frequency changes according to Appendix A of the above-mentioned patent and the resulting economy will be better understood by referring to the description of the transmission installations. It is of course not essential to use circuits strictly identical with those of the transmitting stations for using them in the receivers.

Of course, numerous embodiment modifications of a receiver may be considered, at the level of general composition and also at the level of individual circuits.

In particular, certain general or detail modifications of the first embodiment of receiver apply to the second embodiment just described, particularly with regard to the operating circuits.

There will now be described with reference to FIGS. 24 to 31 a highly advantageous modification of receiver according to the second embodiment as illustrated in FIG. 19, comprising a number of important improvements, whose interest will appear particularly at the level of the utilisation of the signals.

In this modification, the receiver receives four different transmitting stations for forming two independent hyperbolic networks. The four transmitting stations received are denoted hereinafter by the letters A, B, C and D in a general manner. For abbreviation, the index *k* is given the values *a*, *b*, *c*, *d* respectively for each of the reception channels A, B, C, D, without the values *a*, *b*, *c*, *d* being specified precisely.

Comparing now the contents of FIG. 24 with those of FIG. 19, it appears that the unique frequency source 7220* is followed in FIG. 24 by a circuit 720* which is a frequency and phase corrector responding to information comming from a circuit such as 7222* (FIG. 23 or FIG. 26, discussed in the following).

According to FIG. 23, the circuit 7222* supplies an output similar to a linear combination of the specific frequency residues such as R'₅. In FIG. 21, we have seen that a residue such as R'₅ comprises two signals on two separate, respective lines, one of the signals corresponding to a positive difference and the other to a negative difference.

In FIG. 24, the corrector 720* therefore likewise receives two separate control signals, one positive on a + line and the other negative on a − line, these signals being for example of the same type as those supplied by the circuit of FIG. 21. In any case, it is assumed that the signals are of logical type such as rectangular signals or pulses.

In the first place, the + and − lines are applied respectively to divider-counters 72211* and 72212*, having the same modulus, for supplying a time constant, and the respective outputs of these two counters are applied to the + and − inputs of a reversible counter 72213*. In manner known per se, this reversible counter is coupled stage by stage to a synthesiser 72214*. This synthesiser has an output frequency equal to p/K times its input frequency, p being variable from O to K -1 in a manner controlled by the reversible counter. It is understood that the reversible counter 72213* responds to the difference between two numbers of ascending fronts (for example), arriving respectively on the + line and − line, while controlling a variation in the output frequency of the synthesiser. The frequency of 5 Mc/s supplied by the source 7220* is applied to a divide-by-20 counter 72201*, which therefore supplies 250 kc/s. This latter frequency is applied on the one hand to the synthesiser 72214*, and on the other hand to a divide-by-2 counter 72218*, which are followed respectively by the counters 72215* and 72219* of the same modulus.

In the second place, the + and − lines coming from circuit 7222* are also applied to divider-counters 72216* and 72217* having the same modulus, respectively.

Assuming that the synthesiser 72214* supplies an increasing frequency when the counting of the reversible counter 72213* increases, the output of the divider 72215* supplies rectangular signals which are combined with those of the output of the counter 72216* in an exclusive OR circuit 72221*. The output of the counter 72219* is combined in the same way with the output of the counter 72217* in an exclusive OR circuit 72222*. Finally, the respective outputs of the circuits 72221* and 72222* are applied to a +/− box 72221*.

The synthesiser 72214* and the counter 72218* supply frequencies in the form of rectangular signals. Half the range of frequency correction permitted by the synthesiser is permanently applied to the − input of the +/− box 7221*, from the output of the counter 72219*. This forms a sort of negative frequency polarisation. The synthesiser 72214* may then be used for obtaining a positive or negative frequency correction.

Furthermore, the outputs of the counters 72216* and 72217* supply rectangular signals individually producing a phase correction. It is advantageous to provide a reversible counter at the input of the +/− box 7221*, reducing by so much the moduli of the counters 72215*, 72216*, 72217* and 72219*.

The output of the +/− box 7221* is then used in a circuit called "coincidence detector" of the type described in Appendix D of the above-mentioned patent. By means of such a circuit it is possible to bring into step the frequencies of two different sources with a very high precision. Care will be taken distinguish distinquish this coincidence detector from conventional coincidence detectors. The lay-out comprises a divide-by-250 frequency divider formed of a counter 72223*, connected to the output of the +/− box 7221*, and connected to a first input of the coincidence detector 72224* properly so-called, illustrated by a double lozenge. The detector 72224* is constructed for example as illustrated in FIGS. D5 and D6 of the appendix D of the above-mentioned patent. Its second input receives the signal of a frequency source 72225* by means of a divide-by-10 counter 72226*, while the output of the coincidence detector 72224* controls the frequency of the frequency source 72225*, which has a nominal frequency of 5,010 kc/s. The output of the frequency and phase corrector is formed by the signal of 501 kc/s supplied at the output of the divider-counter 72226*. Finally, this 501 kc/s signal is governed by the unique source 7220*, while undergoing in the circuit 720* the phase and frequency corrections controlled by the + and − lines coming from the circuit 7222*.

This 501 kc/s signal is applied to a second coincidence detector 72201* having its output connected to a frequency source 72203* of 9,600 kc/s, whose output is connected more particularly to a divide-by-9,600 counter 72204*, the output of the latter being connected to the other input of the coincidence detector 72201*.

These circuits form a frequency centre 722*, which therefore supplies a signal of 9,600 kc/s coming from the frequency source 72203*, a signal of 1 kc/s coming from the output of the divider-counter 72204*, a 4 c/s signal, denoted by 2r and supplied in the form of an assembly of different outputs of binary stages of a divide-by-256 counter 72205*, connected to the output of the counter 72204*, and a signal of 2 c/s, denoted by r, supplied by the output of a divide-by-2 counter 72206*, connected to the output 72205*. (Unless stated otherwise, the output of a counter will refer to its division output.)

It is advantageous that the signals supplied by the frequency centre 722* have a common time origin so that they have a "passage through zero" in a definite direction. It will be said that these signals have the same phase reference. In other words, the ascending fronts (or descending fronts in modification) are simultaneous with those of the 9,600 kc/s signal. In addition, the ascending fronts of the signal r are simultaneous with the ascending fronts of the other signals. The signal r consequently gives the phase reference.

Finally, FIG. 24 comprises a circuit 80* which is called "stimuli" generator. The word "stimulus" is used here to denote a signal generated locally at the level of the receiver, having one of the measuring frequencies $F_m$ and intended to be processed exactly like the received momentary waves $O_{km}$, which have the measuring frequencies $F_m$.

The circuit 80* comprises a synthesiser 802*, whose control inputs are coupled to a fixed store 801*, such as a diode matrix. The synthesiser 802* receives the frequency of 9,600 kc/s and its output is applied to a circuit 803* dividing the frequency by 12. The diode matrix 801* is adapted to control the synthesiser 802* such that the output of the divider 803* can supply each of the measuring frequencies according to a programme signal $P_1$.

The synthesiser 802* has, for example, a factor K equal to 6,400, and a number $P_m$, which depends on the measuring frequency $F_m$ controlled by the programme signal $P_1$, with $P_m = F_m/125$ c/s.

The signal $P_1$ is properly speaking the reception programme signal. It is illustrated in FIG. 30, to which reference will now be made, at the same time as to FIG. 3, which is the transmission programme. FIG. 30 concerns only the first minute of the transmission programme, that is to say the first two boxes on the left of the table of FIG. 3.

For five seconds before and after each switching of the transmission programme of FIG. 3, therefore for 10 seconds in all, the reception programme controls the production of a "stimulus" on one of the measuring frequencies. During the time interval of 20 seconds, which passes from the fifth to the twenty-fifth seconds of each transmission programme box, the reception programme comprises four reception boxes successively for the momentary wave which is being transmitted at that moment by each of the selected transmission stations A, B, C, D. The frequency measuring values are to be sure defined by the transmission programme of FIG. 3 and the real choice of the transmitting stations is denoted generally by A, B, C, D. In FIG. 30, this measuring frequency is denoted by $F_a$, $F_b$, $F_c$, $F_d$.

With regard to the reception of the sequential waves having the measuring frequencies, the reception programme is defined as soon as the reception time intervals of A, B, C, D are fixed, because the values of the frequencies follow therefrom immediately according to FIG. 3. On the other hand, for putting into operation the "stimuli," the choice of the frequencies remains free after the intervals of time of putting the stimuli into operation have been fixed. It will be assumed that the choice is made as shown in FIG. 30: measuring frequency $F_1$ about zero second, $F_2$ about 30 seconds, frequency $F_3$ about 60 seconds, etc.

It will therefore be understood that the diode store 801* is adapted to respond to the programme signal $P_1$ by controlling at any instant the measuring frequency (if it exists) corresponding to the output of divider 803*. It will be noted, however, that in the programme circuit $P_1$, the measuring frequencies are not distinguished as to whether it is a matter of the reception of sequential waves or of the use of stimuli. A programme signal $P_2$ is therefore used to represent the presence of stimuli, with the shape indicated in FIG. 30. This signal $P_2$ is applied for the forced and durable resetting to zero of the divider-counter 803*. The latter, therefore, can provide a stimulus at its output only when the signal $P_2$ is at the upper level in FIG. 30. Therefore, the signal $P_2$ alone gives the time intervals for putting into operation the stimuli, in a manner independent of the reception of the momentary waves. It is assumed that the power level of the stimuli is sufficiently higher than the power level of reception of the waves for the waves received to be negligible when the stimulus is applied to the reception channels by the output of counter 803*.

Finally, it is known that a synthesiser followed by a divider-counter, such as 802* and 803*, respectively, make it possible to act on the frequency of a signal. However, the phase of the signal leaving the divider is in principle not strictly defined.

The Applicants have found that the states of the different stages of the counter 803* and also of the synthesiser 802* constitute a form of representation of the phase of the output signal of counter 803*, and that by using the 2 c/s signal $r$ coming from the circuit 72206* for resetting to zero all the stages of counter 803* and advantageously of the synthesiser 802* at the moment of the ascent front (or of descent in a modification), each ascent front of the signal $r$ is simultaneous with an ascent front of the signal supplied by the stimuli generating circuit 80*. Whereas the phase of the latter signal is not defined on departure, it may be written that the signal $r$ serves as reference for "reconstituting" the phase of the output signals of counter 803*.

Of course, it is useful to transform the signal $r$, which leaves the counter 72206* in a rectangular form, into pulses at the moment of ascent (or in a modification, of descent) of the rectangular signal, for returning to zero all the stages of circuits 802* and 803* at the moment of the ascent front. This transformation into pulses is considered as being accessible to the person versed in the art. In what follows, the circuits producing this transformation will not be illustrated or mentioned, it being understood that they may exist whenever resetting to zero at a given moment is described.

When, on the contrary, as for the signal $P_2$ applied to the counter 803*, resetting to zero is effected in a durable manner, it is clear that no transformation into pulses is carried out.

Hereinafter, numerous structures will be found analogous to those of circuit 80*, on the one hand with regard to the control of a synthesiser by means of a diode store (illustrated in the Figures by a square block containing a vertical diode), on the other hand concerning the "reconstitution" of a phase by the 2 kc signal $r$. In fact, the signal $r$ may serve to "reconstitute" the phase of any signal derived from the 9,600 kc/s signal and having a frequency which is a multiple of 2 kc/s.

In FIG. 25, circuits of FIG. 19 will be found again for the most part. In addition, the frequency centre 230* of the said FIG. 19 is split up to show its different elements. Finally, in a manner similar to that shown for the transmitting stations (FIGS. 5 and 6) for each reception channel there are two frequency changes, in which the heterodyne frequency is supplied by division of the 9,600 kc/s frequency, and a third frequency change of which the heterodyne frequency is supplied by a synthesiser followed by a frequency divider.

In FIG. 25, the first two frequency-changing stages are common in so far as concerns the reception of the specific frequencies of the four selected transmitting stations A, B, C, D. They have the same structure as the first two stages of FIG. 9.

By way of example, only the third frequency-changing stage will be described, this stage relating to the transmitting station A. It comprises a synthesiser 7231C*, controlled by a diode store 7231E*, which responds to a selected value of the index $k = a$ of the transmitting station A. The synthesiser 7231C* is followed by a divider-counter 7231D*, whose circuit supplies the heterodyne frequency of a mixing circuit 7251C*. The mixing circuit 7251C* is represented by a double square block, indicating that it is advantageously adapted for eliminating the image wave, for example as described in Appendix A of the above-mentioned patent in conjunction with FIG. A4 thereof.

The final frequency-changing stages allocated to the transmitting stations A, B, C, D therefore supply respectively signals denoted by $f_a, f_b, f_c, f_d$. These rectangular signals have a nominal frequency whose value is defined by the circuits downstream, as described hereinafter, regulation of the synthesisers, such as 7231C* being effected in consequence.

With regard to the measuring frequencies, they arrive on the one hand from the aerial 71*, and on the other hand by the stimuli generator 80* by means of a matching circuit 808*, adapted to have known phase displacement at the different measuring frequencies and comprising for example a very low capacitance.

Reception of the measuring frequencies is effected like that of the specific frequencies, except that the filters of the first frequency changes (all the references 7244*), frequency dividers 7234A* and 7234B*, and the synthesiser 7234C* coupled to the diode store 7234E* are variable in response to the programme signal $P_1$. A synthesiser may be variable in the manner hereinbefore described. For the divider-counters and filters, variability is obtained by change-over switching. This variability in fact permits a saving of means and is described more particularly in Appendix A of the above-mentioned patent.

In addition, the divider-counters 7234A*, 7234B*, 7234D* and advantageously the synthesiser 7234C* all receive the signal $r$ which effects phase resetting of all the components of the second complex local signals, in the manner described with regard to circuit 80* of FIG. 24.

The output of the mixer 7254C* is applied to a filter 7264A* and a clipper 7264B*, whose output supplies a signal $f_{km}$, where the index $k$ is limited to the values $a, b, c, d$ which are effectively selected for the transmitting stations A, B, C, D. These signals are derived from the momentary waves received. The output 7264B* supplies in addition "stimuli $f_m$" or "ST.$f_m$" signals, derived from the stimulus $F_m$ after frequency changes.

The values of the division factors of the table, given in the course of the description of the frequency changes in the transmitting stations, remain valid for the receiver. All the synthesisers of FIG. 25 have a number K equal to $4096 = 2^{12}$, and the adjustment of the factors $p$ is different; it is necessary in fact to take into account the common nominal value of the frequencies $f_k$ and $f_{km}$, say about 4 c/s, as will now be seen.

FIG. 26 illustrates the embodiment of the synchronous detectors supplying the frequency residues $R'_k$ and the phase residues $R'_{km}$ ($k = a,b,c,d$).

We shall first of all consider synchronous detection of the signal $f_a$ obtained by frequency changing from the permanent wave received by the channel A. It is assumed for example that the specific frequency of this wave is $Fs_5$.

The circuits shown in FIG. 26 are identical with those of FIG. 16, the frequency $Q_5$ applied to the block 77203* being in addition derived by a synthesiser 7210* from the frequency 1 c/s which comes from the circuit 62*, as indicated in the foregoing. It is possible to make the synthesiser 7210* common to the channels A, B, C, D if it is adjusted by construction to a value corresponding to the specific mean (for example K = 6,400 and $p=$ the nearest whole number to the mean of the specific frequencies divided by 250 c/s; $p$ being as large as possible between 3,200 and 6,400, if necessary the circuit 77203* being given a greater division factor than that of the circuit 7711*.)

The frequency applied to the +/− box 77201* is the 1 kc/s coming from the circuit 722*. The modulus of the counter 77202* being equal to 256, it follows that the nominal value common to the low frequencies $f$ is equal to 1,000 : 256 = 3.906 c/s approximately, as already indicated.

In addition, in FIG. 26, a circuit 7711*, of the type shown in FIG. 21, is used for weighting the frequency residue $R'_5$ supplied by the frequency difference detector circuit 7745*, the frequency $Q_L$ of FIG. 21 being the 1 kc/s coming from the circuit 722*.

With regard to the measuring frequency, FIG. 26 comprises only one phase detector 7771* and one circuit 77513*. However, instead of being done in the detector 7771* as in FIG. 18, inhibition of phase control is effected in circuit 77513*, for example by forcing to zero the bistable multivibrators or blocking the weighting signal $R_{5,1}$.

Furthermore, there is an important difference between the modification of FIG. 26 and the embodiment of FIG. 18. The result of this difference is more particularly the fact that the circuit 77513* receives directly the frequency of 1 kc/s supplied by the circuit 7711*. In fact, this circuit 77513* plays the same part as the circuit 7711*; it supplies weighting of the phase residues $R'_{km}$ and $St.R'_m$ supplied by the phase detector 7771*, respectively for the signals $f_{km}$ obtained from the received momentary waves and for the signals $St.f_m$ obtained from the stimuli. It will be recalled in this connection that the reception channel of the measuring frequencies of FIGS. 25 and 26 is distinguished only by the frequency values, the distinctions between the waves, according to the original transmitting station and also with the stimuli, being made by the programme signals. For these programme signals, only their form is given, their production being considered to be within the capacity of the person versed in the art.

The essential difference between this modification and the previously described receivers is the following:

in the first embodiment, FIGS. 10 and 12 are for example, the frequency and phase residues are integrated separately; the continuous residue of specific frequency $R'_s$ is integrated in the computer 7741, at the same time that it acts on the frequency source 7710*, which continuously distributes this frequency difference to counters such as 7791*. Each of the counters integrates in turn individually the differences thus obtained, proportionally to the respective measuring frequencies $F_m$. A readjustment is made by the +/− box 7761* when a sequential phase residue $R_{51}$ appears;

in the second embodiment, FIGS. 16 and 18, the mode of operation is the same but the frequency residues themselves, such as $R'_5$, are used for feeding each counter, such as 77212*, by the +/− box 77211* and the weighting circuit 77213*;

in the present modification only the specific frequency residues $R'_k$ are integrated, and a phase multiplier is used for deriving from these integrated values the corresponding phases, reduced to the measuring frequencies.

In FIG. 27, the 9,600 kc/s signal coming from circuit 7722* is applied to a divide-by-3 counter 900, which therefore supplies a signal having a frequency of 3,200 kc/s. This signal is applied to four +/− boxes, respectively 902A to 902D, which receive as control signals the residues $R'a$, $R'b$, $R'c$ and $R'd$ from the synchronous detection circuits A, B, C, D of FIG. 26.

The outputs of the +/− boxes 902A to 902D are applied respectively to counters 901A to 901D, as in FIG. 28 to corresponding identical counters 931A to 931D.

If we now consider once more FIG. 26, the sensitivity factor at the inputs of the detector 775* is given by the frequency Fa (although, because of frequency changes, the frequency therein is about 4 c/s). At the output of the +/− box 77201*, the sensitivity factor is given by the frequency Fa.256.

Concerning the residue weighting circuits 7711* and 77203*, it will be recalled that they receive the respective frequencies 1 kc/s, and 1 kc/s multiplied by 6,400 (because of the synthesiser 7210*). In fact, these circuits each comprise not only a pair of bistable multivibrators J-K but also a pair of counters, the respective division factors being different from one pair to the other.

These two circuits are so adapted that the sensitivity factor at the output of the counters 901A to 901D is equal to 250 c/s, taking the division factor $N_o$ into account.

In FIG. 27, the inputs of counters 901 are applied to a change-over switch 903, and their outputs are applied to a change-over switch 904, these two switches being controlled simultaneously by the programme signal $P_4$ of FIG. 30. Outside the stimuli, this programme signal $P_4$ selects one of the received transmitting stations (A to D) for using the information derived from the specific frequency residue associated with the said transmitting station in the rest of the circuits of FIG. 27. It will now be assumed that programme signal $P_4$ is on the channel A.

In FIG. 27, the circuits 911 to 917 form a switch 904 possessing the function of phase multiplier, and this to be so designated. It comprises two identical synthesisers 911 to 915, controlled simultaneously by a diode store 914 according to the programme signal $P_1$. The phase multiplier also comprises three identical counters 912, 913 and 916, all dividers by 256. Finally the divider-counters 913 to 916 have the outputs of all their stages coupled respectively to the inputs of a subtractor 917, in the order of the corresponding weights.

In FIG. 27, the synthesiser 911 has two materialised outputs, the output p/K which alone has been considered up to the present in the synthesisers and does not bear any distinctive mark in the drawings, and an output 1/K (pure and simple division by K) which is applied to the counter 912, while the said output p/K is applied to the counter 913.

The output of the counter 912 is a phase reference similar to that supplied by the aforesaid signal $r$. It is applied to reset the counter 913 to zero.

Furthermore, the stages of the synthesiser 915 and of the counter 916 are reset to zero by the output of the switch 904 which is that of the counter 901A. This zero resetting is therefore effected according to the phase of the output signal of counter 901A.

The division factor $N_o$ of all the counters 901 is selected to the product of the number K, common to the synthesisers 911 and 915, multiplied by the division factor 256, common to the counters 912, 913 and 916. The result is that the output of the counter 912 has the same frequency as that of counters 901.

Furthermore, the two synthesisers 911 to 915 being fed by the same frequency 5,200 kc/s and having the same coefficient $p_m$, the divided output frequencies (not shown) of counters 913 and 916 are equal to one another and equal to the product of the output frequency of counter 912 (and of counters 901) multiplied by the coefficient $p_m$.

On the other hand, the phase of the output signal of counter 901A comprises a phase difference relative to the reference phase supplied by the output signal of counter 912; the phase difference is due to the action of the +/− box 902A.

In fact, the input signal of counter 901A is the signal coming from the counter 900 whose frequency is 3,200 kc/s, modified by the +/− box 902A. It will be recalled that a +/− box adds or suppresses the ascent fronts in the signal passing through it (or descent fronts or pulses, according to the nature of the signal passing through it). The person versed in the art will understand that each ascent front added or suppressed corresponds to a period more or less, respectively, in the 3,200 kc/s signal. The modification of a period is thus obtained is equal to one phase rotation. Returned to the output of a counter such as 901A, this phase rotation is divided by $N_o$ and becomes a modification of ($1/N_o$) of one rotation of the phase of the output signal of this counter.

It has been seen above that the frequencies of the divided outputs (not shown) of counters 913 and 916 are equal to one another and to the product of the output frequency of counter 912 and counter 901A multiplied by the coefficient $p_m$.

Due to the fact that resetting to zero of counters 913 and 916 is effected according to the phases of the respective output signals of counters 912 and 901A, the phase difference between the output signals of counters 913 and 916 is equal (except for a whole number of rotations) to the product of the phase difference existing between the output signals of counters 912 and 901A multiplied by the same coefficient $p_m$.

It should be noted that the fact of applying to the synthesiser 915 the 3,200 kc/s signal coming from the circuit 900 and having passed through the +/− box 902A results in the permanent realisation of the above relationship once the first zero resetting of counters 913 and 916 has been carried out.

As has already been explained, the different sorts of stages of counters 913 and 916 are representative of the phases of the output signals divided by these counters.

These stage outputs are applied in the order of the corresponding weights to the inputs of a numerical subtractor 917.

The output of the numerical subtractor 917 is therefore representative of the phase difference between the output of counter 901A and the output of counter 912 multiplied by the number $p_m$. For that reason, the device just described is called "phase multiplier." For synthesisers 911 and 915, the values of $p_m$ are controlled by diode store 914 as a function of the programme signal $p_1$, according to the relationship:

$$p_m = \frac{F_m}{250\ c/s}.$$

We have seen in fact that the phase at the output of counters 901 has been a selected sensitivity factor equal to 250 c/s.

In the foregoing, it has been assumed that:

$$N_o = K.256.$$

It will be observed that the same mode of operation is obtained when $N_o$ is a multiple of the product K.256.

It has previously been stated that the sensitivity factor of the output of counters 901 was equal to 250 c/s. This means that a variation of 1 phase rotation difference between the output signal of a counter 901 and a reference signal of the same frequency corresponds to a variation in the propagation distance of $$\frac{300,000}{250} = 1,200\ km$$

(making the approximation that the speed of propagation is equal to 300,000 km/s).

It will be noted that the output frequency of the counter 901A is about 2 c/s. Nevertheless, the output phase of the counter 901A has a sensitivity of 250 c/s with regard to its proportionality relationship with the propagation time of the waves coming from the transmitting station A.

Considering now the propagation time, the output of counter 901A is $$Ta - To + Ua,$$

$Ta - To$ being the time given by integration of the difference between the Doppler effect on the continuous wave coming from the transmitting station A and the instabilities of the unique frequency source, and $Ua$ being an integration constant, unknown hitherto, which depends on the initial situation of counter 901A.

The outputs of the other counters 901B to 901D have the same form. The circuits of FIG. 27, which will now be described, produce the control of the phases of the second local signals relative to those of the sequential waves received, and permit the constants such as $Ua$ to be determined.

In FIG. 27, we shall now consider the reversible counter 918, whose modulus is 256, and the writing-reading store 919, which has a capacity of 48 bits; 8 bits (for 246) for each of the 6 measuring frequencies.

These two circuits allow the phase differences $qm$ in the reception channels to be stored by utilising the stimuli on the measuring frequencies $F_m$.

Referring to the programme of FIG. 30, the switch 922, normally closed, is opened by the signal $P_2$. At the same time, the signal $P_1$ addresses the writing-reading store at the place allotted to the measuring frequency $F_1$. Assuming that the store 919 may be read at any moment at the store positions addressed, the reversible counter 918 is pre-positioned at the value previously stored, in response to the programme signal $P_5$. Switch 922 being open, it only applies 0 bits to the adder 921 (it is preferable actually to manufacture these zero bits in response to the programme signal $P_2$). The adder 920 adds the phase $\phi_m$ contained in the reversible counter 918 to the 4 c/s signal supplied by counter 72205* of FIG. 24. Only the bit of greater weight from the addition is retained as constituting the signal $St \cdot f'_m$. This signal $St \cdot f'_m$, in the phase detector 7771* of FIG. 26, is opposed to the stimulus coming from circuit 80* after frequency changing. This comparison produces a phase residue $St \cdot R'_m$ which is weighted by circuit 77513*. As was seen previously with reference to FIG. 21, such a residue comprises a + signal and a − signal. The residues are applied to a switch 926 which sends them to the reversible counter 918 in the presence of the stimuli indicating programme signal $P_2$ or to a reversible counter, described later, in the contrary case. In the presence of the programme signal $P_2$, the + signal and the − signal of the phase residue $St \cdot R'_m$ are applied respectively to the + and − inputs of the reversible counter 918 for correcting its value until the phase difference detected by the phase detector 7771* is zero. This is normally true at the end of the stimulus. The value $\phi_m$, thus corrected and contained in the reversible counter 918, is then recorded in the store 919 by the action of the signal $P_6$ of FIg. 30. It is thus possible to record in the store 919 six quantities representative respectively of the phase differences $\phi_m$ in the receiving circuits for the six measuring frequencies F$m$.

The circuit consisting of the reversible counter 924 and the writing-reading 925 functions in the same way, but the store 925 contains four times more information than the store 919 (as much as the store 919 for each of the four transmitting stations A, B, C, D received).

This store 925 contains information of the form $Fm \cdot Uk$, with $k = a, b, c$ or $d$ and $m$ variable from 1 to 6 for each of the measuring frequencies; that is to say, products of the constants U multiplied by the different measuring frequencies.

The store 925 receives, as address signal, the programme signal $P_7$ of FIG. 30, resulting from the combination of the programme signal $P_1$ with the programme signal $P_4$ by removing the stimuli time intervals, given by the signal $P_2$.

Assuming arbitrarily that the measuring frequency $F_1$ is received from the transmitting station A, the reversible counter 924 receives the values $F_1 \cdot Ua$ previously stored in the store 925, according to the address of the programme signal $P_7$. At the same time, the programme signal $P_1$ acts on the synthesisers 911 and 915 in order that the output of the subtractor 917 will be a phase $F_1$ ($Ta - To + Ua$). The output of the subtractor 917 is subtracted from the contents of the reversible counter 924 in a subtractor 923, which gives $F_1$ ($Ta - To$). The multiple switch 922 being closed, the output $F_1$ ($Ta - To$) of the subtractor 923 is applied to the adder 921 together with the phase difference $\phi_1$ contained in the reversible counter 918; finally, the output of adder 921 is added in adder 920 to the signal 4 c/s coming from the counter 72205* of FIG. 24. The bit of greater weight forms a signal $F'a1$ which in the phase detector 7771* is opposed to the signal $Fa1$ derived from the wave $Oa1$ after frequency changing. The residue $R'a1$ then acts, after weighting in 77513*, on the reversible counter 924 to obtain zero phase difference at the terminals of the circuit 7771* of FIG. 26. At the end of this operation, which is materialised by the signal $P_8$ of FIG. 27, the new value of $F1 \cdot Ua$ contained in the reversible counter 924 is transferred to the store 925.

In a general manner, the values thus obtained are corrections $Fm \cdot Uk$ to be applied to the phase $Fm$ ($Tk - To + Uk$) supplied by the phase multiplier from counters 901 so that the phase of the second local signal $f'_{km}$ supplied by the output of adder 920 will be equal to that of the signal $f_{km}$ derived from the corresponding mementary wave $O_{km}$. This correction does not comprise the reception phase differences $qm$, which are contained in the store and are applied separately by the adder 921. It will be observed further that the stores 919 and 925 may be regrouped to form one and the same store block.

Consequently, the information contained in the store 925 corresponds to the phase constants U existing in each of counters 901. As will be seen later, the operation of ambiguity removal consists in using the information contained in the store 925 fo eliminating the phase constants U from each of the counters 901. This operation is effected by means of the counters 931 of FIG. 28.

It will be observed that hitherto, the programme signals (FIG. 30) have been connected to the transmission programme; the programme signals which will be used now (FIG. 31), on the contrary, are independent thereof.

In FIG. 28, the inputs of counters 931A to 931D are connected to a switch 932, while the outputs of counters 901A to 901D are applied to a switch 933. The outputs of counters 931A to 931D are applied to a switch 934; finally the counters 931A to 931D have each an instantaneous zero re-setting input connected to a switch 935. The four switches 932 and 935 are controlled by the programme signal $P_9$ which selects successivly one of the positions A to D for the removal of ambiguity. In FIG. 31, the programme has been limited to the removal of ambiguity for the transmitting station A, the programme being analogous for the other transmitting stations B, C, D received.

Switches 932 to 935 are connected on the other hand to a phase multiplier, similar to that shown in FIG. 27. The phase amplifier comprises a synthesiser 936 and a counter 937 connected to the output of the synthesiser, the synthesiser receiving by means of switch 932 the input frequency of counter 931A, which is the same as that of counter 901A. By means of the switch 933, the output signal of counter 901A is applied for zero re-setting of synthesiser 936 and of counter 937.

Furthermore, the output signal of switch 932 is applied by means of a+/−box 948 to a synthesiser 938, whose output 1/K is connected to a counter 939, and whose output p/K is connected to a counter 940. The output of counter 939 is used for zero re-setting of counter 940 and is at the same time applied, by means of a switch 951, controlled by a programme signal $P_{11}$, to the switch 936 for zero re-setting of one of the counters 931, the duration of closure of switch 951 being made long enough to ensure that a change of state will appear at the output of counter 939 during the closure.

In a similar manner, but in the reverse sense, the switch 934 receives the output of counter 931A which is applied by means of a switch 950 controlled by a programme signal $P_{10}$ for zero re-setting of the synthesiser 938 and counter 939.

As in FIG. 27, the moduli of counters 937, 939 and 940 are equal to 256, and the numbers K of synthesisers 936 and 938 are both equal to 6,400 while their numbers p are controlled by a diode store 949 which responds to a programme signal $P_{12}$ to be commented on later.

The outputs of stages of counters 937 and 940 are subtracted in a subtractor 941, whose output is therefore representative of the phase difference between the output of counter 901A and that of counter 931A, mutiplied by a coefficient which depends on the number p common to synthesisers 936 and 938, and controlled by the diode store 949 in response to the programme signal $P_{12}$.

It will now be recalled that the output signal of counters 901 and 931 has a sensitivity factor of 250 c/s. The values of the numbers p of synthesisers 936 and 938 are then defined by the quotient of the differential ambiguity removal frequencies $G_q$ by 250 c/s.

These differential ambiguity removal frequencies $G_q$ are for example obtained in the manner illustrated in the following table with $q = 1$ to 7.

| | | | |
|---|---|---|---|
| $G_1 =$ | $F_2 - F_6$ | = | 250 c/s |
| $G_2 =$ | $F_2 - F_5$ | = | 750 c/s |
| $G_3 =$ | $F_2 - F_4$ | = | 3 kc/s |
| $G_4 =$ | $F_2 - F_3$ | = | 14 kc/s |
| $G_5 =$ | $F_2 - F_1$ | = | 74 kc/s |
| $G_6 =$ | $F_2$ | = | 400 kc/s |
| $G_7 =$ | $\dfrac{\Sigma F_m}{2}$ | = | 1172 kc/s |

To obtain the phases of these differential frequencies from the information contained in the store 925 of FIG. 27, use is made of an adder-subtractor 942 and a writing-reading store 943, which serves as accumulator. The address signal $P'_7$ of FIG. 31 is applied to the store 925, taking care to avoid interferences between addresses for signal $P'_7$ and signal $P_7$ of FIG. 30. Signal $P_{13}$ controls either a simple transfer or an addition or a subtraction in the circuit 942 and signal $P_{14}$ controls storing in the store 943. This store 943 is of the type capable of supplying at its output its old signal simultaneously with the writing of the new signal.

While the signal $P_{12}$ is on the differential frequency G1, the output of the subtractor 941 supplies the phase difference between the outputs of counters 931A and 901A multiplied by G1.

During this time interval, in response to the signals $P_{13}$ and $P'_7$ the adder first of all receives the phase information $F_2 \cdot Ua$ coming from store 925 (transmitting station A, measuring frequency $F_2$). This information is transferred directly to store 943 where it is stored. Adder 942 is then controlled for subtracting the phase information $F_6 \cdot Ua$. from the phase information $F_2 \cdot Ua$, the result $(F_6 - F_2) \cdot Ua$ being again written into the store 943.

After this operation, the result is transmitted by channel Δ to subtractor 944, which combines the phase information thus obtained with that which leaves subtractor 941. The sign bit of the result is retained to be applied by means of switch 946 to a routing circuit 947 which products a frequency and sends it to the + input or − input of the +/− box 948, for example by coupling the bits of significant figures of subtractor 944 to the control inputs of a synthesiser (not shown), intended to supply the frequency to be applied to the +/− box.

In consequence, the divergence $G_9 \cdot U_k$ between the phase information contained in the store 925 is compared with the divergence $G_9 \cdot U_k$ obtained from the phase difference between the outputs of counters 901 and 931, the phase of counter 940 being modified by the +/− box 948, such that the difference between the divergences is zero.

As illustrated by the programme of FIG. 31, the operations are repeated with progressively increasing differential frequencies. As the differential frequency increases, the phase contained in the various stages of counter 939 is adjusted with increasing accuracy.

In the example considered, the final sensitivity is obtained with the half-sum $\Sigma/2$ of all the measuring frequencies $F_m$. This half-sum is made with the channel $\Sigma/2$ and the subtractor 945, switch 946 being in the other position. The usefulness of the separate channel $\Sigma/2$ consists solely in shifting all the binary weights in order thus to effect division by two.

Ambiguity removal is achieved after utilisation of the sensitivity $\Sigma/2$. At this moment, the switch 951 is closed by the programme signal $P_{11}$, and the counter 931A is re-set to zero by the output of counter 931A. The phase of the output of counter 931A is then adjusted very accurately, taking into account the phases of the sequential waves as received from the transmitting station A, all these phases having a common reference which is defined by the zero re-setting signal of counter 913 of FIG. 27, this signal itself being defined by the 3,200 kc/s output of counter 900. In other words, the output of counter 931A is the signal Ta − To.

The outputs of counters 931A to 931D are applied to the output circuits of FIG. 29. Two switches 961 and 962 permit choice of the two transmitting stations defining a first hyperbolic network. These outputs are rectangular signals evolving in time, one with a certain advance over the other. A circuit 963 detects the first signal arriving, for example by logical comparison. It then controls the signal of a display device 968, as well as a double inverter 964 for the two signals concerned. The first signal arriving controls the re-setting to zero of a divider-counter 966 in binary decimal code, which receives the frequency 9,600 kc/s across a synthesiser 965, permitting regulation of the unit of measurement of the displayed difference in distances. The different stages of counter 966 are coupled to a store 967 whose writing control depends on the second arrival of the two aforesaid signals, supplied by the double inverter 964. The value thus recorded in the store 967 is therefore the difference in the distances from the receiver to the two transmitting stations B and C. This value is transmitted periodically to a display circuit 968. The block 2 of FIG. 29 illustrates diagrammatically the external appearance of the corresponding display circuit for the second hyperbolic network.

In the foregoing descriptions of FIGS. 27 and 28, no distinction has been made between transient conditions and steady conditions.

Regarding FIG. 27, transient conditions occur when the values contained in the stores 919 and 925 are completely false, on the departure of the moving object carrying the receiver, for example. The person versed in the art will understand that after reception of a period of the transmission programme, that is to say, at the end of 5 minutes, the values stored are already good enough to serve for the removal of ambiguity, It is, however, often advantageous during the start of the receiver to commence by a systematic utilisation of the stimuli on the different measuring frequencies $F_m$ with a view to determining the phase differences of the reception channels before proceeding to the reception of the sequential waves $O_{km}$ having to measuring frequencies.

As previously pointed out, the programme relative to FIG. 28 is independent of the programme of transmission of the waves. It is therefore possible to conduct as desired the ambiguity removal operations.

One method to be used on starting the receiver consists in removing the ambiguity completely for each transmitting station by utilising all the sensitivities in the order giving an increasing precision (it is recalled if the coarsest frequency is 250 c/s it is possible to remove the ambiguity completely when the transmitting stations used are less than about 600 km distant). Once the removal of ambiguity has been effected up to the maximum accuracy for the transmitting stations used, it is then possible to use solely the finest information supplied by the channel $\Sigma/2$ and the subtractor 945 of FIG. 28. If subsequently the information becomes manifestly false in durable manner for one or the other of the transmitting stations, it is possible to repeat a complete operation of ambiguity removal with regard to the said station. In this respect, it may be advantageous to duplicate each of the counters 931A to 931D, the ambiguity removal function being separated from the display function.

It appears from the foregoing that the present invention provides a new method of radio position finding whose principal advantages are of the small number of allocations of required radio-electric frequencies and an excellent ratio of the precision obtained relative to the performances of the technological means employed. As specified in the foregoing (frequency values, transmission programme), the method of radio position finding is particularly adapted to navigation and particularly to fishing applications.

Of course, the present invention is by no means limited to the applications, frequency values and embodiments described, and numerous modifications may be effected by the person versed in the art in regard to both transmission installations and receivers. It is necessary also to include in the invention modifications of the method of ratio position fixing which more particularly may result in an adaptation in terms of other applications and/or other frequency values.

Up to the present, it has been explained that each transmitting station radiates only one continuous wave having a specific frequency. It also comes within the scope of the invention of course of each transmitting station to radiate an of such waves, more particularly for increasing the safety and accuracy of the results. The different specific frequencies then allotted to each transmitting station may, on reception, be used more particularly either simultaneously while taking the mean of the information which they make it possible to obtain, or alternatively by selecting the frequency found to be the best, for example as a function of time and distance. It may be particularly advantageous for the various specific frequencies associated with each transmitting station to belong to several distinctly different frequency ranges (for example 300 kc/s and about 27 Mc/s).

In the same way, the same radio position fixing chain may use measuring frequencies belonging to several very different ranges.

Thus, for example, for reducing the ambiguity due to a frequency of the order of 300 kc/s, it is possible to utilise not two frequencies such as 332 and 406 kc/s, as described, which belong to the same frequency range and have a difference of the order of 100 kc/s, but rather to employ purely and simply one frequency of the order of 100 kc/s.

More generally, it may be advantageous to use in the same installation several measuring frequencies belonging to a first frequency range, and several others belonging to a second frequency range.

Thus, an installation may comprise two parts, of which the first functions for example in the 300 kc/s range with complete removal of ambiguity, and the second functions in the 80 Mc/s range.

This provides the advantage that the ambiguity is removed completely by the first part to a sensitivity factor corresponding to 300 kc/s (or more), and the measurments may then be refined to a sensitivity factor corresponding to 80 Mc/s by the second part.

It is otherwise clear that when a large number of different sensitivity factors with low ratios (less than 3 for example) between two adjacent sensitivity factors are available, the ambiguity may be removed, even when each phase measurement is very inaccurate ($\pm \frac{1}{4}$ of a rotation, for example).

It follows that even when the sky waves have an electromagnetic field much greater than the direct waves, these sky waves may possibly be used for carrying out all the operations usually effected on the direct waves, and for finally obtaining radio position fixing free from ambiguity and whose accuracy depends practically only on the knowledge one may have on the characteristics of the reflecting layers producing the said sky waves.

Finally, it should be mentioned that the other navigation aids (compass, inertia log), enable one, from a knowlege of the speeds and particularly the accelerations of the moving object carrying the receiver, to know at any instant the approximate value of the Doppler effect, and consequently the very accurate frequencies of the waves necessary for receiving them; it is then possible to reduce considerably the pass-bands of the reception channels of the continuous waves (at least) and consequently to increase the safety and accuracy of the results.

What we claim is:

1. Apparatus for determining the position of a receiver by radio position-fixing comprising:
    at least two transmitting stations, each being adapted to radiate
    a continuous specific signal of first selected frequency, the frequency of said specific signal radiating from each of said transmitting stations being different from the frequency of said specific signal radiating from all other transmitting stations, and
    a sequential signal of second selected frequency, the frequency of said sequential signal being the same at all of said at least two transmitting stations, at most one transmitting station radiating said sequential signal at any time, and
    a receiver being adapted to continuously receive at least two of said specific signals and to receive said sequential signal, said receiver including means for decoding said specific signal and said sequential signal to obtain the position of the receiver.

2. Apparatus as in claim 1 wherein said means for decoding includes:
apparatus to continuously generate two first local signals having nominal frequencies equal to those of the at least two specific signals received,
first means for making the actual frequencies of the two first local signals equal to the frequencies of the at least two specific signals,
apparatus to generate two second local signals having nominal frequency equal to that of the sequential signal, and
second means for making the actual frequencies of the two second local signals proportional at the actual frequencies of the first local signals, respectively.

3. Apparatus as in claim 2 wherein the second means for making includes:
apparatus to make the ratio of the actual frequencies of the two second local signals to the actual frequencies of the first local signals equal to the ratios of the nominal frequency of the sequential signal to the nominal frequencies of the specific signals from each of said transmitting stations, respectively, and
apparatus to cause the phase of each second local signal to be equal to the phase of the corresponding sequential signal as received from each of said transmitting stations plus a constant.

4. Apparatus as in claim 3 wherein said second means for making is adapted so that the phase difference between the two second local signals is indicative of position-line information.

5. Apparatus as in claim 2 wherein:
each transmitting station is adapted to generate a unit program signal for controlling transmission of the sequenial signal, and to transmit the sequential signal during the program signal.

6. Apparatus as in claim 2 wherein said means for decoding is adapted to generate continuously the second local signals.

7. Apparatus as in claim 6 wherein said means for decoding is adapted to generate the first and second local signals from a single frequency source.

8. Apparatus as in claim 3 wherein:
the first means for making is adapted to adjust the phase of the first local signal to differ only by a constant amount from the phases of the continuous specific signals, respectively.

9. Apparatus as in claim 2 wherein:
the receiver is adapted to transmit back to each of said transmitting stations information concerning the signals received from each of said transmitting stations, and
each of said transmitting stations is adapted to maintain an identical ratio of actual frequency to nominal frequency.

10. Apparatus as in claim 1 wherein each transmitting station radiates a plurality of sequential signals, each of a different frequency.

11. Apparatus as in claim 2, wherein said means for decoding is adapted to generate the second local signals only during reception of the sequential signal from the at least two transmitting stations, respectively.

12. Apparatus as in claim 1 wherein said means for decoding includes:
first apparatus to continuously generate two first local signals having nominal frequencies equal to those of the at least two specific signals received, including first means for making the actual frequencies of the two first local signals equal to the frequencies of the at least two specific signals, and coupled to said first apparatus and first means second apparatus to generate two second local signals having the same nominal frequency equal to that of the sequential signal, and having respectively, with the ratios of the actual frequencies of the two second local signals to the actual frequencies of the first local signals being equal to the ratios of the nominal frequency of the sequential signal to the nominal frequencies of the specific signals from each of said transmitting stations, respectively.

13. Apparatus as in claim 1, wherein the portions of the sequential signal as transmitted by the at least two transmitting stations are synchronized in phase.

* * * * *